US012652151B2

(12) United States Patent
Kim et al.

(10) Patent No.: US 12,652,151 B2
(45) Date of Patent: *Jun. 9, 2026

(54) METHOD AND APPARATUS FOR ACTIVATING AND REACTIVATING SCELL CONSIDERING CURRENTLY ACTIVATED BANDWIDTH PART AND BANDWIDTH PART CONFIGURATION INFORMATION IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,160

(22) Filed: Mar. 18, 2024

(65) Prior Publication Data

US 2024/0259173 A1     Aug. 1, 2024

Related U.S. Application Data

(63) Continuation of application No. 17/399,573, filed on Aug. 11, 2021, now Pat. No. 11,936,597.

(30) Foreign Application Priority Data

Aug. 13, 2020     (KR) ........................ 10-2020-0102006

(51) Int. Cl.
H04L 5/00          (2006.01)
H04W 24/08       (2009.01)
(Continued)

(52) U.S. Cl.
CPC .......... H04L 5/0098 (2013.01); H04L 5/0051 (2013.01); H04L 5/0092 (2013.01);
(Continued)

(58) Field of Classification Search
CPC ................ H04L 5/0098; H04L 5/0051; H04L 5/0092; H04L 5/0001; H04L 41/145; H04L 43/00;
(Continued)

(56) References Cited

U.S. PATENT DOCUMENTS 10,673,601 B2      6/2020   Chen et al.
11,133,912 B2      9/2021   Lee et al.
(Continued)

FOREIGN PATENT DOCUMENTS

CN          110945939 A      3/2020
CN          111164928 A      5/2020
KR     10-2020-0094059 A      8/2020

OTHER PUBLICATIONS

3GPP; 3rd Generation Partnership Project; Technical Specification Group Radio Access Network; NR; Medium Access Control (MAC) protocol specification (Release 16); 3GPP TS 38.321; V16.1.0; Jul. 24, 2020; Valbonne, France.

(Continued)

*Primary Examiner* — Brian T Le
(74) *Attorney, Agent, or Firm* — Jefferson IP Law, LLP

(57)          ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of introducing a new dormant bandwidth part (BWP) and operating the dormant BWP in units of BWPs (bandwidth part-level) is provided.

12 Claims, 17 Drawing Sheets

(51) Int. Cl.

| | |
|---|---|
| *H04W 52/36* | (2009.01) |
| *H04W 72/0453* | (2023.01) |
| *H04W 72/23* | (2023.01) |
| *H04W 72/54* | (2023.01) |

(52) U.S. Cl.
CPC ......... *H04W 24/08* (2013.01); *H04W 52/365* (2013.01); *H04W 72/0453* (2013.01); *H04W 72/23* (2023.01); *H04W 72/54* (2023.01)

(58) Field of Classification Search
CPC ................. H04W 72/23; H04W 72/54; H04W 72/0453; H04W 36/0094; H04W 24/08; H04W 16/18; H04W 52/365
See application file for complete search history.

(56) References Cited

U.S. PATENT DOCUMENTS

| | | |
|---|---|---|
| 12,389,400 B2 | 8/2025 | Kim et al. |
| 2012/0044847 A1 | 2/2012 | Chang |
| 2013/0237208 A1 | 9/2013 | Vujcic |
| 2015/0124788 A1 | 5/2015 | Jang et al. |
| 2016/0014734 A1 | 1/2016 | Jang et al. |
| 2019/0124558 A1 | 4/2019 | Ang et al. |
| 2020/0244410 A1 | 7/2020 | Kim et al. |

OTHER PUBLICATIONS

International Search Report with Written Opinion dated Nov. 15, 2021; International Appln. No. PCT/KR2021/010802.

Nokia et al., "Correction on dormant SCell", 3GPP TSG-RAN WG2 Meeting #111 Electronic, Elbonia, Aug. 17-28, 2020, R2-2008180, 38.321 16.1.0.

European Search Report dated Dec. 13, 2023, issued in European Application No. 21856287.4.

Indian Office Action dated Jul. 2, 2024, issued in Indian Application No. 202337001504.

European Office Action dated May 7, 2025, issued in European Application No. 21 856 287.4.

Korean Office Action dated Aug. 26, 2025, issued in Korean Application No. 10-2020-0102006.

Huawei et al., Corrections on MAC spec for direct SCell activation and dormant BWP, R2-2003658, 3GP TSG-RAN2 Meeting #bis-e, Apr. 10, 2020.

Chinese Office Action dated Dec. 29, 2025, issued in Chinese Application No. 202180056493.9.

Per UE and per SCell group Dormant indication

FIG. 13

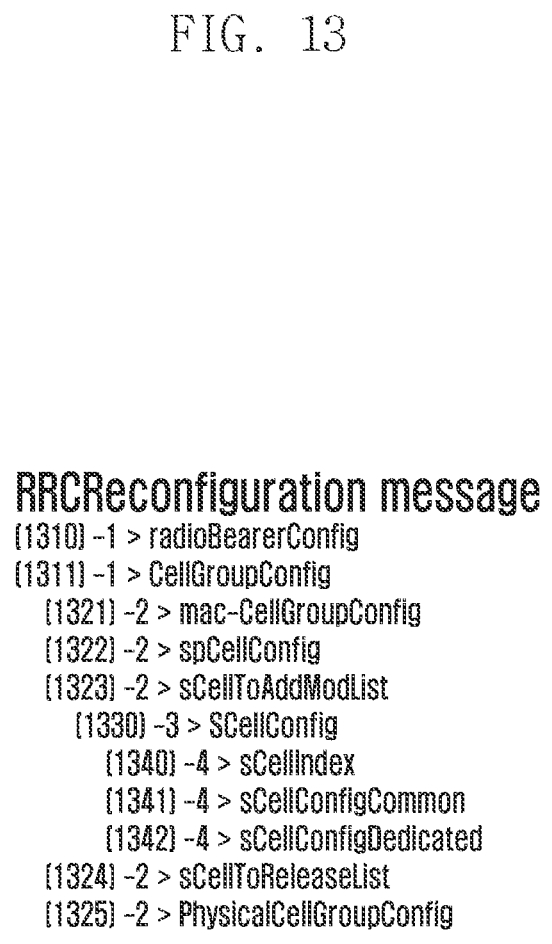

RRCReconfiguration message
(1310) -1 > radioBearerConfig
(1311) -1 > CellGroupConfig
   (1321) -2 > mac-CellGroupConfig
   (1322) -2 > spCellConfig
   (1323) -2 > sCellToAddModList
      (1330) -3 > SCellConfig
         (1340) -4 > sCellIndex
         (1341) -4 > sCellConfigCommon
         (1342) -4 > sCellConfigDedicated
   (1324) -2 > sCellToReleaseList
   (1325) -2 > PhysicalCellGroupConfig

FIG. 17

METHOD AND APPARATUS FOR ACTIVATING AND REACTIVATING SCELL CONSIDERING CURRENTLY ACTIVATED BANDWIDTH PART AND BANDWIDTH PART CONFIGURATION INFORMATION IN NEXT-GENERATION MOBILE COMMUNICATION SYSTEM

CROSS-REFERENCE TO RELATED APPLICATION(S)

This application is a continuation application of prior application Ser. No. 17/399,573, filed on Aug. 11, 2021, which has issued as U.S. Pat. No. 11,936,597 on Mar. 19, 2024 and is based on and claims priority under 35 U.S.C. § 119(a) of a Korean patent application number 10-2020-0102006, filed on Aug. 13, 2020, in the Korean Intellectual Property Office, the disclosure of which is incorporated by reference herein in its entirety.

BACKGROUND

1. Field

The disclosure relates to a technology for efficiently activating or reactivating an SCell in consideration of a currently activated bandwidth part and bandwidth part configuration information in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a next-generation mobile communication system, carrier aggregation may be used to provide a service having a high data transmission rate and low transmission latency to a UE.

The above information is presented as background information only to assist with an understanding of the disclosure. No determination has been made, and no assertion is made, as to whether any of the above might be applicable as prior art with regard to the disclosure.

SUMMARY

A method of preventing processing latency that may be generated when carrier aggregation is configured and activated in a UE having a connection with a network or when carrier aggregation is deactivated after being used is needed. Particularly, if the UE maintains a plurality of cells in an activated state in order to use the carrier aggregation, the UE is required to monitor a PDCCH for each cell, so that battery consumption of the UE may increase. On the other hand, if the plurality of cells remain in a deactivated state in order to reduce battery consumption of the UE, data transmission/reception latency may occur due to latency generated when the plurality of cells are activated through the use of carrier aggregation.

Aspects of the disclosure are to address at least the above-mentioned problems and/or disadvantages and to provide at least the advantages described below. Accordingly, an aspect of the disclosure is to provide a method of introducing a new dormant BWP and operating the new dormant BWP in units of BWPs (bandwidth part-levels) to rapidly activate the carrier aggregation and save a battery life of the UE.

Another aspect of the disclosure is to provide a new dormant mode to allow an RRC-connected mode UE having a connection with a network in a next-generation mobile communication system to rapidly activate and deactivate carrier aggregation.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving control information for indicating an activation or a deactivation of a secondary cell (SCell), identifying whether the SCell is deactivated prior to receiving the control information, in case that the SCell is deactivated prior to receiving the control information, identifying whether a first active downlink bandwidth part (BWP) for the SCell is set to a dormant BWP, and in case that the first active downlink BWP for the SCell is not set to the dormant BWP, performing to activate the SCell based on the control information.

In accordance with another aspect of the disclosure, a terminal in a wireless communication system is provided. The terminal includes a transceiver, and at least one processor configured to receive, via the transceiver, control information for indicating an activation or a deactivation of a secondary cell (SCell), identify whether the SCell is deactivated prior to receiving the control information, in case that the SCell is deactivated prior to receiving the control information, identify whether a first active downlink bandwidth part (BWP) for the SCell is set to a dormant BWP, and in case that the first active downlink BWP for the SCell is not set to the dormant BWP, perform to activate the SCell based on the control information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 proposes an example of a format of an RRC message for configuring configuration information to which embodiment 1, embodiment 2, or embodiment 3 according to an embodiment of the disclosure;

FIG. 17 illustrates a structure of the base station in the wireless communication system according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure below, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". For example, a base station described as "eNB" may indicate "gNB".

Figure 1:
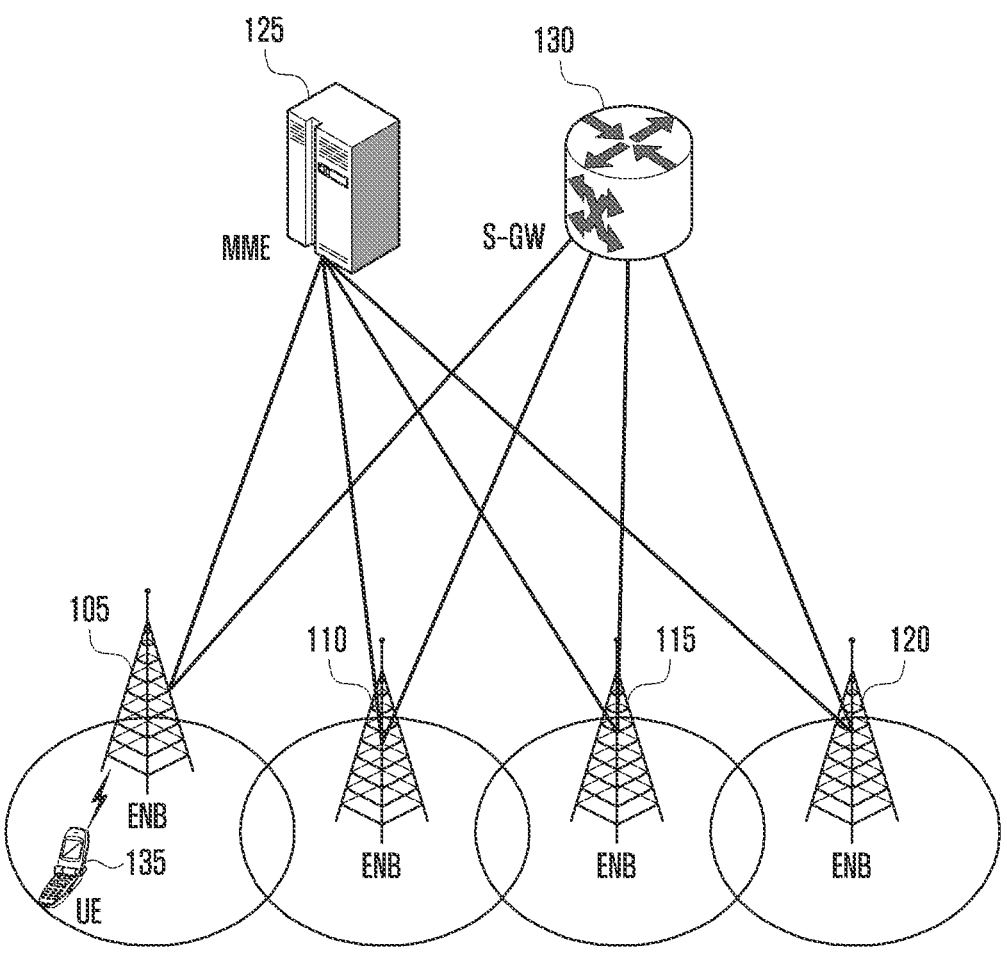
FIG. 1 illustrates a structure of an LTE system according to an embodiment of the disclosure.

FIG. 1 illustrates a structure of an LTE system according to an embodiment of the disclosure.

Referring to FIG. 1, a radio access network of the LTE system includes next-generation base stations (Evolved node Bs, hereinafter, referred to as ENBs, Node Bs, or base stations) 105, 110, 115, and 120, a Mobility Management Entity (MME) 125, and a Serving Gateway (S-GW) 130. A user terminal (user equipment, hereinafter, referred to as a UE or a terminal) 135 accesses an external network through the ENBs 105 to 120 and the S-GW 130.

Referring to FIG. 1, the ENBs 105 to 120 correspond to the node Bs of the universal mobile telecommunications system (UMTS) system of the related art. The ENB is connected to the UE 135 through a radio channel, and performs a more complicated role than that of the node B of the related art. In the LTE system, since all user traffic including a real-time service such as Voice over IP (VoIP) via an Internet protocol are served through a shared channel, an apparatus for collecting and scheduling status information on buffer statuses of UEs, available transmission power status, and channel statuses is required, and the ENBs 105 to 120 may serve as this apparatus. One ENB may control a plurality of cells. For example, in order to implement a transmission rate of 100 Mbps, the LTE system may use Orthogonal Frequency Division Multiplexing (OFDM) as a wireless access technology in a bandwidth of 20 MHz. Further, an Adaptive Modulation and Coding (AMC) scheme of determining a modulation scheme and a channel-coding rate is applied depending on the channel status of the new radio (NR) UE. The S-GW 130 is a device for providing a data bearer, and generates or removes the data bearer under the control of the MME 125. The MME is a device for performing not only a function of managing the mobility of the UE but also various control functions, and may be connected to a plurality of ENBs.

Figure 2:
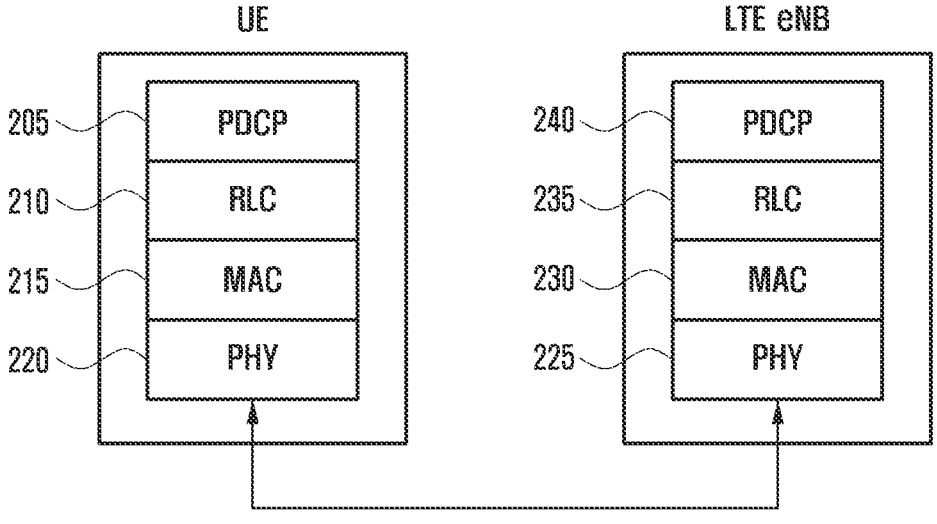
FIG. 2 illustrates a wireless protocol structure in the LTE according to an embodiment of the disclosure.

FIG. 2 illustrates a wireless protocol structure in the LTE system according to an embodiment of the disclosure.

Referring to FIG. 2, the UE and the ENB include Packet Data Convergence Protocols (PDCPs) 205 and 240, Radio Link Controls (RLCs) 210 and 235, and Medium Access Controls (MACs) 215 and 230, respectively, in the wireless protocol of the LTE system. The Packet Data Convergence Protocols (PDCPs) 205 and 240 perform an operation of compressing/reconstructing an IP header. The main functions of the PDCP are described below.

Header compression and decompression function (Header compression and decompression: ROHC only)

User data transmission function (transfer of user data)

Sequential delivery function (in-sequence delivery of upper-layer protocol data units (PDUs) at PDCP reestablishment procedure for RLC AM)

Sequence re-arrangement function (For split bearers in DC (only support for RLC acknowledged mode AM)): PDCP PDU routing for transmission and PDCP PDU reordering for reception)

Duplicate detection function (duplicate detection of lower-layer service data units (SDUs) at PDCP reestablishment procedure for RLC AM)

Retransmission function (retransmission of PDCP SDUs at handover and, for split bearers in DC, of PDCP PDUs at PDCP data recovery procedure, for RLC AM)

Ciphering and deciphering function (Ciphering and deciphering)

Timer-based SDU removal function (timer-based SDU discard in uplink)

Radio Link Controls (RLCs) 210 and 235 reconfigure a PDCP Protocol Data Unit (PDU) to be the appropriate size and perform an automatic repeat request (ARQ) operation. The main functions of the RLC are summarized below.

Data transmission function (transfer of upper-layer PDUs)

ARQ function (Error Correction through ARQ (only for AM data transfer))

Concatenation, segmentation, and reassembly function (Concatenation, segmentation and reassembly of RLC SDUs (only for unacknowledged mode (UM) and AM data transfer))

Re-segmentation function (re-segmentation of RLC data PDUs (only for AM data transfer))

Reordering function (reordering of RLC data PDUs (only for UM and AM data transfer))

Duplication detection function (duplicate detection (only for UM and AM data transfer))

Error detection function (protocol error detection (only for AM data transfer))

RLC SDU deletion function (RLC SDU discard (only for UM and AM data transfer))

RLC reestablishment function (RLC reestablishment)

The MACs 215 and 230 are connected with various RLC layer devices included in one UE, and perform an operation for multiplexing RLC PDUs to the MAC PDU and demultiplexing the RLC PDUs from the MAC PDU. The main functions of the MAC are summarized below.

Mapping function (Mapping between logical channels and transport channels)

Multiplexing and demultiplexing function (Multiplexing/demultiplexing of MAC SDUs belonging to one or multiple different logical channels into/from Transport Blocks (TBs) delivered to/from the physical layer on transport channels)

Scheduling information report function (scheduling information reporting)

Hybrid automatic repeat request (HARQ) function (error correction through HARQ)

Logical channel priority control function (priority handling between logical channels of one UE)

UE priority control function (priority handling between UEs by means of dynamic scheduling)

Multimedia broadcast multicast service (MBMS) service identification function (MBMS service identification)

Transport format selection function (transport format selection)

Padding function (padding)

The PHY layers 220 and 225 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 3:
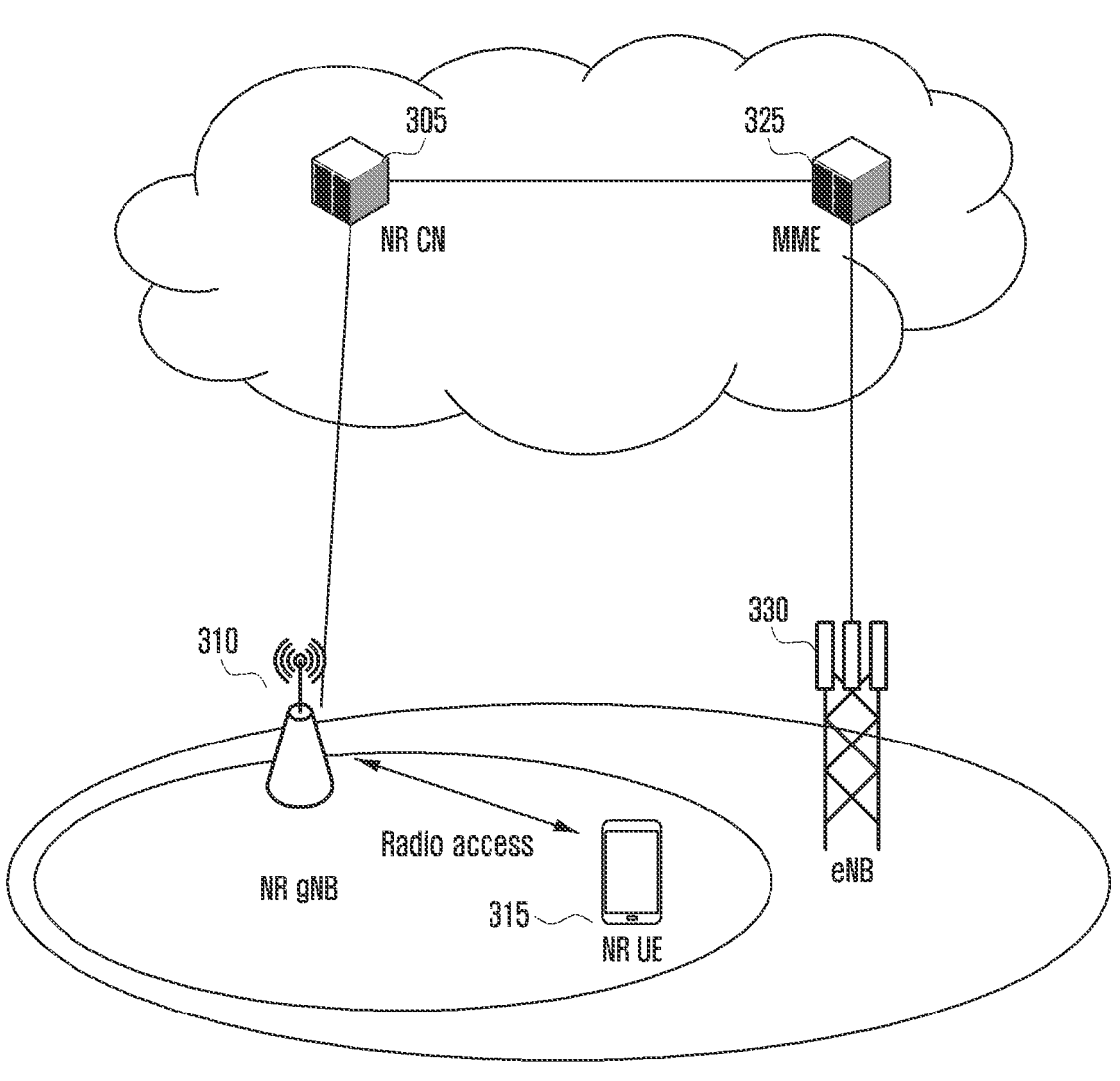
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, a radio access network of a next-generation mobile communication system (hereinafter, NR or 5G) includes a next-generation base station 310 (new radio node B, hereinafter, referred to as an NR gNB or an NR base station) and a New Radio Core Network (NR CN) 305. A user terminal 315 (new radio user equipment, hereinafter, referred to as a NR UE or a terminal) accesses an external network through the NR gNB 310 and the NR CN 305.

Referring to FIG. 3, the NR gNB 310 corresponds to an evolved Node B (eNB) of the LTE system of the related art. The NR gNB may be connected to an NR UE 315 through a radio channel and may provide better service than the node B of the related art. Since all user traffic is served through a shared channel in the next-generation mobile communication system, an apparatus for collecting and scheduling status information of buffer statuses, available transmission power statuses, and channel statuses of UEs is required, and the NR NB 310 serves as this apparatus. One NR gNB generally controls a plurality of cells. The NR gNB may have a bandwidth wider than the maximum bandwidth of the related art in order to implement super-high-speed data transmission compared to LTE of the related art, may apply orthogonal frequency-division multiplexing (OFDM) through radio-access technology, and may further apply beamforming technology. Further, an Adaptive Modulation and Coding (AMC) scheme of determining a modulation scheme and a channel-coding rate is applied depending on the channel status of the NR UE. The NR CN 305 performs functions supporting mobility, configuring bearers, configuring quality of service (QoS), and the like. The NR CN is a device for performing a function of managing the mobility of the NR UE and various control functions, and is connected to a plurality of NR gNBs. Further, the next-generation mobile communication system may be linked to the LTE system of the related art, and the NR CN is connected to an MME 325 through a network interface. The MME is connected to an eNB 330, which is a base station of the related art.

Figure 4:
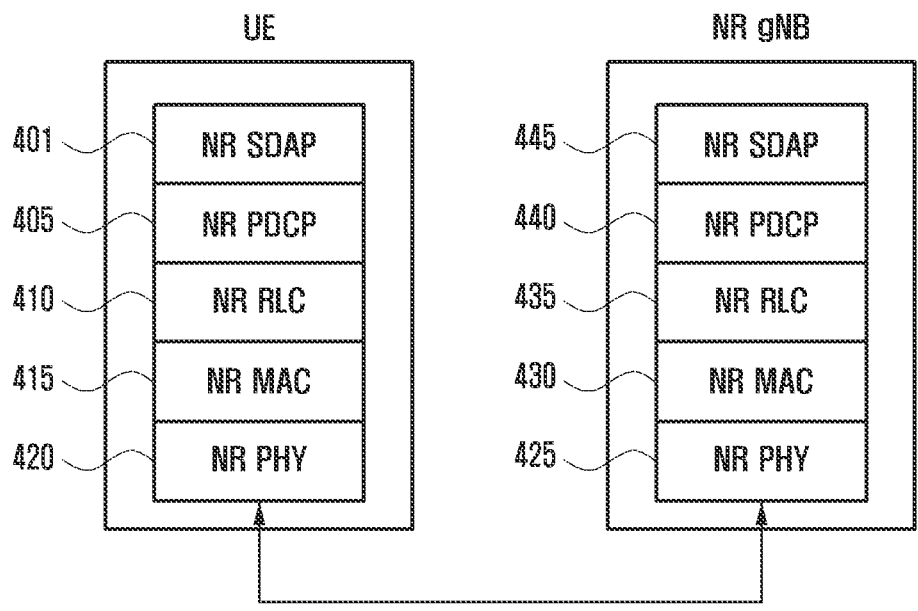
FIG. 4 illustrates a wireless protocol structure of the next-generation mobile communication system according to an embodiment of the disclosure.

FIG. 4 illustrates a wireless protocol structure of the next-generation mobile communication system according to an embodiment of the disclosure.

Referring to FIG. 4, the wireless protocol of the next-generation mobile communication system includes NR SDAPs 401 and 445, NR PDCPs 405 and 440, NR RLCs 410 and 435, NR MACs 415 and 430, and NR PHYs 420 and 425 in the UE and the NR gNB.

Main functions of the NR SDAPs 401 and 445 may include some of the following functions.

User data transmission function (transfer of user-plane data)
   Function of mapping QoS flow and a data bearer for uplink and downlink (mapping between a QoS flow and a data radio bearer (DRB) for both DL and UL)
   Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of non-access stratum (NAS) reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCPs 405 and 440 may include some of the following functions.

Header compression and decompression function (Header compression and decompression: robust header compression (ROHC) only)
   User data transmission function (transfer of user data)
   Sequential delivery function (in-sequence delivery of upper-layer PDUs)
   Non-sequential delivery function (out-of-sequence delivery of upper-layer PDUs)
   Reordering function (PDCP PDU reordering for reception)
   Duplicate detection function (duplicate detection of lower-layer SDUs)
   Retransmission function (retransmission of PDCP SDUs)
   Ciphering and deciphering function (Ciphering and deciphering)
   Timer-based SDU removal function (timer-based SDU discard in uplink)

The reordering function of the NR PDCP device is a function of sequentially reordering PDCP PDUs received by a lower layer based on a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 410 and 435 may include some of the following functions.

Data transmission function (transfer of upper-layer PDUs)
   Sequential delivery function (in-sequence delivery of upper-layer PDUs)
   Non-sequential delivery function (out-of-sequence delivery of upper-layer PDUs)
   ARQ function (error correction through ARQ)
   Concatenation, segmentation, and reassembly function (concatenation, segmentation, and reassembly of RLC SDUs)
   Re-segmentation function (re-segmentation of RLC data PDUs)
   Reordering function (reordering of RLC data PDUs)
   Duplicate detection function (duplicate detection)
   Error detection function (protocol error detection)
   RLC SDU deletion function (RLC SDU discard)
   RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs based on an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 415 and 430 may be connected to a plurality of NR RLC layer devices configured in one UE, and the main functions of the NR MACs may include some of the following functions.

Mapping function (Mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The PHY layers 420 and 425 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a significantly high band frequency can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell or Scell) and the UE and the NR gNB may transmit and receive data in one or a plurality of BWPs according to a configuration of the base station.

Various embodiments propose a state transition method or a BWP switching method and a detailed operation considering a state of an Scell and a plurality of BWPs configured in the Scell when a dormant BWP proposed in the disclosure is introduced. Further, the disclosure manages a dormant mode in units of BWPs (BWP-levels) and proposes a state transition method or a BWP switching method, and also proposes a detailed operation in a BWP according to a state of each Scell or a state or a mode (active, inactive, or dormant) of each BWP.

Further, according to various embodiments, a plurality of BWPs for each downlink or uplink may be configured in one cell (SpCell, PCell, PSCell, or SCell) and an active BWP (active DL or UL BWP), a dormant BWP (or dormant DL BWP), or an inactive BWP (inactive or deactivated DL/UL BWP) may be configured and operated through BWP switching. For example, it is possible to increase a data transmission rate through a method similar to the carrier aggregation by transitioning a downlink or uplink BWP to an activated state for one cell and transition or switch the downlink BWP to a dormant BWP to allow the UE to not monitor a PDCCH so as to save a battery. Further, the UE may measure a channel for the downlink BWP and report a channel measurement result, thereby supporting rapid activation of a cell or a BWP in the future. In addition, it is possible to save the battery life of the UE by transitioning the downlink (or uplink) BWP to a deactivated state in one cell. An indication of the state transition between BWPs for each cell or a BWP switching indication may be configured and indicated by an RRC message and/or a MAC CE and/or Downlink Control Information (DCI) of a PDCCH.

In the disclosure, the BWP may be used without distinction between the uplink and the downlink, and the meaning thereof may be each of an uplink BWP and a downlink BWP according to the context.

The link according to various embodiments may be used without distinction between the uplink and the downlink, and the meaning thereof may be each of the uplink and the downlink according to the context.

According to various embodiments, it is possible to configure and introduce a dormant BWP for the SCell of the UE performing the carrier aggregation and allow the UE to not monitor a PDCCH in the dormant BWP, thereby reducing UE battery consumption. In the dormant BWP, a channel measurement and a report (for example, Channel State Information (CSI) or Channel Quality Information (CQI) measurement or report) can be performed, and/or beam measurement, beam tracking, or beam operation can be performed. When data transmission is needed, switching or activation to a normal BWP is performed, and thus data transmission can be quickly started in the normal WP. The dormant BWP according to various embodiments may not be configured in or applied to the SpCell (the PCell of the MCG or the PCell of the SCG (or the PSCell)) in which a signal should be continuously monitored, a feedback should be transmitted or received, or synchronization should be identified and maintained or the SCell in which a PUCCH is configured.

The disclosure proposes various embodiments realized based on PDCCH DCI and/or a MAC CE and/or an RRC message in order to operate the dormant BWP proposed in the disclosure for the SCell of the UE.

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station). The Pcell or the PScell may be a main cell used when the base station communicates with the UE in each MAC layer device. For example, the Pcell or the PScell may be a cell which gets the timing right for synchronization, performs random access, transmits an HARQ ACK/NACK feedback through PUCCH transmission resources, and exchanges most control signals. A technology in which the NR gNB operates a plurality of Scells as well as the Spcell to increase uplink or downlink transmission resources is referred to as carrier aggregation.

When the UE receives a configuration of a Spcell and a plurality of Scells through an RRC message, the UE may receive a configuration of a state or mode for each Scell or a BWP of the SCell through the RRC message and/or the MAC CE and/or the PDCCH DCI. The state or mode of the Scell may be configured as an active mode, activated state, a deactivated mode, or deactivated state. The active mode or the activated state of the Scell may mean that the UE may exchange uplink or downlink data with the base station in a BWP other than an activated BWP of the SCell, an activated normal BWP, or an activated dormant BWP in the active mode or the activated Scell, monitors a PDCCH to identify an indication of the base station, measures a channel for a downlink of the Scell in the active mode or the activated state (or a BWP other than an activated BWP, an activated normal BWP, or an activated dormant BWP of the Scell), periodically reports measurement information, and periodically transmits a pilot signal (sounding reference signal (SRS)) to the base station so that the base station can measure an uplink channel.

However, the deactivated mode or the deactivated state of the SCell may mean that the UE does not monitor a PDCCH to identify an indication of the base station, does not measure a channel, does not transmit a measurement report, and does not transmit a pilot signal since BWPs configured in the Scell is in the deactivated state, the configured BWPs are not activated, or there is no activated BWP among the configured BWPs.

Accordingly, the base station may first configure frequency measurement configuration information in the UE in order to activate all Scells in the deactivated mode. The UE may perform cell or frequency measurement based on the frequency measurement configuration information. The base station may activate the deactivated SCells based on frequency/channel measurement information after receiving the cell or frequency measurement report of the UE. Therefore, much latency may be generated when the base station activates carrier aggregation for the UE and start data transmission or reception.

Various embodiments propose a dormant mode or a dormant state for a BWP of each activated SCell (or active SCell) or proposes configuration or introduction of a dormant bandwidth part (BWP) for each activated SCell in order to reduce a UE battery and rapidly start data transmission or reception.

In a BWP in a dormant mode of the activated cell or a dormant BWP (dormant BWP in the activated SCell) or when the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, the UE does not monitor the PDCCH and does not transmit a pilot signal in the dormant BWP of the activated SCell, and thus may save the battery compared to the normal BWP (or a BWP which is not the dormant BWP) of the activated SCell or compared to the case in which the normal BWP (or a BWP which is not the dormant BWP) of the activated SCell is activated. Further, unlike the case in which the SCell is deactivated, the UE reports a channel measurement, and thus the base station may rapidly activate the normal BWP of the activated SCell based on the measurement report or the measurement report of the dormant BWP of the activated SCell, thereby reducing a transmission delay through the quick use of the carrier aggregation.

Accordingly, in various embodiments, the active mode or the activated state of the SCell may mean that the UE may exchange uplink or downlink data with the base station in a BWP other than an activated BWP of the SCell, an activated normal BWP, or an activated dormant BWP in the active mode or the activated SCell, monitors a PDCCH to identify an indication of the base station, measures a channel for a downlink of the SCell in the active mode or the activated state (or a BWP other than an activated BWP, an activated normal BWP, or an activated dormant BWP of the SCell), periodically reports measurement information, and periodically transmits a pilot signal (Sounding Reference Signal (SRS)) to the base station so that the base station can measure an uplink channel. In the disclosure, the active mode or the activated state of the SCell may mean that the UE cannot exchange uplink or downlink data with the base station in an activated dormant BWP of the SCell, does not monitor a PDCCH to identify an indication of the base station but measures a channel for the downlink of the activated dormant BWP of the Scell in the active mode or the activated state, and periodically reports measurement information to the base station in the active mode or the activated SCell.

In various embodiments, the dormant BWP may indicate a state of a BWP or may be used as the name of the logical concept indicating a specific BWP. Accordingly, the dormant BWP may be activated, deactivated, or switched. For example, an indication indicating switching of an activated second BWP of a first Scell to a dormant BWP, an indication indicating transition of a the first SCell to a dormant state or a dormant mode, or an indication indicating activation of the dormant BWP of the first SCell may be interpreted as the same meaning.

In various embodiments, the normal BWP may indicate a BWP which is not a dormant BWP among BWPs configured in each SCell of the UE through an RRC message. In the normal BWP, the UE may exchange uplink or downlink data with the base station, monitors a PDCCH to identify an indication of the base station, measures a channel for the downlink, periodically reports measurement information to the base station, and periodically transmits a pilot signal (Sounding Reference Signal (SRS)) to the base station to allow the base station to measure an uplink channel. The normal BWP may be a first active BWP, a default BWP, a first active BWP which is activated from the dormant state, or an initial BWP.

Among BWPs configured in each SCell of the UE, only one dormant BWP may be configured for the downlink. In another method, among BWPs configured in each SCell of the UE, one dormant BWP may be configured for the uplink or the downlink. However, this is not limiting, and one or more dormant BWPs may be configured to each SCell of the UE.

Figure 5:
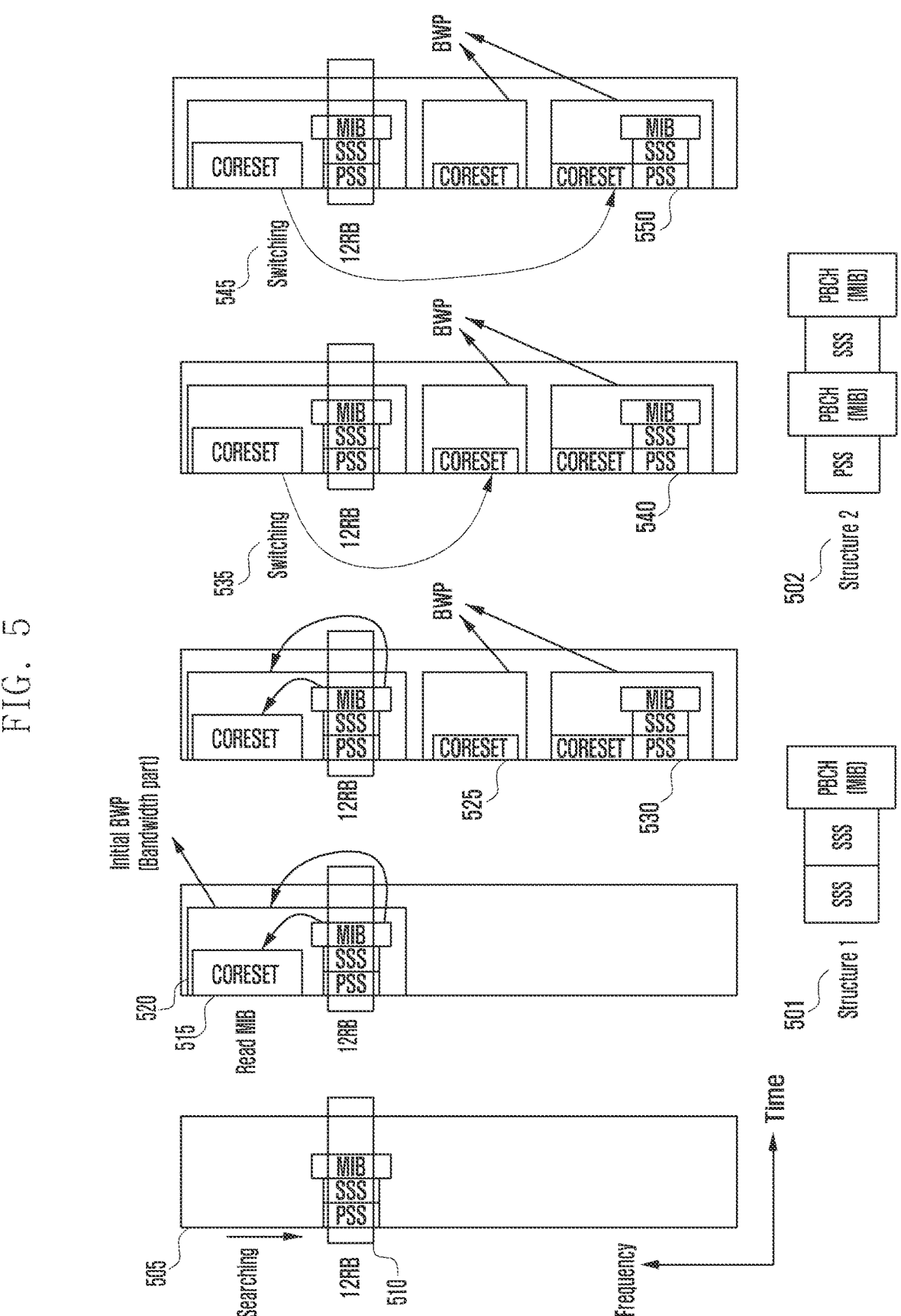
FIG. 5 illustrates a procedure of serving the UE by efficiently using a very wide frequency bandwidth in the next-generation mobile communication system according to an embodiment of the disclosure.

FIG. 5 illustrates a procedure of serving the UE through the efficient use of a very wide frequency bandwidth in the next-generation mobile communication system according to an embodiment of the disclosure.

Referring to FIG. 5, a method of providing a service to UEs having different capabilities (or categories) by efficiently using a significantly wide frequency bandwidth and saving a battery in the next-generation mobile communication system is described.

One cell to which the base station provides a service may serve a very wide frequency band as indicated by reference numeral 505. However, in order to provide a service to UEs having different capabilities, the wide frequency band may be divided into a plurality of bandwidth parts to manage one cell.

First, the UE, when power thereof is initially turned on, may search the entire frequency band provided by a service provider (PLMN) in units of predetermined resource blocks (for example, in units of 12 resource blocks (RBs)). For example, the UE may start discovering a Primary Synchronization Sequence (PSS)/Secondary Synchronization Sequence (SSS) in the entire system BWP in units of resource blocks, as indicated by reference numeral 510. If the UE searches for the PSS/SSS 501 or 502 in units of resource blocks and then detects the signals, the UE may read the signals, analyze (decode) the signals, and identify a boundary between a subframe and a radio transmission resource frame (radio frame). Accordingly, the UE may identify subframes in units of 1 ms and synchronize a downlink signal with the base station. The Resource Block (RB) is the size of a predetermined frequency resource and a predetermined time resource, and may be defined as a two-dimensional unit. For example, time resources may be defined in units of 1 ms, and frequency resources may be defined as 12 subcarriers (1 carrier×15 kHz=180 kHz).

When the UE completes synchronization, the UE may identify information on a Control Resource Set (CORESET) by checking a Master system Information Block (MIB) or Minimum System Information (MSI) and identify initial access bandwidth part (BWP) information, as indicated by reference numerals 515 and 520. CORESET information refers to the location of time/frequency transmission resources through which a control signal is transmitted from the base station, and may be, for example, the location of resources through which a PDCCH channel is transmitted. That is, the CORESET information is information indicating resources through which first system information (System Information Block 1: SIB 1) is transmitted and indicates frequency/time resources through which a PDCCH is transmitted. The UE may identify information on an initial BWP by reading the first system information. As described above, if the UE completes synchronization of the downlink signal with the base station and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured in every cell (PCell, PSCell, SpCell, or SCell). A plurality of BWPs may be configured for the downlink within one cell, and separately, a plurality of BWPs may be configured for the uplink.

The plurality of BWPs may be indicated and configured by a BWP identifier to be used as an initial BWP, a default BWP, a first active BWP, a dormant BWP, or a first active BWP from dormant that is activated from a dormant state.

The initial BWP may be used as a cell-specifically determined BWP, each of which exists per cell. For example, the initial BWP may be used as a BWP by which the UE initially accessing the cell configures a connection to the cell through a random access procedure or by which the UE configuring the connection performs synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. For example, all UEs accessing the same cell may identically designate the same initial BWP to BWP identifier no.0 and use the same. This confers an advantage of easily performing a contention-based random-access procedure because the base station can transmit a Random Access Response (RAR) message in the initial BWP, which all UEs can read, during the random access procedure.

The first active BWP may be configured to be UE specific and may be designated to and indicated by a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a PCell or PSCell and a plurality of SCells are configured in the UE and a plurality of BWPs is configured in each PCell or PSCell or each SCell, if the PCell, the PSCell, or the SCell is activated, the UE may activate and use a first active BWP among the plurality of BWPs configured in the PCell, PSCell, or SCell. For example, the first active downlink BWP 525 may be activated and used for the downlink, and the first active uplink BWP 530 may be activated and used for the uplink.

Upon receiving information indicating activation of the SCell or the BWP in a deactivated state through an RRC message, MAC control information, or DCI, the UE may perform an operation 535 of switching the current or activated downlink BWP of the SCell to activate the same to the first active downlink BWP (or a BWP configured or indicated by an RRC message) or an operation of switching the current or activated uplink BWP to activate the same to the first active uplink BWP (or a BWP configured or indicated by an RRC message) 540. Further, the operation may be performed when an indication indicating transition of the SCell or the BWP to the dormant state is received through an RRC message, MAC control information, or DCI. This is because the base station can effectively use carrier aggregation only by measuring and reporting a frequency/channel for the first active downlink/uplink BWP even when a channel measurement report is transmitted in the dormant state since the current or activated downlink BWP is switched and activated to activate the first active downlink BWP (or the BWP configured or indicated by the RRC message) or the uplink BWP is switched 545 and activated to the first active uplink BWP (or the BWP configured or indicated by the RRC message) 550 when the SCell or the BWP is activated.

The default BWP may be differently configured to be UE-specific, and may be designated to and indicated by the identifier of a BWP among a plurality of BWPs. According to an embodiment, the default BWP may be configured only for the downlink. The default BWP may be used as a BWP on which to fall back from the activated BWP, among a plurality of downlink BWPs, after a predetermined time. For example, the base station may configure a BWP inactivity timer for each cell or each BWP through an RRC message. The timer may start or restart when data transmission/reception is performed in an activated BWP rather than a default BWP or start or restart when the activated BWP is switched to another BWP. If the timer expires, the UE may fall back or switch the downlink BWP activated in the cell to the default BWP. The switching may be a procedure of deactivating the currently activated BWP and activating the BWP of which switching is indicated, and may be triggered through an RRC message, MAC control information (MAC control element), or L1 signaling (Downlink Control Information (DCI) of a PDCCH). The switching may be triggered through an indication of the BWP to be activated or switched to, and the BWP may be indicated by a BWP identifier (for example, 0, 1, 2, 3, or 4).

The reason why the default BWP is applied only to and used for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may be fall back to the initial BWP by considering the initial BWP as the default BWP when the BWP inactivity timer expires.

In another method, in order to increase implementation freedom of the base station, the default BWP may be defined and configured for the uplink and used as the default BWP of the downlink.

The dormant BWP is a BWP in a dormant mode of the activated SCell or a dormant BWP in the activated SCell. When the dormant BWP is activated, the UE cannot exchange data with the base station, does not monitor a PDCCH to identify an indication of the base station, or does not transmit a pilot signal, but measures a channel, and reports a measurement result for the measured frequency/cell/channel periodically or when an event is generated according to a configuration of the base station. Accordingly, since the UE does not monitor the PDCCH and does not transmit the pilot signal in the dormant BWP in the activated SCell, the UE may save a battery life compared to a normal BWP (or a BWP which is not the dormant BWP or compared to the case in which a normal BWP (or a BWP which is not the dormant BWP) of the activated SCell is activated, and does not transmit the pilot signal may reduce a transmission delay by rapidly activating the normal BWP of the activated SCell based on the measurement report or the measurement report of the dormant BWP of the activated SCell to promptly use the carrier aggregation since the channel measurement report is transmitted unlike the case in which the SCell is deactivated.

A first active BWP activated from a dormant state after switching from a dormant state or a dormant BWP (or a first active non-dormant BWP or a BWP configured or indicated through an RRC message) may be a BWP which should be activated by switching the current or activated BWP of the activated SCell by the UE or a BWP which should be activated from a dormant state configured in the RRC message according to an indication in the case in which the UE receives an indication of switching a BWP of the activated SCell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated SCell as a dormant BWP or when an activated BWP of the activated SCell is a dormant BWP or is switched to a dormant BWP in the SCell.

Figure 6:
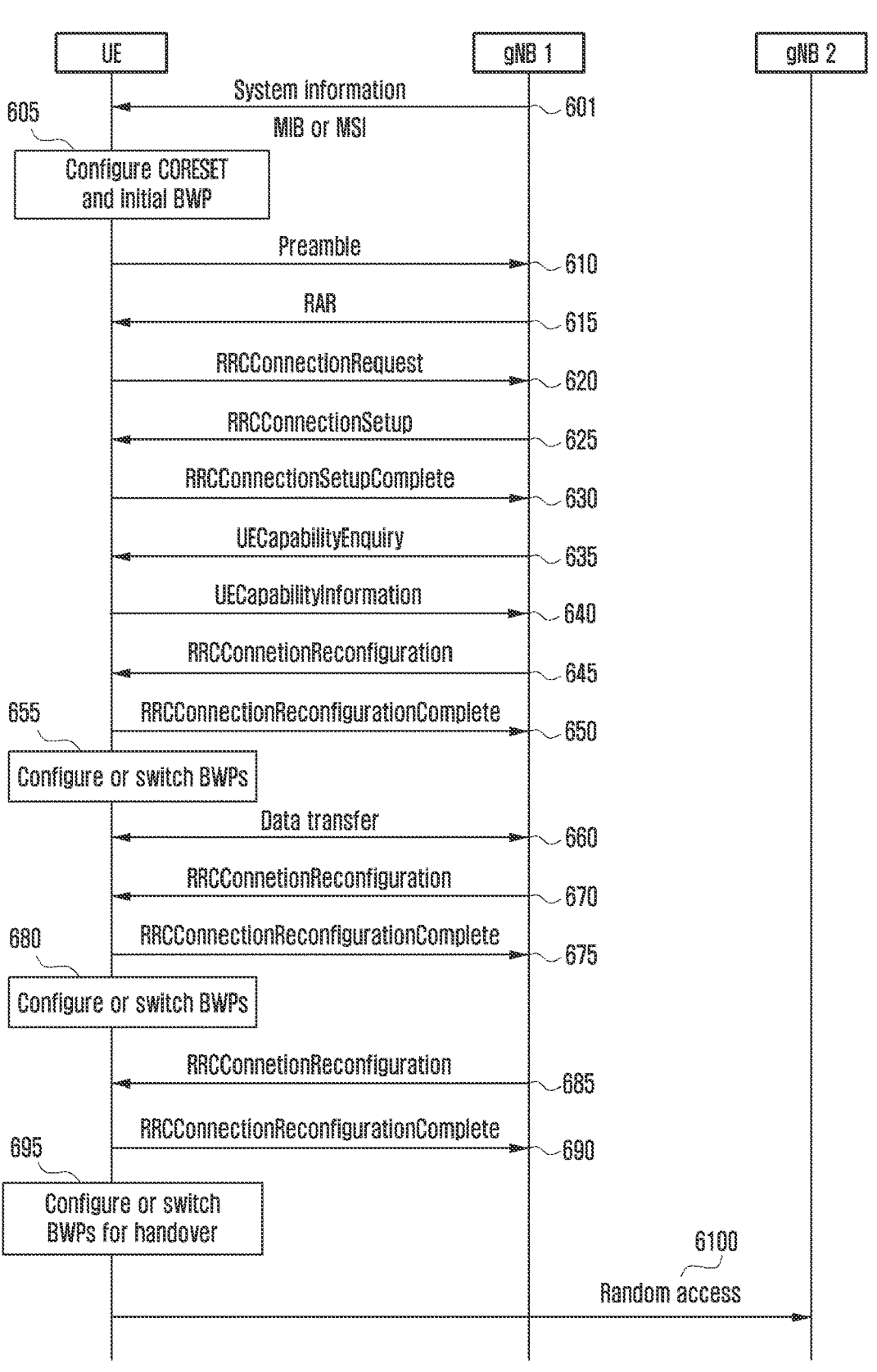
FIG. 6 illustrates a procedure in which the UE switches from an RRC-idle mode to an RRC-connected mode in the next-generation mobile communication system of the disclosure and proposes a method of configuring a plurality of bandwidth parts (BWPs) and configuring a default BWP or a first active BWP according to an embodiment of the disclosure.

FIG. 6 illustrates a procedure in which the UE switches from an RRC-idle mode to an RRC-connected mode in the next-generation mobile communication system of the disclosure and proposes a method of configuring a plurality of bandwidth parts (BWPs) and configuring a default BWP or a first active BWP according to an embodiment of the disclosure.

One cell to which the base station provides a service may serve a very wide frequency band. First, the UE may search the entire frequency band provided by a service provider (PLMN) in units of predetermined resource blocks (for example, in units of 12 Resource Blocks (RBs)). For example, the UE may start discovering a Primary Synchronization Sequence (PSS)/Secondary Synchronization Sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. For example, the UE may identify information on a control resource set (CORESET) by checking a Master system Information Block (MIB) or Minimum System Information (MSI) and identify initial Bandwidth Part (BWP) information by reading system information in operations 601 and 605. CORESET information refers to the location of time/frequency transmission resources through which a control signal is transmitted from the base station, and may be, for example, the location of resources through which a PDCCH channel is transmitted.

As described above, when the UE completes synchronization of the downlink signal with the base station and is able to receive a control signal, the UE may perform a random-access procedure in the initial BWP (e.g., the UE transmits a random access preamble) in operation 610, receive a random-access response in operation 615, make a request for configuring an RRC connection in operation 620, receive an RRC message in operation 625, and may transmit a message to the base station indicating that the RRC Connection set up is complete in operation 630 to configure the RRC connection.

When the basic RRC connection is completely config- ured, the base station may transmit an RRC message which asks about a UE capability to the UE (UECapabilityEnquiry) in order to identify the UE capability in operation 635. In another method, the base station may ask a Mobility Man- agement Entity (MME) or an Access and Mobility Function (AMF) about the UE capability in order to identify the UE capability. This is because the MME or the AMF may have UE capability information if the UE previously accessed the MME or the AMF. If there is no UE capability required by the base station, the base station may make a request for UE capability to the UE.

The reason why the base station transmits the RRC message to the UE to identify the UE capability is to identify the UE capability, for example, information indicating a frequency band that the UE can read or an area of the frequency band that the UE can read. After identifying the UE capability, the base station may configure an appropriate BWP in the UE. When the UE receives the RRC message which asks about the UE capability, the UE may indicate the range of bandwidth that the UE supports or the range supported by the current system bandwidth through an offset from a reference center frequency, by directly pointing to a start point and an end point of the supported frequency bandwidth, or through a center frequency and a bandwidth in operation 640.

The BWP may be configured through an RRCSetup message of the RRC connection configuration, an RRCRe- sume message in operation 625, or an RRCReconfiguration message in operations 645, 670, and 685. The RRC message may include configuration information for a PCell, a PSCell, or a plurality of SCells. The base station may configure a plurality of BWPs for each cell (PCell, PSCell, or SCell). When a plurality of BWPs are configured for each cell, the base station may configure a plurality of BWPs to be used in the downlink of each cell. In the case of an FDD system, the base station may configure a plurality of BWPs to be used in the uplink of each cell to be distinguished from downlink BWPs. In the case of a TDD system, the base station may configure a plurality of BWPs to be used in common for the downlink and the uplink of each cell. The UE may transmit an RRCReconfigurationComplete message in response to the RRCReconfiguration message in opera- tions 650, 675, and 690. The UE may configure BWPs based on the received information for configuring the BWP and may switch the BWPs in operations 655, 680, and 695 in various situations described below. When RRCReconfigua- tion is generated while the UE transmits and receives data in operation 660, the UE may configure or switches BWPs again. Further, when RRCReconfiguration of handover is generated, the UE may configure or switch BWPs for the handover in operation 695 and perform random access for the handover in operation 6100.

The information for configuring the BWPs of each cell (PCell, PSCell, or SCell) included in the RRC message may contain some pieces of the following information.

Downlink BWP configuration information of the cell
    Initial downlink BWP configuration information
        A plurality of pieces of BWP configuration information and BWP IDs corresponding to the respective BWPs
        Initial configuration information of the downlink BWP of the cell (for example, activated state, dormant state, or deactivated state)
        A BWP identifier indicating a first active downlink BWP
        A BWP identifier indicating a default BWP Configuration information for monitoring a PDCCH for each BWP (For example, the configuration infor- mation includes CORESET information, search space resource information, PDCCH transmission resources, periodicity, and subframe number infor- mation)
        A BWP identifier indicating a dormant BWP or a 1-bit indicator indicating a dormant BWP for each BWP in the BWP configuration information
        A BWP identifier indicating a first active BWP acti- vated from a dormant state or a 1-bit indicator indicating a first active BWP activated from a dor- mant state for each BWP in the BWP configuration information
    BWP inactivity timer configuration and a timer value
Uplink BWP configuration information of the cell
    Initial uplink BWP configuration information
    A plurality of pieces of BWP configuration information and BWP IDs corresponding to the respective BWPs
    Initial configuration information of the downlink BWP of the cell (for example, activated state, dormant state, or deactivated state)
    A BWP identifier indicating a dormant BWP or a 1-bit indicator indicating a dormant BWP for each BWP in the BWP configuration information
    A BWP identifier indicating a first active uplink BWP The configured initial BWP, default BWP, or first active BWP may be used for the following purpose, and may be operated so as to suit the purpose.

The initial BWP may be used as a cell-specifically deter- mined BWP, each of which exists per cell. The initial BWP may be used as a BWP by which the UE initially accessing the cell configures a connection to the cell through a random access procedure or by which the UE configuring the connection performs synchronization. The base station may configure an initial downlink BWP to be used in downlink and an initial uplink BWP to be used in uplink for each cell. Configuration information of the initial BWP may be broad- casted through first system information (system information 1: SIB 1) indicated by the CORESET, and may be config- ured again in the UE which accesses the base station through an RRC message. The initial BWP may be used while being designated with BWP identifier number 0 in each of the uplink and the downlink. For example, all UEs accessing the same cell may identically designate the same initial BWP to BWP identifier no.0 and use the same. This confers an advantage of easily performing a contention-based random- access procedure because the base station can transmit a Random Access Response (RAR) message in the initial BWP, which all UEs can read, during the random access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured by respective BWP identifiers. When a plurality of BWPs is configured in one cell, the first active BWP may be used to indicate which BWP is to be activated and used first. For example, when a PCell or PSCell and a plurality of SCells are configured in the UE and a plurality of BWPs is configured in each PCell or PSCell or each SCell, if the PCell, the PSCell, or the SCell is activated, the UE may activate and use a first active BWP among the plurality of BWPs configured in the PCell, PSCell, or SCell. For example, the first active downlink BWP may be activated and used for the downlink, and the first active uplink BWP may be activated and used for the uplink.

Upon receiving an indication indicating activation of any SCell or a BWP of any activated Scell in a deactivated state or a dormant state or switching or activation from an inactive or dormant bandwidth to a normal BWP through an RRC message, MAC control information, or DCI of a PDCCH, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated SCell or the BWP to the dormant state or an indication indicating switching or activation to the dormant BWP through the RRC message, MAC control information, or the DCI Of the PDCCH, the UE may switch the BWP to the dormant BWP, activate the BWP, or make the BWP be the dormant state.

The switching to the dormant state or the dormant BWP or the activation of the dormant BWP may be the performance of an operation proposed in the dormant state in the disclosure. For example, an operation of measuring a channel for a downlink BWP (or a dormant BWP) and transmitting a report to the base station without monitoring a PDCCH may be performed. In another method, when the activated SCell or BWP is activated or switched to the normal BWP, a downlink BWP is switched and activated to a first active downlink BWP and an uplink BWP is switched and activated to a first active uplink BWP, and thus the dormant BWP may be configured as the first active downlink, the uplink BWP, or the default BWP. The default BWP may be differently configured to be UE-specific, and may be designated to and indicated by a BWP identifier among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP of which switching is indicated, and may be triggered through an RRC message, MAC control information (MAC control element), or L1 signaling (Downlink Control Information (DCI) of a PDCCH). The switching may be triggered through an indication of the BWP to be activated or switched to, and the BWP may be indicated by a BWP identifier (for example, 0, 1, 2, 3, or 4).

The reason why the default BWP is applied only to and used for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, the UE does not monitor the PDCCH and does not transmit a pilot signal in the dormant BWP of the activated SCell, and thus may save the battery compared to the normal BWP (or a BWP which is not the dormant BWP) of the activated SCell or compared to the case in which the normal BWP (or a BWP which is not the dormant BWP) of the activated SCell is activated. Further, unlike the case in which the SCell is deactivated, the UE reports a channel measurement, and thus the base station may rapidly activate the normal BWP of the activated SCell based on the measurement report or the measurement report of the dormant BWP of the activated SCell to allow the immediate use of carrier aggregation, thereby reducing a transmission delay.

The first active BWP activated from a dormant state (or a first active non-dormant BWP) may be a first active BWP activated from a dormant state, that is, BWP which the UE should switch or activate in the activated SCell, configured in the RRC message according to an indication in the case in which the UE receives an indication indicating switching of the BWP of the activated SCell from a dormant BWP to a normal BWP (or a BWP which is not the dormant BWP) through PDCCH DCI, a MAC CE, or an RRC message from the NR gNB, receives an indication indicating switching or transmission of the active BWP from a dormant BWP to a normal BWP, and receives an information indicating switching, transition, or activation of the active BSP from a dormant BWP to a normal BWP (for example, a first active BWP activated from a dormant state).

In the disclosure, switching a first BWP to a second BWP may mean activating the second BWP or deactivating the activated first BWP and activating the second BWP.

Further, the UE may configure a state transition timer through an RRC setup message of the RRC connection configuration, an RRCResume message of operation 625, or an RRCReconfiguration message of operation 645 to make the UE configure the state transition by itself even though the UE does not receive an indication from the base station through an RRC message, MAC control information, or DCI of a PDCCH. For example, when a cell inactivity timer (ScellDeactivationTimer) is configured for each Scell and the cell inactivity timer expires, the Scell may transition to the deactivated state. Alternatively, when a downlink (or uplink) BWP hibernation timer (DLBWPHibernationTimer or ULBWPHibernationTimer) is configured for each SCell or each SCell BWP, a cell hibernation timer (ScellHibernationTimer) may be configured for each SCell, and the cell hibernation timer or the downlink (or uplink) BWP hibernation timer expires, the Scell or the downlink (or uplink) BWP may be transitioned to a dormant state or switched to a dormant BWP. For example, when the cell hibernation timer or the downlink (uplink) BWP hibernation timer expires, the SCell or downlink (uplink) BWP in an activated state may be transitioned or switched to a dormant BWP, and the SCell or downlink (or uplink) BWP in a deactivated state or the dormant state may not be transitioned to a dormant state or a dormant BWP.

The BWP hibernation timer may start when an indication indicating switching or activating a BWP is received through an RRC message, a MAC CE, or PDCCH DCI or may stop when an indication indicating switching to a dormant BWP, an indication hibernation of the BWP, or an indication indicating activation of a dormant BWP is received through an RRC message, a MAC CE, or PDCCH DCI. Further, a dormant cell inactivity timer (dormantScellDeactivation-Timer) or a dormant or downlink (or uplink) dormant BWP inactivity timer (dormantDLDeactivationTimer or dorman-tULDeactivationTimer) may be configured for each Scell or downlink (uplink) BWP, and an Scell or downlink (uplink) dormant BWP in a dormant state may be transitioned to a deactivated state. When the dormant cell inactivity timer or the dormant or downlink (uplink) BWP inactivity timer expires, only the Scell or downlink (or uplink) BWP in a dormant state is transitioned to a deactivated state, but the Scell or BWP in an activated state or a deactivated state is not transitioned to the deactivated state.

Further, the dormant BWP hibernation timer may start when an indication indicating switching, hibernation, or activation of the dormant BWP is received through an RRC message, a MAC CE, or PDCCH DCI or may stop when an indication indicating deactivation or activation of the BWP or the SCell or an indication indicating activation of a normal BWP (for example, a BWP which is not a dormant BWP configured through RRC) is received through an RRC message, a MAC CE, or PDCCH DCI.

If the cell inactivity timer (ScellDeactivationTimer) (or the downlink (or uplink) BWP hibernation timer) and the cell hibernation timer (ScellHibernationTimer) (or the downlink (or uplink) dormant BWP inactivity timer) are configured together, the cell hibernation timer (ScellHiber-nationTimer) (or the downlink (or uplink) dormant BWP hibernation timer) is prioritized. For example, when the cell hibernation timer (ScellHibernationTimer) (or the downlink (or uplink) BWP hibernation timer) is configured, the cor-responding SCell or downlink (or uplink) BWP is not deactivated even though the cell inactivity timer (SCellDe-activationTimer) (or the downlink (or uplink) dormant BWP inactivity timer) expires. In other words, when the cell hibernation timer (or the downlink (or uplink) BWP hiber-nation timer) is configured, the cell or downlink (or uplink) BWP may be first transitioned from an activated state to a dormant state or switched to a dormant BWP, and then the cell or BWP which has been transitioned to the dormant state may be transitioned to the deactivated state due to expiration of the dormant cell or BWP inactivity timer. Accordingly, when the cell hibernation timer or the BWP hibernation timer is configured, the cell inactivity timer or the dormant BWP inactivity timer does not influence the state transition of the Scell or downlink (or uplink) BWP. The Scell or downlink (or uplink) BWP is not directly transitioned to the deactivated state if the cell hibernation timer or the BWP hibernation timer is configured even though the cell inac-tivity timer or the dormant BWP inactivity timer expires.

If the cell inactivity timer (or the downlink (or uplink) BWP hibernation timer) is not configured in the RRC message, the UE may consider the cell inactivity timer (or the downlink (or uplink) BWP hibernation timer) to be set to an infinite value.

Further, the base station may configure frequency mea-surement configuration information and frequency measure-ment gap information through an RRC setup message of the RRC connection configuration, the RRCResume message of operation 625, or the RRCReconfiguration message of operation 645, and the message may include information on a target for which a frequency is to be measured (measure-ment object). Further, in the RRCSetup message of the RRC connection configuration, the RRCResume message of operation 625, or the RRCReconfiguration message of operation 645, a function for reducing power consumption of the UE (power saving mode) may be configured, or configuration information such as a discontinuous reception (DRX) cycle, an offset, an on-duration interval (an interval in which the UE should monitor a PDCCH), or time infor-mation, time information indicating when the UE should monitor or search for a PDCCH from the base station before the on-duration interval during the DRX cycle, or short time information may be configured together with the function for reducing power consumption. If the function for reduc-ing power consumption of the UE is configured, the UE may configure a DRX cycle and search for a Wake-Up Signal (WUS) in an interval configured to monitor the PDCCH by the base station before the on-duration interval, and the base station may indicate whether to skip (or not perform) or perform monitoring of the PDCCH in the on-duration inter-val to the UE through DCI of the PDCCH of the WUS. The UE should always monitor the PDCCH in the on-duration interval, but the base station may allow the UE to reduce battery consumption by making the UE not monitor the PDCCH in the on-duration interval through the WUS.

As described above, when the RRC connection configu-ration is completed, the UE may configure a plurality of BWPs according to the indication configured through the RRC message. Further, in order to save a battery, the UE may activate one or a small number of BWPs among the plurality of configured BWPs. For example, the base station may indicate one BWP to be activated. The base station may indicate activation of the BWP through the RRC message, MAC control information (MAC CE), or L1 signaling (PHY layer control signal such as DCI of the PDCCH) to indicate switching from the initial access BWP to a new BWP. In another method, the UE may define new bitmap information through DCI of the PDCCH and indicate activation, hiber-nation, or deactivation. In another method, whether to acti-vate the normal BWP (for example, the first active BWP that is activated from the dormant state), activate the dormant BWP, switch the dormant BWP, or switch the BWP may be indicated by the bitmap. Since there are many new accessing users in the initial access BWP, it may be more advantageous for scheduling to allocate a new BWP and separately man-age the connected users. This is because the initial access BWP may be shared and used by all UEs in common rather than being configured in a UE-specific manner. Further, the default BWP may be dynamically indicated through the MAC control information, L1 signaling, or system informa-tion in order to reduce signaling overhead.

Hereinafter, the disclosure newly proposes the dormant BWP in the next-generation mobile communication system and proposes in detail the UE operation in each BWP when each BWP is transitioned or switched.

Figure 7:
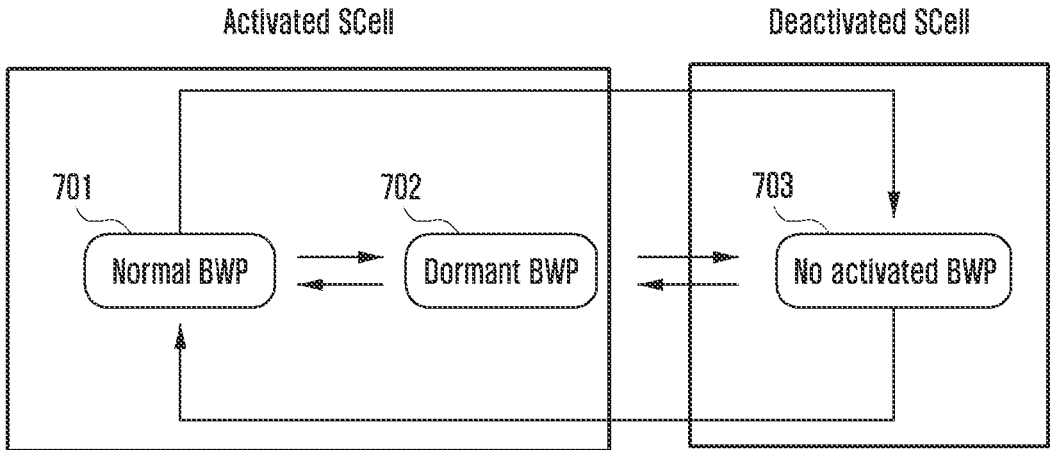
FIG. 7 illustrates a procedure of transitioning a state for each BWP or switching a BWP according to an embodiment of the disclosure.

FIG. 7 illustrates a procedure of transitioning a state for each BWP or switching a BWP according to embodiment of the disclosure.

Referring to FIG. 7, the BWP of each cell (for example, SCell) of the UE may be activated to a normal BWP as indicated by reference numeral 701, activated to a dormant BWP as indicated by reference numeral 702, or deactivated as indicated by reference numeral 703, and the normal BWP or the dormant BWP may be activated or deactivated through an indication by configuration information of the RRC message, MAC control information, or DCI of the PDCCH. In another method, the BWP of each cell of the UE may have an activated state 701, a deactivated state 703, or a dormant state 702, and may perform state transition due to an indication by configuration information of the RRC message, MAC control information, or DCI of the PDCCH.

The state transition operation for each BWP of the cell (activation, deactivation, or hibernation) or the operation of activating the normal BWP, activating the dormant BWP, activating the first active BWP activated from the dormant state, or deactivating the normal BWP or the dormant BWP proposed in the disclosure may be performed by one indication or configuration among the following cases.

When the state of the BWP of the SCell is configured through the RRC message, the BWP of each SCell is configured through RRC message, the dormant BWP is configured in the SCell, or the first active BWP is configured as the dormant BWP, the UE may start the SCell starts through switching or activation to the dormant BWP and perform the operation in the dormant BWP.

The case in which Scell activation or deactivation, or dormant MAC CEs are received The case in which a MAC CE indicating activation or deactivation of the normal BWP or the first active BWP or the dormant BWP from the dormant state is received The case in which DCI of a PDCCH indicating activation, deactivation, or switching of the normal BWP or the first active BWP or the dormant BWP from the dormant state is received The case in which a cell hibernation timer is not configured in an activated SCell and a configured cell inactivity timer expires The case in which a BWP hibernation timer is not configured in the active BWP and a configured BWP inactivity timer (for example, a bwpDeactivatedTimer) expires The case in which a cell hibernation timer configured in an activated SCell expires The case in which a BWP hibernation timer configured in an active BWP expires The case in which a dormant state SCell inactivity timer configured in a dormant state SCell expires The case in which a dormant BWP inactivity timer (dormantBWPDeactivatedTimer) configured in the dormant BWP expires Further, the state transition operation or the dormant BWP operation method proposed in the disclosure have the following features.

No dormant BWP may be configured in the Spcell (PCell or PSCell) (or downlink BWP or uplink BWP of the cell) but only a normal BWP is configured therein and is always in an activated state. The SpCell performs synchronization and transmits/receives a primary control signal, and thus if the BWP of the SpCell is dormant or inactive or operated as the dormant BWP, the connection with the NR base station is released, so that the SCell should be always maintained in the activated state.

If a PUCCH is configured in spite of the SCell or the BWP of the SCell, a dormant state or a dormant BWP cannot be configured. The Scell should be in the activated state or use a normal BWP after activating the same since there may be another cell which should transmit a feedback of HARQ ACK/NACK through the PUCCH.

Due to such a characteristic, the cell inactivity timer (ScellDeactivationTimer) or the BWP hibernation timer may not be applied to the SpCell or the BWP of the SpCell and the SCell or the BWP of the SCell in which the PUCCH is configured, and may be driven only for the other SCells.

The cell or BWP hibernation timer (ScellHibernationTimer) is prioritized than the cell or BWP inactivity timer (ScellDeactivationTimer). If one value is set as a timer value through the RRC message, the same value may be applied to all cells. In another method, the base station may apply different timer values for SCells or BWPs in consideration of a characteristic of each Scell or BWP.

If the SCell or BWP is not indicated as being active or dormant through the RRC message, the SCell or BWP may fundamentally operate in the deactivated state initially.

In the disclosure, the uplink may indicate an uplink BWP and the downlink may indicate a downlink BWP. This is because only one active or dormant BWP can be operated for each uplink or downlink.

Hereinafter, the disclosure proposes in detail a method of operating the state transition in units of BWPs (bandwidth part-level) proposed in the disclosure to rapidly activate the carrier aggregation and save the battery of the UE.

In the disclosure, the BWP may be configured for each cell in the RRCSetup message, the RRCReconfiguration message, or the RRCResume message as described with reference to FIG. 6. The RRC message may include configuration information for a PCell, a Pscell, or a plurality of SCells and may configure a plurality of BWPs for each cell (PCell, Pscell, or SCell). When the plurality of BWPs are configured for each cell in the RRC message, a plurality of BWPs to be used in the downlink of each cell may be configured. In the case of an FDD system, the base station may configure a plurality of BWPs to be used in the uplink of each cell separately from the downlink BWPs. In the case of a TDD system, the base station may configure a plurality of BWPs to be used in common for the downlink and the uplink of each cell.

In a first method of the information configuration method for configuring the BWP of each cell (PCell, PSCell, or SCell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, the dormant BWP may be indicated using a BWP identifier.

Downlink BWP configuration information of each cell
   Initial downlink BWP configuration information
   A plurality of pieces of BWP configuration information and BWP IDs corresponding to the respective BWPs
   Downlink initial configuration information of the cell (for example, activated state, dormant state, or deactivated state)
   A BWP identifier indicating a first active downlink BWP
   A BWP identifier indicating a default BWP
   A BWP identifier indicating a dormant BWP or a 1-bit indicator indicating a dormant BWP for each BWP in the BWP configuration information
   BWP inactivity timer configuration and a timer value Uplink BWP configuration information of each cell Initial uplink BWP configuration information A plurality of pieces of BWP configuration information and BWP IDs corresponding to the respective BWPs Uplink initial configuration information of the cell (for example, activated state, dormant state, or deactivated state)

A BWP identifier indicating a first active uplink BWP

A BWP identifier indicating a dormant BWP or a 1-bit indicator indicating a dormant BWP for each BWP in the BWP configuration information As another method of the information configuration method of configuring the BWP of each cell (PCell, PSCell, or SCell), in a second method, the base station may separate configuration information by not configuring configuration information (for example, a search space, PDCCH transmission resources, and periodicity) required to read a PDCCH for a BWP corresponding to a dormant BWP may not be configured (in another method, periodicity may be configured to be very long along with other configuration information) and configuring configuration information (for example, a search space, PDCCH transmission resources, and periodicity) required to read a PDCCH for a normal BWP. This is because the dormant BWP is a BWP to reduce battery consumption of the UE by not reading a PDCCH and may measure a channel and reporting a channel measurement result to the PCell so as to rapidly activate the BWP or the cell, thereby promptly allocating uplink or downlink transmission resources. Accordingly, in the disclosure, the dormant BWP may be a BWP in which configuration information (for example, a search space, PDCCH transmission resources, and periodicity) for PDCCH monitoring is not configured or indicate a BWP indicated by a dormant BWP identifier or a BWP configured to be monitored with very long periodicity even though configuration information for PDCCH monitoring is configured therein.

In another method, the dormant BWP in the disclosure may indicate a BWP in which PDCCH transmission resources, periodicity, and the like are not configured in configuration information for PDCCH monitoring and thus the PDCCH monitoring is not performed in a cell in which the dormant BWP is configured but search space information or cross-carrier scheduling configuration information is configured and thus switching or an indication for the dormant BWP is received in another cell through cross-carrier scheduling. Since data transmission and reception are not possible in the dormant BWP, only PDCCH configuration information (PDCCH-config) is configured for the dormant BWP (or first BWP) (for example, only search space information is configured). On the other hand, PDCCH monitoring should be performed in a normal BWP (or a second BWP) which is not the dormant BWP and also data transmission/reception should be possible, and thus PDCCH configuration information (for example, CORESET configuration information, search space configuration information, PDCCH transmission resources, or periodicity) and PDSCH configuration information, PUSCH configuration information, or random access-related configuration information may be further configured.

Accordingly, the uplink or downlink normal BWP should be configured for each cell as described above, but the dormant BWP may or may not be configured for each cell. The configuration may depend on base station implementation to suit the purpose. Further, a first active BWP, a default BWP, or an initial BWP may be configured as the dormant BWP according to base station implementation.

In the dormant BWP, the UE cannot exchange data with the base station, does not monitor a PDCCH to identify an indication of the base station, does not transmit a pilot signal, but measures a channel, and reports a measurement result for the measured frequency/cell/channel periodically or when an event is generated according to a configuration of the base station. Accordingly, the UE does not monitor the PDCCH and not transmit the pilot signal in the dormant BWP, thereby reducing a battery compared to the active mode. Unlike the deactivated mode, the UE transmits a channel measurement report, so that the base station may rapidly activate the cell in which the dormant BWP is configured based on the measurement report of the dormant BWP to use carrier aggregation. In the disclosure, the dormant BWP may be configured in the downlink BWP configuration information and used only for the downlink BWP.

In the disclosure, the UE operation for the dormant BWP or the UE operation for the activated SCell when the dormant BWP is activated is described below.

When the UE receives an indication indicating operation as or activation to a dormant BWP for a serving cell (PCell or SCell) from the SpCell, receives an indication indicating hibernating a BWP (for example, a downlink BWP) of a serving cell (for example, SCell) or the serving cell (for example, SCell) or an indication indicating activation of a dormant BWP through PDCCH DCI (L1 control signal), a MAC CE, or an RRC message, receives an indication indicating switching of a BWP (for example, a downlink BWP) to a dormant BWP through PDCCH DCI (L1 control signal), a MAC CE, or an RRC message (when the indication is received through PDCCH L1 control signal, the indication may be received by the PDCCH of its own cell through self-scheduling or received by the PDCCH of the PCell through cross-carrier scheduling), a BWP hibernation timer is configured and expires, an activated BWP of the activated Scell is a dormant BWP, or the activated BWP of the activated SCell is not a normal BWP, one or a plurality of operations among the following operations may be performed.

The uplink BWP or the downlink BWP is switched to a BWP (for example, a dormant BWP) configured in RRC and the BWP is activated and hibernated.

A cell inactivity timer configured or run in the cell or BWP is suspended.

A BWP hibernation timer is suspended when the BWP hibernation timer is configured in the BWP of the cell.

A dormant BWP inactivity timer starts or restarts in the BWP of the cell.

The BWP inactivity timer configured for the BWP of the cell is suspended. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

Periodic uplink transmission resources (configured uplink grant type 1 configured in RRC) configured in the BWP of the cell may be suspended. The term "suspend" means that transmission resource configuration information configured in the RRC message is stored in the UE but is not used any more. The proposed method, that is, the operation of suspending the periodic uplink transmission resources (configured uplink grant type 1), may be performed only when the BWP is transitioned from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

HARQ buffers configured in the uplink or downlink BWP are all emptied.

The UE does not transmit an SRS for the uplink BWP of the cell.

The UE measures a channel (CSI, CQI, PMI, RI, PTI, CRI, or the like) for the downlink in the BWP of the cell according to the configuration of the base station and reports the measurement. For example, the UE may periodically report the channel or frequency measurement.

The UE does not transmit uplink data through a UL-SCH in the BWP of the cell.

A random access procedure is not performed for the BWP of the cell.

The UE does not monitor a PDCCH in the BWP of the cell.

The UE does not monitor a PDCCH in the BWP of the cell. However, in the case of cross-scheduling, an indication may be received by monitoring a PDCCH for the cell (for example, SCell) in the scheduled cell (for example, PCell).

PUCCH or SPUCCH transmission is not performed in the BWP of the cell.

The downlink BWP may be hibernated, and a channel measurement may be performed and reported. Further, the uplink BWP of the cell may be deactivated and not used. This is because the channel is measured only for the downlink BWP in the dormant state Scell and the measurement result is reported to the uplink BWP of the Spcell (PCell or PSCell) or the SCell in which there is a PUCCH.

If an indication indicating activation or switching to the dormant BWP for the downlink is made or an indication indicating hibernation of the BWP is made, a random access procedure is performed without cancelling the same. This is because a preamble is transmitted through the uplink and a random access response is received through the downlink of the PCell when the random access procedure is performed in the SCell. Accordingly, even though the downlink BWP is hibernated or switched to the dormant BWP, a problem does not occur.

In the disclosure, the UE operation when the normal BWP (active BWP) of the activated SCell is activated or when a BWP which is not the dormant BWP is activated is described below.

If an indication indicating activation of a normal BWP (for example, a downlink BWP) of the current cell (PCell or SCell) or a normal BWP which is not a dormant BWP or an indication indicating activation of the cell is received through DCI (L1 control signal) of a PDCCH, a MAC CE, or an RRC message, if an indication indicating switching of a BWP (for example, a downlink BWP) to an active BWP (or a BWP which is not the dormant BWP) is received through DCI (L1 control signal) of a PDCCH, a MAC CE, or an RRC message, if the activated BWP of the current activated cell is a normal BWP, or if the activated BW of the current activated cell is not a dormant BWP (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed. One or a plurality of the following operations may be performed.

Switching and activation to the indicated uplink or downlink BWP is performed. Alternatively, the uplink or downlink BWP is switched to a predetermined BWP (for example, uplink or uplink first active BWP) and the BWP is activated.

A Sounding Reference Signal (SRS) is transmitted to allow the MgNB to measure a channel for the uplink in the activated BWP. For example, the SRS may be periodically transmitted.

If a PUCCH is configured in the activated BWP, the PUCCH is transmitted.

A BWP or cell inactivity timer starts or restarts. In another method, the BWP or cell inactivity timer may start or restart only when a BWP or cell hibernation timer is not configured. If the BWP or cell hibernation timer can be configured through the RRC message, the BWP or the cell may be hibernated when the timer expires. For example, the BWP or cell inactivity timer may start or restart only in the hibernated BWP or cell.

When there are suspended type 1 configuration transmission resources, stored type 1 configuration transmission resources may be initialized as original and used. The type 1 configuration transmission resources are periodic (uplink or downlink) transmission resources pre-allocated through an RRC message, which can be used after being activated through the RRC message.

A PHR is triggered for the BWP.

The UE may report a channel measurement result (CSI, CQI, PMI, RI, PTI, or CRI) for the downlink in the activated BWP according to a configuration of the base station.

A PDCCH is monitored to read an indication of the base station in the activated BWP.

A PDCCH is monitored to read cross scheduling in the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP, the BWP hibernation timer starts or restarts for the BWP.

In the disclosure, the UE operation when a deactivated BWP, a BWP, or an SCell is deactivated is described below.

If an indication indicating deactivation of a BWP (for example, a downlink BWP) of the current cell (PCell or SCell) is received through DCI (L1 control signal) of a PDCCH, a MAC CE, or an RRC message, if an indication indicating deactivation of a BWP (for example, a downlink BWP) or an indication indicating switching to an inactive BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), if the BWP or cell inactivity timer expires in the cell, if the activated SCell is deactivated, or if the BWP of the SCell is deactivated, one or a plurality of the following operations may be performed.

The uplink or downlink BWP of the cell or the indicated uplink or downlink BWP may be deactivated.

The UE suspends a BWP inactivity timer (for example, an inactivity timer for the downlink BWP) configured and running in the cell or the BWP.

Periodic downlink transmission resources (DL SPS or configured downlink assignment) or periodic uplink transmission resources (UL SPS or configured uplink grant type 2) configured in the cell or BPW may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. The operation of releasing the periodic transmission resources may be performed only when the SCell transitions from the activated state to the deactivated state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the cell or BWP may be suspended. The term "suspend" means that transmission resource configuration information configured through the RRC message is stored in the UE but is not used any more. The periodic transmission resources may be called type 1 configuration transmission resources. The operation of releasing the periodic transmission resources may be performed only when the SCell transitions from the activated state to the deactivated state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The UE does not transmit an SRS for the cell or BWP.

The UE neither measures a channel (CSI, CQI, PMI, RI, PTI, or CRI) for the downlink nor reports the channel measurement for the cell or BWP.

Uplink data is not transmitted through a UL-SCH in the cell or BWP.

A random access procedure is not performed for the cell or BWP.

The UE does not monitor a PDCCH in the cell or BWP.

The UE does not monitor a PDCCH for the cell or BWP. Further, in the case of cross-scheduling, a PDCCH for the cell is not monitored in the scheduled cell.

A PUCCH or SPUCCH is not transmitted in the cell or BWP.

In various embodiments of the disclosure, the activated state, the deactivated state, or the dormant state are operated and transition or switching of the cell or BWP is performed in units of BWPs. Further, in various embodiments of the disclosure, when state transition or switching in units of BWPs is performed, a BWP (downlink BWP or uplink BWP) of which state transition or switching is indicated is state-transitioned or switched according to an indication of state transition or switching. For example, if a BWP (a downlink or uplink BWP) is transitioned from an activated state to a dormant state or switched to a dormant BWP (or activated), the BWP may be transitioned to the dormant state or switched to the dormant BWP (or activated).

In the disclosure, BWP switching means that, if BWP switching is indicated with a BWP identifier through PDCCH DCI while downlink assignment is allocated, the downlink BWP is switched to a BWP indicated by the BWP identifier, and if BWP switching is indicated with a BWP identifier through PDCCH DCI while a UL grant is allocated, the uplink BWP is switched to a BWP indicated by the BWP identifier. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, the disclosure describes detailed embodiments for expanding and applying the content proposed in the disclosure.

Figure 8:
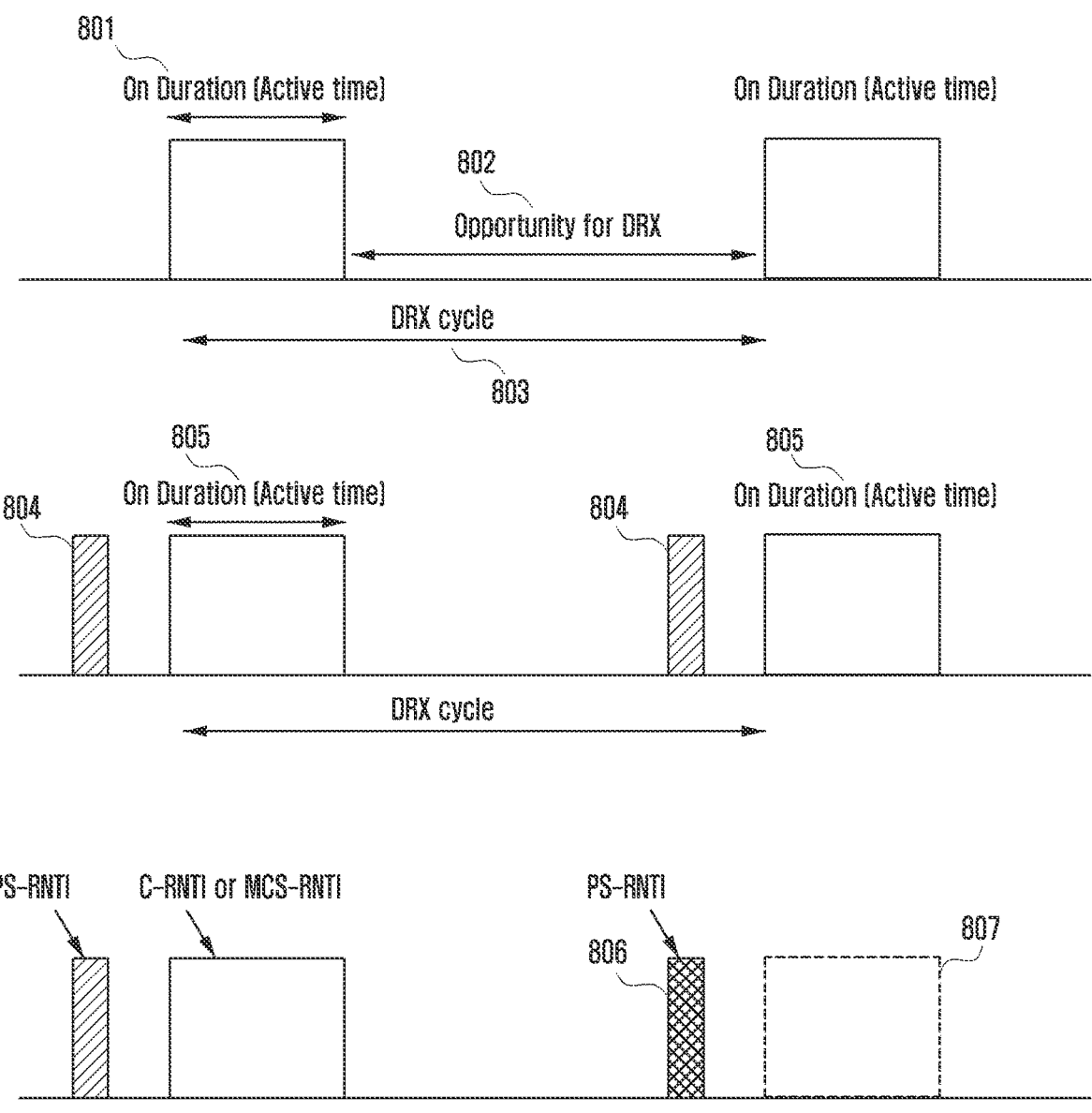
FIG. 8 illustrates a method of configuring or operating DRX to reduce a UE battery according to an embodiment of the disclosure.

FIG. 8 illustrates a method of configuring or operating DRX to reduce a UE battery according to an embodiment of the disclosure.

Referring to FIG. 8, the base station may configure a DRX function such as a DRX cycle, a start point, an offset, or on-duration (active time) in the PCell, the SCell, or the PSCell for the UE through the RRC message as illustrated in FIG. 6. Various embodiments of the disclosure consider the configuration of the DRX function in the PCell, the SpCell, or the PSCell.

As described above, when the DRX function is configured in the PCell (SpCell or PSCell), the UE may consider a DRX cycle 803, a DRX start time, or an offset to apply the DRX function. When the DRX function is applied, the UE may monitor a PDCCH or DCI of the PDCCH which can be received from the base station in the PCell only within the active time 801 (on-duration) of the DRX. Further, the UE does not need to monitor the PDCCH or the DCI of the PDCCH outside the active time 802 of the DRX function, thereby reducing UE battery consumption.

Referring to FIG. 6, the base station may configure a power saving function (power saving mode) in the UE through the RRC message in order to further reduce battery consumption of the UE. When the power saving function is configured together with the DRX function, the UE may monitor, even outside the active time, the PDCCH during a short time interval 804 configured through RRC before the active time 801 in which the UE should monitor the PDCCH in the DRX function. Further, the UE may monitor and receive a Wake Up Signal (WUS) outside the active time. The base station may indicate whether the UE should monitor the PDCCH or not in the next active time 805 or 807 through a bit of the DCI of the PDCCH of the WUS.

For example, the UE in which the power saving function or the DRX function is configured may monitor the WUS during the short time interval 804 configured in the RRC message before every active time 805. If a bit value of the DCI of the PDCCH for the next active time 805 or 807 is 0 (or 1) in the WUS, it may indicate that the UE does not monitor the PDCCH during the next active time 807 or indicate that the UE does not monitor the PDCCH by not running a timer corresponding to the next active time in the MAC layer device. If the bit value of the DCI of the PDCCH for the next active time 805 or 807 is 1 (or 0) in the received WUS, it may indicate that the UE monitors the PDCCH within the next active time 805 or may indicate that the UE monitors the PDCCH by running a timer corresponding to the next active time in the MAC layer device.

Further, the UE may not monitor the WUS or the PDCCH for searching for the WUS within the active time.

When monitoring the WUS during the short time interval 804 configured in the RRC message before every active time 805, the UE in which the power saving function or the DRX function is configured may search for a signal by identifying the PDCCH through a first RNTI (for example, a PS-RNTI) 806. The first RNTI (for example, the PS-RNTI) 806 may be configured in a plurality of UEs, and the base station may indicate simultaneously, to a plurality of UEs, whether to monitor the PDCCH within the next active time through the first RNTI (for example, PS-RNTI) 806.

When monitoring and searching for the PDCCH in the active time 805, the UE in which the power saving function or the DRX function is configured may search for a signal based on a second RNTI (for example, a C-RNTI), a third RNTI (for example, an MCS-C-RNTI), or a fourth RNTI (SPS-C-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI) may be used to indicate periodic transmission resources of the UE.

Figure 9:
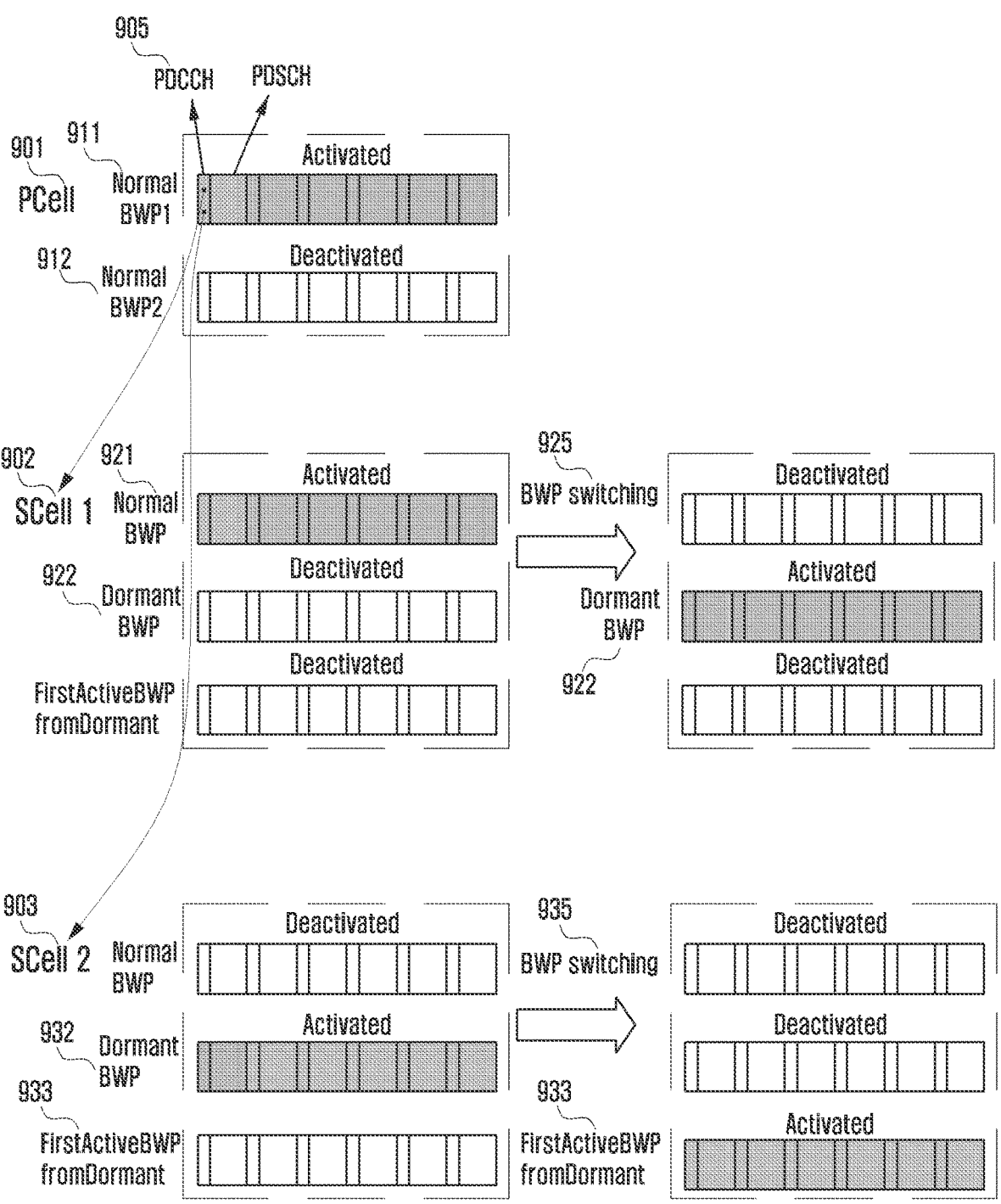
FIG. 9 illustrates the concept of a method of operating a dormant BWP in an activated SCell according to an embodiment of the disclosure.

FIG. 9 illustrates the concept of a method of operating a dormant BWP in an activated SCell according to an embodiment of the disclosure.

The base station may configure a plurality of SCells in the UE for carrier aggregation through the RRC message, allocate each SCell identifier, and configure a dormant BWP for each SCell as illustrated in FIG. 6. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value).

Referring to FIG. 9, the base station may define a new bitmap for PDCCH DCI transmitted in the PCell, map bit values such that each bit value of the bitmap indicates each SCell identifier value or each SCell group identifier value, and define each bit value to indicate whether to switch the SCell corresponding to the bit or SCells belonging to the SCell group to a dormant BWP or activate the dormant BWP. Further, the base station may indicate whether to switch the SCell corresponding to the bit or SCells belonging to the SCell group from a dormant BWP to a normal BWP (for example, a first active BWP activated from a dormant state) or activate the normal BWP (for example, first active BWP activated from a dormant state).

Referring to FIG. 9, PCell 901 may include a first normal BWP 911 and a second normal BWP 912. The UE may receive PDCCH DCI in a PCell 901, read the DCI in 905, and then identify whether there is a bitmap including an indication for BWPs of SCells or SCell groups (for example, switching or activation to the dormant BWP or switching or activation to the normal BWP) and, if there is the bitmap, switch or activate the BWP according to the bit value for the SCell indicated by each bit of the bitmap or SCells 902 and 903 belonging to the SCell group. For example, if the bit of the bitmap indicates the first SCell 902 (or a first SCell identifier) or an SCell group including the first SCell (or an SCell group identifier) including the first SCell and the bit value is 0 (or 1), the UE may activate a BWP 921 to a dormant BWP 922 for the first SCell 902 and switch the current BWP to the dormant BWP 922 or, if the current BWP is not a dormant BWP, switch or activate the currently activated BWP 921 to the dormant BWP 922 as indicated by reference numeral 925.

Referring to FIG. 9, after receiving PDCCH DCI in the PCell 901, the UE may identify whether there is a bitmap including an indication for BWPs of the SCell or SCell groups (for example, switching or activation to a dormant BWP or switching or activation to a normal BWP) while reading the DCI. When there is the bitmap, the UE may switch or activate the BWP according to the bit value for the SCell indicated by each bit of the bitmap or SCells 902 and 903 belonging to the SCell group. For example, when the bit of the bitmap indicates the second SCell 903 (or a second SCell identifier) or an SCell group (or an SCell group identifier) including the second SCell, and the bit value is 1 (or 0), the UE may switch or activate a BWP of the second SCell 903 to a BWP configured through an RRC message (for example, a first active BWP 933 activated from a dormant state) as indicated by reference numeral 935 if the current activated BWP for the second SCell 903 is a dormant BWP 932, the current activated BWP is not a normal BWP, or the current BWP (or cell) is activated and is activated to the dormant BWP 932 (or activated to a BWP which is not the normal BWP). When the bit value is 1 (or 0) and thus an SCell or SCells belonging to an SCell group indicated by the bit should be switched or activated to a dormant BWP, the SCell or SCells belonging to the SCell group may not apply the bit value, may ignore the bit value, or may not read the bit value if the state of the SCell is in a deactivated state or the state of the SCell is in an activated state and an activated BWP is not a dormant BWP (or is a normal BWP).

Figure 10:
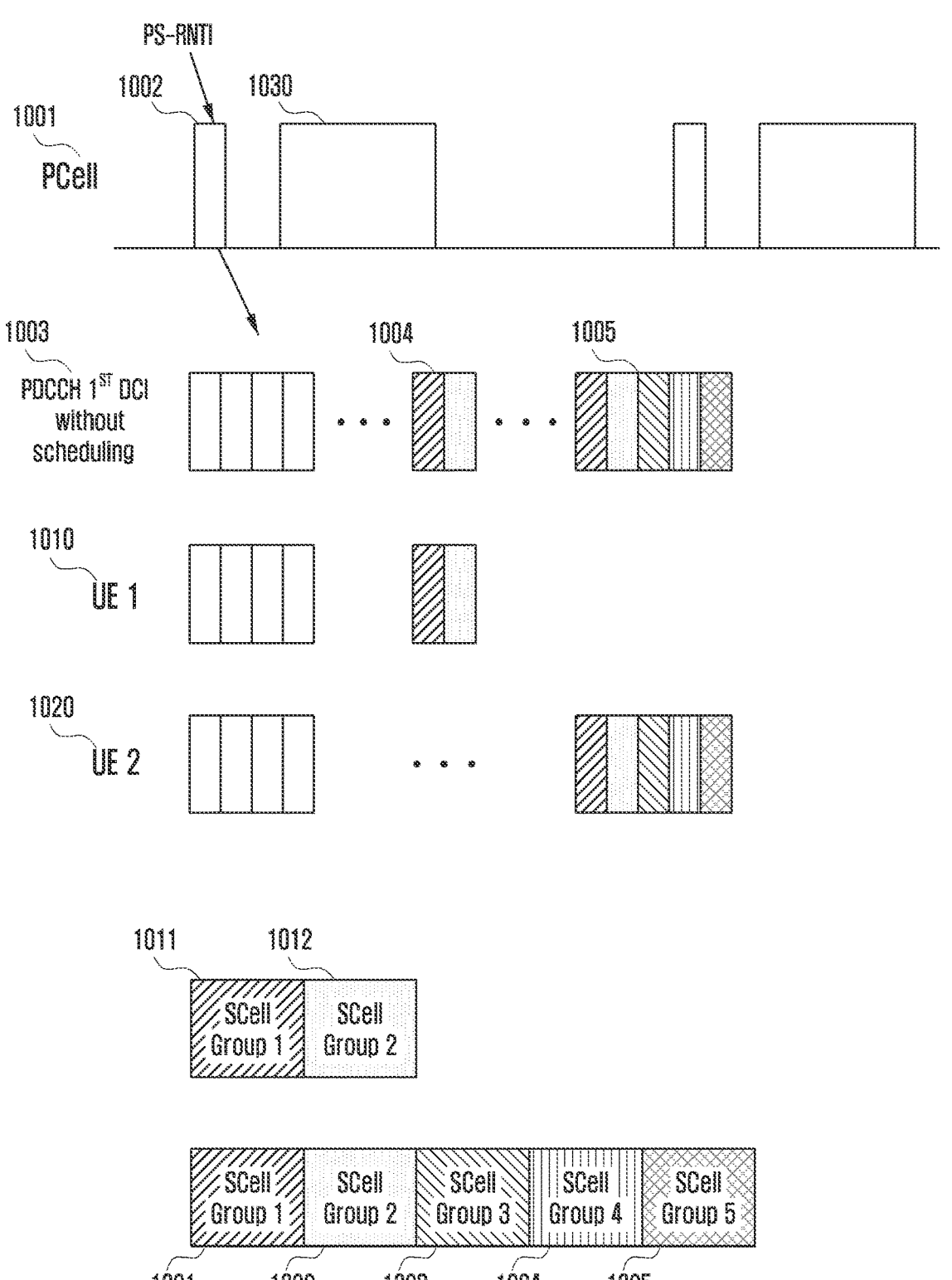
FIG. 10 illustrates a first embodiment that embodies the conception of the method of operating the dormant BWP in the activated SCell described with reference to FIG. 9 according to an embodiment of the disclosure.

FIG. 10 illustrates embodiment 1 that embodies the conception of the method of operating the dormant BWP in the activated SCell described with reference to FIG. 9 according to an embodiment of the disclosure.

In embodiment 1, the base station may configure a plurality of SCells in the UE for carrier aggregation through the RRC message as described in FIG. 6, allocate each SCell, configure a dormant BWP for each SCell, and may not configure a dormant BWP for some SCells. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). For embodiment 1 of the disclosure or in order to apply the same, the configured SCell groups or SCell group identifier may be referred to as first SCell groups. The first SCell groups may indicate group identifiers to which the operation indicated by a DCI bitmap value received after monitoring of PDCCH DCI by the UE within a short time (out of active time) or a time outside an active time is applied in embodiment 1-1.

Referring to FIG. 10, the base station may configure a power saving function or a DRX function in each of a plurality of UEs through the RRC message as described in FIG. 6. Further, the base station may configure, in each UE, time information for a short time 1002 in which a first DCI format or a WUS should be detected before an active time 1030 of the DRX cycle or configuration information for the first DCI format in a PCell or an SpCell 1001 through the RRC message. When the UE detects the first DCI format in the PCell or the SpCell during the short time 1002, the base station may configure the location of a bitmap including an indication for the first SCell groups of each UE in the first DCI format through the RRC message. Further, the base station may configure a search space of PDCCH monitoring or a UE identifier (for example, PS-RNTI) for searching for the first DCI format during the short time 1002 in the UE through the RRC message. When the SCell is switched and activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the base station may configure the power saving function or the DRX function in a plurality of UEs and transmit the first DCI format through PDCCH transmission resources within the short time 1002 configured before the next active time 1030 of the DRX cycle configured in the UEs as indicated by reference numeral 1003. The first DCI format may include bitmaps 1004 and 1005 including indication information for dormant BWPs of the first SCell groups configured in each of the plurality of UEs.

A first UE 1010 applying information configured through the RRC message may monitor the PDCCH based on the PS-RNTI which is an identifier within the short time 1002 configured before the next active time 1030 of the DRX cycle and search for the first DCI format from the base station in the search space as indicated by reference numeral 1003. If the first DCI format 1003 is detected, the first UE may read the bitmap 1004 including indication information for the dormant BWPs of the first SCell groups of the first UE through time information or location information configured through the RRC message in the first DCI format 1003. The length of the bitmap may be configured to be the same as the number of first SCell groups configured in the first UE or maximally configured to a predetermined number (for example, 5). Further, each bit value of the bitmap may be mapped to or indicated by each first SCell group in an ascending order of SCell group identifier values of the first SCell groups configured in the first UE from the right bit (for example, from the Least Significant Bit (LSB)) of the bitmap. In another method, each bit value of the bitmap may be mapped to or indicated by each first SCell group in a descending order of SCell group identifier values of the first SCell groups configured in the first UE from the right bit (for example, from the Least Significant Bit (LSB)) of the bitmap. In another method, each bit value of the bitmap may be mapped to or indicated by each first SCell group in an ascending order of SCell group identifier values of the first SCell groups configured in the first UE from the left bit (for example, from the Most Significant Bit (MSB)) of the bitmap. In another method, each bit value of the bitmap may be mapped to or indicated by each first SCell group in a descending order of SCell group identifier values of the first SCell groups configured in the first UE from the left bit (for example, from the Most Significant Bit (MSB)) of the bitmap.

When bit values of the bitmaps 1011 and 1012 are 0, the bit value of 0 may indicate switching to a dormant BWP or activation of a dormant BWP for each activated SCell among SCells belonging to the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the first SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells belonging to the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

A second UE 1020 applying information configured through the RRC message may monitor the PDCCH based on the PS-RNTI which is an identifier within the short time 1002 configured before the next active time 1030 of the DRX cycle and detect the first DCI format from the base station in the search space as indicated by reference numeral 1003. If the first DCI format 1003 is detected, the second UE may read the bitmap 1005 including indication information for the dormant BWPs of the first SCell groups of the first UE through time information or location information configured through the RRC message in the first DCI format 1003. The length of the bitmap may be configured to be the same as the number of first SCell groups configured in the second UE or maximally configured to a predetermined number (for example, 5). Further, each bit value of the bitmap may be mapped to or indicated by each first SCell group in an ascending order of SCell group identifier values of the first SCell groups configured in the second UE from the right bit (for example, from the Least Significant Bit (LSB)) of the bitmap. In another method, each bit value of the bitmap may be mapped to or indicated by each first SCell group in a descending order of SCell group identifier values of the first SCell groups configured in the second UE from the right bit (for example, from the Least Significant Bit (LSB)) of the bitmap. In another method, each bit value of the bitmap may be mapped to or indicated by each first SCell group in an ascending order of SCell group identifier values of the first SCell groups configured in the second UE from the left bit (for example, from the Most Significant Bit (MSB)) of the bitmap. In another method, each bit value of the bitmap may be mapped to or indicated by each first SCell group in a descending order of SCell group identifier values of the first SCell groups configured in the second UE from the left bit (for example, from the Most Significant Bit (MSB)) of the bitmap.

When bit values of the bitmaps 1021, 1022, 1023, 1024, and 1025 are 0, the bit value of 0 may indicate switching to a dormant BWP or activation of a dormant BWP for each activated SCell among SCells belonging to the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the first SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

Embodiment 1 of the disclosure is realized as described above, and the first DCI format of the PDCCH proposed by embodiment 1 may be used within the short time and is not accompanied by downlink transmission resources (for example, PDSCH) or uplink transmission resources (for example, PUSCH) for the UE. Accordingly, the UE may receive the first DCI format of the PDCCH and may not transmit ACK or NACK information thereof (for example, HARQ ACK or NACK) in embodiment 1.

Embodiment 1 proposed in the disclosure may be implemented in more detail as described below.

In embodiment 1 of the disclosure, a hibernation or non-hibernation operation for SCells of the UE and an operation for a PDCCH monitoring indicator are described below.

The UE in which the DRX function or the power saving function for the PCell or SpCell is configured may monitor the PDCCH within the short time interval 804 of FIG. 8 or 1002 of FIG. 10 and may follow the operation described below. Further, the UE may monitor the PDCCH in an activated downlink BWP of the PCell or SpCell.

The UE may monitor the PDCCH and search for the first DCI format (for example, DCI 2-6 format) or the WUS by the PS-RNTI.

The UE may receive a configuration of a plurality of search spaces and apply the same in order to monitor the PDCCH for searching for the first DCI format (for example, formats 2-6) or the WUS in the activated downlink BWP of the PCell or SpCell according to a common search area configured through the RRC message.

The size of data (payload) of the first DCI format may be determined as a size configured through RRC (for example, SizeDCI_2-6).

When the WUS or the first DCI format is detected, the UE may identify the location of a PDCCH monitoring indicator of the WUS configured through RRC and, if a value of the PDCCH monitoring indicator is 0, does not start a timer for the active time (or on-duration) of the next longer DRX cycle so as not to monitor the PDCCH within the active time. If the value of the PDCCH monitoring indicator is 1, the UE may monitor the PDCCH within the active time by starting the timer for the active time (or on-duration) of the next longer DRX cycle.

When the WUS or the first DCI format is detected, the UE may identify the location of the WUS configured through RRC and, if a plurality of first SCell groups for embodiment 1 of the disclosure are configured through the RRC message, read the size of a bitmap corresponding to the number of first SCells groups.

The location of the bitmap for embodiment 1 of the disclosure may be right behind the PDCCH monitoring indicator.

The size of the bitmap for embodiment 1 of the disclosure may be the same as the number of first SCell groups including the SCells configured in the UE through the RRC message or in which the SCells are configured. Each bit of the bitmap may correspond to or mapped to each first SCell group (or first SCell group identifier or SCells belonging to the first SCell group) in an ascending order of SCell group identifier values of the configured first SCell group. In another method, each bit of the bitmap may correspond to or mapped to each first SCell group (or first SCell group identifier or SCells belonging to the first SCell group) in a descending order of SCell group identifier values of the configured first SCell group. In another method, each bit of the bitmap may correspond to or may be mapped to each first SCell group (or first SCell group identifier or SCells belonging to the first SCell group) in an ascending order of SCell group identifier values of the first SCell group sequentially from the right bit (from the Least Significant Bit (LSB)) or the left bit (from the Most Significant Bit (MSB)). In another method, each bit of the bitmap may correspond to or may be mapped to each first SCell group (or first SCell group identifier or SCells belonging to the first SCell group) in a descending order of SCell group identifier values of the first SCell group sequentially from the right bit (from the Least Significant Bit (LSB)) or the left bit (from the Most Significant Bit (MSB)).

When the bit value of the bitmap is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells belonging to the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the first SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

The short time interval 804 of FIG. 8 or 1002 of FIG. 10 within which the PDCCH should be monitored to detect the first DCI format or the WUS may be calculated or indicated by an offset configured in the RRC message, and the first DCI format or the WUS may be detected within a short time before the active time of the DRX cycle.

The first DCI format (for example, DCI format 2_6) may not be detected or monitored through unnecessary PDCCH monitoring within the active time of the DRX cycle in order to reduce a battery of the UE.

If the UE has not detected the first DCI format or the WUS within the short time interval 804 of FIG. 8 or 1002 of FIG. 10 even though the power saving function or the DRX function is configured (or the UE is configured to detect the first DCI format within the short time), the UE may perform the basic operation within the active time of the DRX cycle.

If a search space in which PDCCH monitoring is performed to detect the first DCI format in an activated downlink BWP of the PCell or SpCell is configured or provided and the UE has not detected the first DCI format, If the power saving function is configured in the RRC message or an indicator (for example, power saving (ps)-wake up or not) indicating whether to start a timer (or wake up and perform a search within the active time) to monitor the PDCCH within the next active time for the power saving function or not start the timer (or not perform the search within the active time) is configured (or provided), the UE may or not start the timer for the active time according to the indicator.

If the power saving function is configured in the RRC message or an indicator (for example, power saving (ps)-wake up or not) indicating whether to start a timer (or wake up and perform a search within the active time) to monitor the PDCCH within the next active time for the power saving function or not start the timer (or not perform the search within the active time) is not configured (or not provided), the UE may not start the timer for the active time.

If a search space in which PDCCH monitoring is performed to search for the first DCI format in an activated downlink BWP of the PCell or SpCell is configured or provided and the UE is not configured (or is not required) to search for the first DCI format through PDCCH monitoring within a short time interval before the next active time of the DRX cycle or if the short time interval within which the first DCI format is detected through PDCCH monitoring before the next active time of the DRX cycle, the UE should start a timer for the next active time of the DRX cycle.

Figure 11:
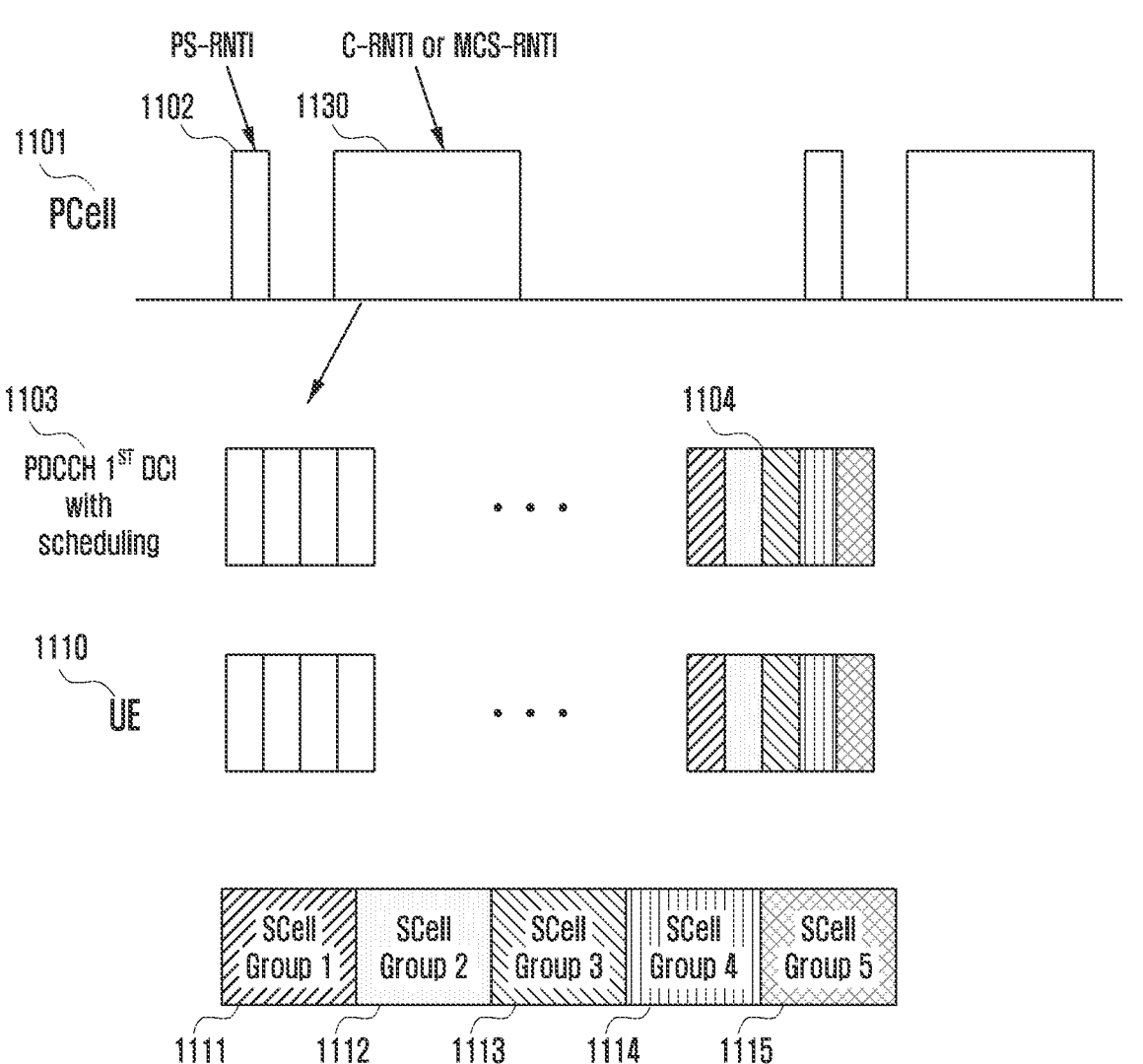
FIG. 11 illustrates a second embodiment that embodies the conception of the method of operating the dormant BWP in the activated SCell described with reference to FIG. 9 according to an embodiment of the disclosure.

FIG. 11 illustrates embodiment 2 that embodies the conception of the method of operating the dormant BWP in the activated SCell described with reference to FIG. 9 according to an embodiment of the disclosure.

In embodiment 2, the base station may configure a plurality of SCells in the UE for carrier aggregation through the RRC message as described in FIG. 6, allocate each SCell, configure a dormant BWP for each SCell, and may not configure a dormant BWP for some SCells. The plurality of SCells may be included and configured in each SCell group. One SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). For embodiment 2 of the disclosure or in order to apply the same, the configured SCell groups or SCell group identifier may be referred to as second SCell groups. The second SCell groups may indicate group identifiers to which the operation indicated by a DCI bitmap value received after monitoring of PDCCH DCI by the UE within the active time is applied in embodiment 2 of the disclosure.

Referring to FIG. 11, the base station may configure a power saving function or a DRX function in the UE through the RRC message as described in FIG. 6. Further, the base station may configure, in each UE, time information for a short time 1102 in which the second DCI format or the WUS should be detected before an active time 1130 of the DRX cycle or configuration information for the second DCI format in the PCell or the SpCell 1101 through the RRC message. When the UE detects the second DCI format in the PCell or the SpCell during the short time 1102, the base station may configure the location of a bitmap including an indication for the second SCell groups of each UE in the second DCI format through the RRC message. Further, the base station may configure a search space of PDCCH monitoring or a UE identifier (for example, PS-RNTI) for detecting the second DCI format during the short time 1102 in the UE through the RRC message.

Configuration information for the second DCI format may include configuration information for the second DCI format (for example, DCI format 0_1 or DCI format 1_1) which the UE should detect within the active time 1130 of the DRX cycle for the PCell or the SpCell 1101. When the UE detects the second DCI format in the PCell or SpCell, the UE may identify whether a bitmap including an indicator for second SCell groups for the UE in the second DCI format. The base station may configure the search space of PDCCH monitoring or the UE identifier (for example, C-RNTI, MCS-C-RNTI, or SPS-C-RNTI) for detecting the second DCI format during the active time 1130 in the UE through the RRC message. When the SCell is switched and activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the base station may transmit the second DCI format through PDCCH transmission resources of the active time 1130 in the PCell or SpCell as indicated by reference numeral 1103, and the second DCI format may include a bitmap 1104 including indication information for the dormant BWP of the second SCell groups configured in the UE.

As described above, the first UE 1110 applying information configured through the RRC message may monitor the PDCCH based on the UE identifier (for example, C-RNTI, MCS-C-RNTI, or SPS-C-RNTI) which is an identifier configured within the active time 1130 of the DRX cycle and detect the second DCI format from the base station in the search space as indicated by reference numeral 1103. If the second DCI format 1103 is detected, the first UE may read the bitmap 1104 including indication information for the dormant BWP of the second SCell groups of the first UE in the second DCI format 1103. The length of the bitmap may be configured to be the same as the number of second SCell groups configured in the first UE or maximally configured to a predetermined number (for example, 5).

Further, each bit value of the bitmap may be mapped to or indicated by each second SCell group in an ascending order of SCell group identifier values of the second SCell groups configured in the first UE from the right bit (for example, from the Least Significant Bit (LSB)) of the bitmap. In another method, each bit value of the bitmap may be mapped to or indicated by each second SCell group in a descending order of SCell group identifier values of the second SCell groups configured in the first UE from the right bit (for example, from the Least Significant Bit (LSB)) of the bitmap. In another method, each bit value of the bitmap may be mapped to or indicated by each second SCell group in an ascending order of SCell group identifier values of the second SCell groups configured in the first UE from the left bit (for example, from the Most Significant Bit (MSB)) of the bitmap. In another method, each bit value of the bitmap may be mapped to or indicated by each second SCell group in a descending order of SCell group identifier values of the second SCell groups configured in the first UE from the left bit (for example, from the Most Significant Bit (MSB)) of the bitmap.

When bit values of the bitmaps 1111, 1112, 1113, 1114 and 1115 are 0, the bit value of 0 may indicate switching to a dormant BWP or activation of a dormant BWP for each activated SCell among SCells belonging to the second SCell group corresponding to the bit (if a dormant BWP is configured). In another method, when the bit values of the bitmaps are 0, the bit value of 0 may indicate switching to a dormant BWP or activation of a dormant BWP if a BWP activated for each activated SCell among SCells belonging to the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the second SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells belonging to the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

Embodiment 2 of the disclosure is realized as described above, and the second DCI format of the PDCCH proposed in embodiment 2 may be used within the active time and accompanied by downlink transmission resources (for example, PDSCH) or uplink transmission resources (for example, PUSCH) for the PCell or SpCell of the UE. Accordingly, in embodiment 2, the UE may receive the second DCI format of the PDCCH and transmit ACK or NACK information (for example, HARQ ACK or NACK) for scheduling information (downlink transmission resources or uplink transmission resources) of the PCell or SpCell indicated by the second DCI format, and accordingly the base station may identify whether the UE successfully receives an indication of the second DCI format in embodiment 2.

Embodiment 2 proposed in the disclosure may be implemented in more detail as described below.

In embodiment 2 of the disclosure, a hibernation or non-hibernation operation for SCells of the UE and an operation for a PDCCH monitoring indicator are described below.

For the PCell or SpCell, when a search space is configured, provided, or detected to allow the UE to monitor a PDCCH in order to search for the second DCI format (for example, DCI format 0_1 or DCI format 1_1) within the active time 1130 of FIG. 11 and when a bitmap including an indication for the second SCell groups of the UE is included in the second DCI format, the UE may receive the bitmap and operate as follows. Further, the UE may monitor the PDCCH in an activated downlink BWP of the PCell or SpCell.

The UE may monitor the PDCCH and search for the second DCI format (for example, DCI format 0_1 or DCI format 1_1) by a UE identifier (C-RNTI, MCS-C-RNTI, or SPS-C-RNTI).

The UE may receive a configuration of a plurality of search space sets and apply the same in order to monitor the PDCCH for searching for the second DCI format in the activated downlink BWP of the PCell or SpCell according to a common search area configured through the RRC message.

When the second DCI format is detected, the UE may read the size of a bitmap corresponding to the number of second SCell groups if a plurality of second SCell groups for embodiment 2 of the disclosure are configured through the RRC message.

The location of the bitmap for embodiment 2 of the disclosure may be right behind the PDCCH monitoring indicator.

The size of the bitmap for embodiment 2 of the disclosure may be the same as the number of second SCell groups in which SCells configured in the UE through the RRC message are included or configured, and each bit of the bitmap may correspond to or may be mapped to each second SCell group (or second SCell group identifier or SCells belonging to the second SCell group) in an ascending order of SCells group identifier values of the configured second SCell group. In another method, each bit of the bitmap may correspond to or may be mapped to each second SCell group (or second SCell group identifier or SCells belonging to the second SCell group) in a descending order of SCell group identifier values of the configured second SCell group. In another method, each bit of the bitmap may correspond to or may be mapped to each second SCell group (or second SCell group identifier or SCells belonging to the second SCell group) in an ascending order of SCell group identifier values of the second SCell group sequentially from the right bit (from the least significant bit (LSB)) or the left bit (from the most significant bit (MSB)). In another method, each bit of the bitmap may correspond to or may be mapped to each second SCell group (or second SCell group identifier or SCells belonging to the second SCell group) in a descending order of SCell group identifier values of the second SCell group sequentially from the right bit (from the Least Significant Bit (LSB)) or the left bit (from the Most Significant Bit (MSB)).

When the bit value of the bitmap is 0, the bit value of 0 may indicate switching to a dormant BWP or activation of a dormant BWP for each activated SCell among SCells included in the second SCell group corresponding to the bit (if a dormant BWP is configured). In another method, when the bit values of the bitmaps are 0, the bit value of 0 may indicate switching to a dormant BWP or activation of a dormant BWP if a BWP activated for each activated SCell among SCells included in the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells belonging to the second SCell group corresponding to the bit. In another method, when the bit value of the bitmap is 1, the bit value of 1 may indicate switching to the normal BWP (for example, the first active BWP that is activated from the dormant state) or activation to the normal BWP (for example, the first active BWP that is activated from the dormant state) if the current or activated BWP for each activated SCell among SCells belonging to the second SCell group corresponding to the bit is a dormant BWP (or is not a normal BWP). Otherwise (if the current or activated BWP for each activated SCell among SCells belonging to the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells belonging to the first SCell group corresponding to the bit, indicate activation to the normal BWP (for example, the first active BWP activated from the dormant state), or indicate maintenance, continuous use, application, or activation of the current active BWP.

Referring to FIG. 6 of the disclosure, through an RRC-Setup message 625, an RRCResume message of operation, or an RRCReconfiguration message of operation 645 of the RRC connection configuration, the base station may configure first SCell group configuration information which can be applied to first embodiment and second SCell group configuration information which can be applied to the second embodiment, proposed in the disclosure, in the UE. In the RRC message, the base station may allocate a SCell identifier to each SCell of the UE, and may allocate a first SCell group identifier to each of the first SCell groups and a second SCell group identifier to each of the second SCell groups. Further, the base station may allocate a first SCell group set identifier indicating the first SCell groups and indicate a second SCell group set identifier indicating the second SCell groups. Each SCell identifier may be included in or mapped to each first SCell group or each second SCell group. The base station may include the SCell or the SCell identifier in the first SCell group or the second SCell group or map the SCell or the SCell identifier to the first SCell group or the second SCell group to configure the SCell or the SCell identifier only when a dormant BWP (for example, a downlink dormant BWP) is configured for the SCell.

Figure 12:
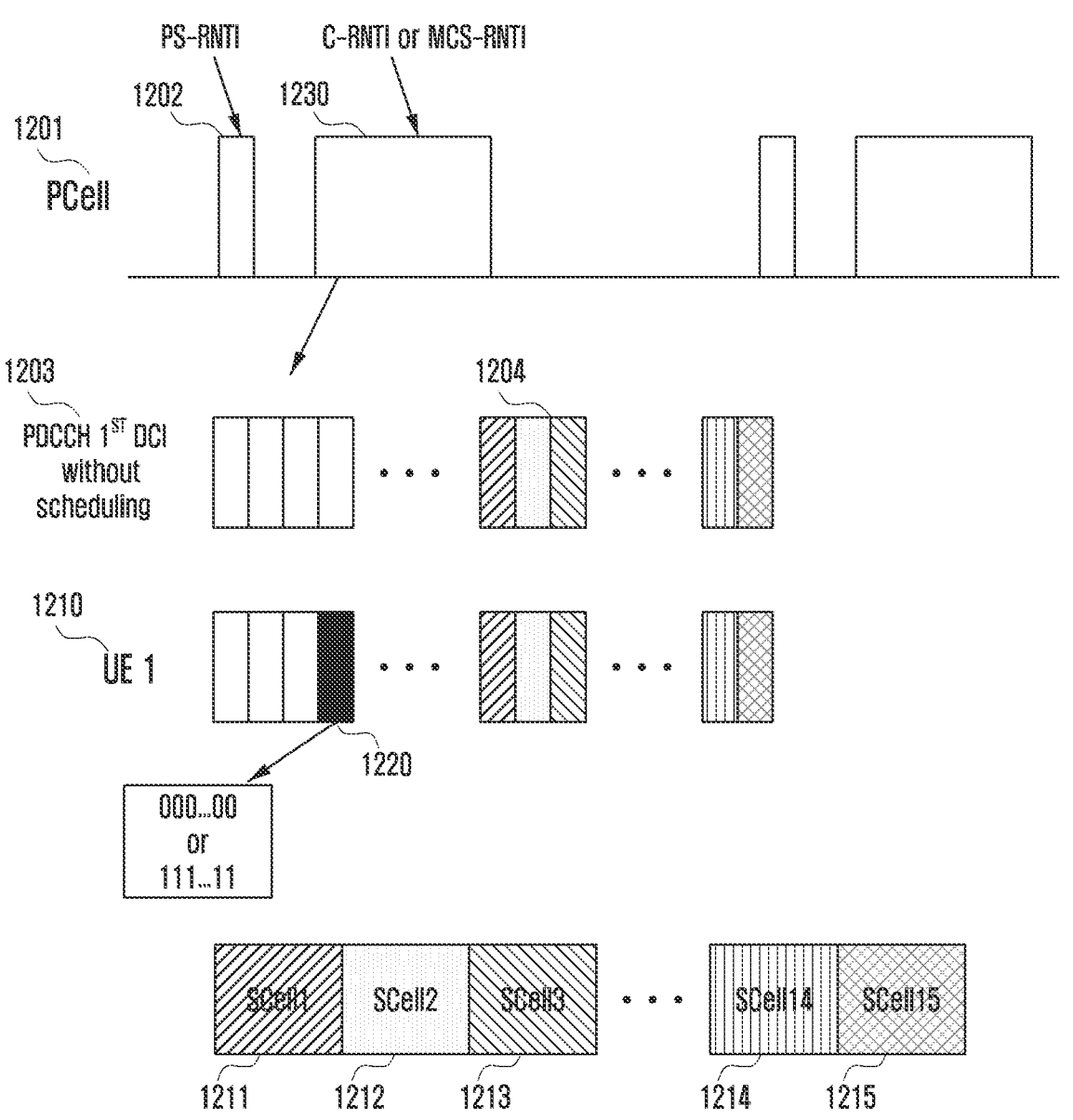
FIG. 12 illustrates a third embodiment that embodies the conception of the method of operating the dormant BWP in the activated SCell described with reference to FIG. 9 according to an embodiment of the disclosure.

FIG. 12 illustrates embodiment 3 that embodies the conception of the method of operating the dormant BWP in the activated SCell described with reference to FIG. 9 according to an embodiment of the disclosure.

In embodiment 3, the base station may configure a plurality of SCells in the UE for carrier aggregation through the RRC message as described in FIG. 6, allocate each SCell, configure a dormant BWP for each SCell, and may not configure a dormant BWP for some SCells. An SCell identifier value may be allocated as a predetermined bit value and have an integer value (or a natural number value). In order to operate or apply embodiment 3 of the disclosure, SCell identifiers configured in the RRC message may be used. The SCell identifiers may indicate SCells or SCell identifiers to which the operation indicated by a DCI bitmap value received after monitoring of PDCCH DCI by the UE within the active time is applied in embodiment 3 of the disclosure.

Referring to FIG. 12, the base station may configure a power saving function or a DRX function in the UE through the RRC message as illustrated in FIG. 6. The base station may configure time information for a short time 1202 within which a third DCI format or a WUS should be detected before an active time 1230 of the DRX cycle in the PCell 1201 or SpCell or configuration information for the third DCI format in the UE through the RRC message, and may configure the location of a bitmap including an indication for third SCell groups of each UE in the third DCI format through the RRC message when the UE detects the third DCI format within the short time 1202 in the PCell or SpCell. Further, the base station may configure a search space of PDCCH monitoring or a UE identifier (for example, PS-RNTI) for detecting the third DCI format in the UE within the short time 1202 through the RRC message.

Configuration information for the third DCI format may include configuration information for the third DCI format (for example, DCI format 1_1) which the UE should detect within the active time 1230 of the DRX cycle for the PCell or the SpCell. When the UE detects the third DCI format in the PCell or SpCell, the UE may identify whether a bitmap including an indicator for each SCell or SCell identifier of the UE in the third DCI format.

The third DCI format may include a transmission resource type (resourceAllocation) field, a frequency transmission resource allocation (frequency domain resource assignment) field, a Modulation and Coding Scheme (MCS) field, a New Data Indicator (NDI) field, a Redundancy Version (RV) field, an HARQ process number field, an antenna port field, or a DMRS Sequence Initialization (DMRS SI) field.

If the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format, bits or fields located thereafter are not analyzed by the Modulation and Coding Scheme (MCS) field, the New Data Indicator (NDI) field, the Redundancy Version (RV) field, the HARQ process number field, the antenna port field, or the DMRS Sequence Initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation. However, if the type indicated by the transmission resource type field (for example, resourceAllocation) is the first type (for example, resourceAllocationType0) and all bits of the frequency transmission resource allocation field are not 0 or if the type indicated by the transmission resource type field (for example, resourceAllocation) is a second type (for example, resourceAllocationType1) and all bits of the frequency transmission resource allocation field are not 1 in the detected third DCI format, bits or fields located thereafter are analyzed, read, and applied by the Modulation and Coding Scheme (MCS) field, the New Data Indicator (NDI) field, the Redundancy Version (RV) field, the HARQ process number field, the antenna port field, or the DMRS Sequence Initialization (DMRS SI) field.

When the UE detects the third DCI field of the PDCCH, if the third DCI field is scrambled with a second UE identifier (for example, SPS-C-RNTI) or detected thereby, a special instruction indicating activation or release of periodic transmission resources configured in the UE may be transmitted when the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format.

Accordingly, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format only when the third DCI field of the PDCCH is found through scrambling with the first UE identifier (for example, C-RNTI or MCS-C-RNTI), embodiment 3 of the disclosure proposes analysis of the fields thereafter by the bitmap indicating the dormant BWP operation for each SCell of the UE.

Further, the base station may configure a search space of PDCCH monitoring or a UE identifier (for example, C-RNTI or MCS-C-RNTI) for detecting the third DCI format in the UE during the active time 1230 through the RRC message.

For example, as described above, the base station may transmit the third DCI format through PDCCH transmission resources of the active time 1230 in the PCell or SpCell as indicated by reference numeral 1203, and may include a bitmap 1204 including indication information for the dormant BWP of the third SCell groups configured in the UE.

As described above, the first UE 1210 applying information configured through the RRC message may monitor the PDCCH based on (or through scrambling with) the first UE identifier (for example, C-RNTI or MCS-C-RNTI) which is an identifier configured within the active time 1230 of the DRX cycle to search for the third DCI format from the base station in the search space as indicated by reference numeral 1203. If the third DCI format 1203 is detected and the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format 1203 as indicated by reference numeral 1220, fields thereafter may be analyzed by the bitmap indicating the dormant BWP operation for each SCell of the UE and the bitmap 1204 including indication information for the dormant BWP for a plurality of SCells (or SCell identifiers) configured in the first UE may be read.

When the proposed condition is met, the bitmap may have a fixed length, for example, 15 bits or 16 bits since the bitmap is analyzed to replace the MCS field of the related art, NDI field, RV field, HARQ process number field, antenna port field, or DMRS SI field.

In embodiment 3 proposed in the disclosure, embodiment 3-1 to which a first bitmap mapping method is applied is described below.

In the first bitmap mapping method, each bit value of the bitmap may be mapped to and indicated by each SCell in an ascending order or a descending order of SCell identifier values of SCells configured in the first UE from a right bit (for example, from the Least Significant Bit (LSB)) of the bitmap or from a left bit (for example, from the Most Significant Bit (MSB)).

In another method, in the first bitmap mapping method, each bit value of the bitmap may be mapped to and indicated by each SCell in an ascending order of SCell identifier values of SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in an ascending order of SCell identifier values of SCells of a cell group (a Master Cell Group (MCG) or a Secondary Cell Group (SCG)) configured in the first UE from a left bit (for example, from the Most Significant Bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a Master Cell Group (MCG) or a Secondary Cell Group (SCG)) configured in the first UE from a left bit (for example, from the Most Significant Bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When bit values of the bitmaps 1211, 1212, 1213, 1214, and 1215 are 0, the bit value of 0 may indicate switching to a dormant BWP or activation of a dormant BWP for each activated SCell corresponding to the bit (if a dormant BWP is configured or belongs to a first SCell group or a second SCell group). In another method, when the bit values of the bitmaps are 0, the bit value of 0 may indicate switching to a dormant BWP or activation of a dormant BWP if a BWP activated for each activated SCell corresponding to the bit is not a dormant BWP (or is a normal BWP). If the dormant BWP is not configured in the activated SCell corresponding to the bit of the bitmap, the UE may ignore or may not read or apply the bit value.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. If the dormant BWP is not configured in the activated SCell corresponding to the bit of the bitmap, the UE may ignore or may not read or apply the bit value.

In embodiment 3 proposed in the disclosure, embodiment 3-2 to which a second bitmap mapping method is applied is described below.

In the second bitmap mapping method, each bit value of the bitmap may be mapped to and indicated by each SCell in an ascending order or a descending order of SCell identifier values of SCells belonging to a first SCell group or a second SCell group or in which a dormant BWP is configured among SCells configured in the first UE from a right bit (for example, from the Least Significant Bit (LSB)) of the bitmap or from a left bit (for example, from the Most Significant Bit (MSB)).

In another method, in the second bitmap mapping method, each bit value of the bitmap may be mapped to and indicated by each SCell in an ascending order of SCell identifier values of SCells belonging to a first SCell group or a second SCell group or in which a dormant BWP is configured among SCells of a cell group (a Master Cell Group (MCG) or a Secondary Cell Group (SCG)) configured in the first UE from a right bit (for example, from the Least Significant Bit (LSB)). If the UE receives the third DCI format in the PCell, SCells belonging to the first SCell group or the second SCell group or in which the dormant BWP is configured among the SCells belonging to the cell group of the MCG may be mapped to the bitmap in an ascending order of the SCell identifier values. If the UE receives the third DCI format in the PCell, SCells belonging to the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in a descending order of SCell identifier values of SCells belonging to a first SCell group or a second SCell group or in which a dormant BWP is configured among SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, SCells belonging to the first SCell group or the second SCell group or in which the dormant BWP is configured among the SCells belonging to the cell group of the MCG may be mapped to the bitmap in an ascending order of the SCell identifier values. If the UE receives the third DCI format in the PSCell, SCells belonging to the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in an ascending order of SCell identifier values of the SCells among the SCells of a cell group (a Master Cell Group (MCG) or a Secondary Cell Group (SCG)) configured in the first UE from a left bit (for example, from the Most Significant Bit (MSB)) of the bitmap. If the UE receives the third DCI format in the PCell, SCells belonging to the first SCell group or the second SCell group or in which the dormant BWP is configured among the SCells belonging to the cell group of the MCG may be mapped to the bitmap in an ascending order of the SCell identifier values. If the UE receives the third DCI format in the PSCell, SCells belonging to the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCells which can be configured in one UE is 32 and the bitmap is 15 bits or 16 bits.

In another method, in the second bitmap mapping method, each bit value of the bitmap may be mapped to and indicated by each SCell in a descending order of SCell identifier values of SCells belonging to a first SCell group or a second SCell group or in which a dormant BWP is configured among SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PCell, SCells belonging to the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When bit values of the bitmaps 1211, 1212, 1213, and 1214 are 0, the bit value of 0 may indicate switching to a dormant BWP or activation of a dormant BWP for each activated SCell corresponding to the bit (if a dormant BWP is configured or belongs to a first SCell group or a second SCell group). In another method, when the bit values of the bitmaps are 0, the bit value of 0 may indicate switching to a dormant BWP or activation of a dormant BWP if a BWP activated for each activated SCell corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP.

Embodiment 3 of the disclosure is realized as described above, and the third DCI format of the PDCCH proposed by embodiment 3 may be used within the active time and is not accompanied by downlink transmission resources (for example, PDSCH) or uplink transmission resources (for example, PUSCH) for the PCell or SpCell of the UE. Accordingly, in the third embodiment, the UE may receive the third DCI format of the PDCCH and may not transmit ACK or NACK information (for example, HARQ ACK or NACK) for the indication in the third DCI formation.

Embodiment 3 proposed in the disclosure may be implemented in more detail as described below.

In embodiment 3 of the disclosure, a hibernation or non-hibernation operation for SCells of the UE and an operation for a PDCCH monitoring indicator are described below.

For the PCell or SpCell, if a search space is configured, provided, or detected to allow the UE to monitor a PDCCH in order to search for the third DCI format (for example, DCI format 1_1) through scrambling with or based on a first UE identifier (for example, C-RNTI or MCS-C-RNTI) within the active time as indicated by reference numeral 1230 of FIG. 12 and if the type indicated by a transmission resource type field (for example, resourceAllocation) in the third DCI format is a first type (for example, resourceAllocationType0) and all bits of a frequency transmission resource allocation field are 0 or if the type indicated by the transmission resource type field (for example, resourceAllocation) is a second type (for example, resourceAllocationType1) and all bits of the frequency transmission resource allocation field are 1, the UE may consider that the third DCI format includes information on an indication indicating activation or switching of a downlink BWP activated for each activated SCell configured in the UE (or in which a dormant BWP is configured) to the dormant BWP or to a BWP first activated from a dormant state, analyze fields after the transmission resource field and the frequency transmission resource allocation field as a bitmap indicating a dormant BWP operation for each SCell of the UE, and read a bitmap 1204 including indication information for dormant BWPs for a plurality of SCells (or SCell identifiers) configured in the UE.

For example, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format, bits or fields located thereafter are not analyzed by the modulation and coding scheme (MCS) field, the new data indicator (NDI) field, the redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation.

When the UE satisfies the condition and reads the bitmap in the third DCI format, the first bitmap mapping or the second bitmap mapping method proposed in the disclosure may be applied.

When the bit value of the bitmap is 0, the bit value of 0 may indicate switching to a dormant BWP or activation of a dormant BWP for each activated SCell or SCell identifier corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if the dormant BWP is configured for each activated SCell corresponding to the bit or is included in a first SCell group or a second SCell group, or if the activated BWP is not the dormant BWP (or is a normal BWP). In another method, when the bit value of the bitmap is 0, the bit value of 0 may indicate switching to a dormant BWP or activation of a dormant BWP for each activated SCell (in which a dormant BWP is configured or included in a first SCell group or a second SCell group) or SCell identifier corresponding to the bit. In another method, when the bit value of the bitmap is 0, the bit value of 0 may indicate switching to a dormant BWP or activation of a dormant BWP for each activated SCell or SCell identifier corresponding to the bit. If the bit of the bitmap indicates the SCell in which no dormant BWP is configured or the SCell identifier, the UE may ignore the bit, or not read or apply the bit.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. In another method, when the bit value of the bitmap is 1, the bit value of 1 may indicate switching to the normal BWP (for example, the first active BWP activated from the dormant state) or activation to the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated.

When embodiment 1, embodiment 2, or embodiment 3 of the disclosure is applied, a downlink dormant BWP configured in the SCell of the UE cannot be configured as a downlink default BWP (default DL BWP). This is because, if the default BWP is configured as the dormant BWP, the normal BWP is automatically switched to the default BWP when the timer expires and thus management of the default BWP of the SCell by the base station becomes complex. For example, if the BWP of the SCell is the dormant BWP, the BWP of the SCell should be managed by DCI of the PCell.

When the UE receives an indication indicating switching of the first downlink BWP (dormant BWP) of the activated SCell to the second downlink BWP or activation of the first downlink BWP according to the embodiment 1, embodiment 2, or embodiment 3 proposed in the disclosure, the second downlink BWP may be a downlink BWP first activated from a dormant state configured through an RRC message. However, when the UE receives an indication indicating activation of the deactivated SCell through MAC control information proposed in the disclosure, the second downlink BWP or the second uplink BWP may be a first activated downlink BWP or a first activated uplink BWP configured through the RRC message when the UE activates the second downlink BWP or the second uplink BWP.

FIG. 13 proposes a structure of an RRC message for configuring configuration information to apply embodiment 1, embodiment 2, or embodiment 3 according to an embodiment of the disclosure.

Referring to FIG. 13, the base station may transmit configuration information for the application of embodiment 1, embodiment 2, or embodiment 3 proposed in the disclosure to the UE through the RRC message (for example, RRCSetup message, RRCResume message, or RRCReconfiguration message) as illustrated in FIG. 6.

The format of the RRC message (for example, RRCReconfiguration message) may be configured as illustrated in FIG. 13.

Bearer configuration information 1310 for configuring each bearer may be included.

Cell group configuration information 1311 for configuring each RLC layer device, MAC layer device, PHY layer device, or cell may be included. Accordingly, the cell group configuration information 1311 may include RLC layer device configuration information, MAC layer device configuration information 1321, PHY layer device configuration information 1325, or configuration information 1322, 1323, 1324, 1330, 1340, 1341, and 1342 for configuring the cell.

In order to configure the configuration information for the application of embodiment 1, embodiment 2, or embodiment 3 proposed in the disclosure, as illustrated in FIG. 6, the base station may configure a plurality of SCells in the UE for carrier aggregation through the RRC message illustrated in FIG. 13, allocate each SCell identifier, configure a dormant BWP for each SCell, and does not configure a dormant BWP for some SCells. Further, the base station may include the plurality of SCells in each SCell group (a first SCell group for embodiment 1 or a second SCell group for embodiment 2), and one SCell group (the first SCell group for embodiment 1 or the second SCell group for embodiment 2) may include a plurality of SCells. An SCell group identifier (a first SCell group identifier for the first embodiment or a second SCell group identifier for the second embodiment) may be allocated to each SCell group (a first SCell group for embodiment 1 or a second SCell group for embodiment 2), and a plurality of SCells identifiers may be included in or mapped to the respective SCell group identifiers (the first SCell group identifier for embodiment 1 or the second SCell group identifier for embodiment 2). An SCell identifier value or an SCell group identifier value may be allocated as a predetermined bit value and have an integer value (or a natural number value). The number of first SCell groups for embodiment 1 may be plural, and the first SCell group may have the SCell group identifier or the SCell group identifier may be mapped to a first SCell group set identifier for embodiment 1. Further, the number of second SCell groups for embodiment 2 may be plural, and the second SCell group may have the SCell group identifier or the SCell group identifier may be mapped to a second SCell group set identifier for embodiment 2.

A plurality of BWPs may be configured in each of the uplink and the downlink for each SCell, and a BWP identifier may be allocated to each BWP. A value of 0, 1, 2, 3, or 4 may be allocated to each BWP identifier. A predetermined bit value (for example, 5 bits) may be allocated to the SCell identifier value, and the SCell identifier may have an integer value (or a natural number value). For each SCell, a first active BWP, a default BWP, an initial BWP, a dormant BWP, or a BWP first activated from a dormant state for an uplink or downlink may be indicated and configured by a BWP identifier.

Specifically, embodiment 1, embodiment 2, or embodiment 3 proposed in the disclosure proposes a method of configuring information to be applied by the UE or the base station, and one or a plurality of methods below may be applied.

First method: when an SCell identifier 1340 is configured in cell configuration information 1323 and 1330 of cell group configuration information 1311 of the RRC message, dormant SCell group configuration information may be also included therein and thus a first SCell group (or group identifier) or a second SCell group (or group identifier) to which the SCell identifier is mapped or in which the SCell identifier is included may be indicated. The dormant SCell group configuration information may include the first SCell group set identifier for embodiment 1 and include an identifier of the first SCell group belonging to the first SCell group set for embodiment 1, and thus the SCell identifier may be mapped to or included in the first SCell group (group corresponding to the group identifier) of the first SCell group set. Further, the dormant SCell group configuration information may include the second SCell group set identifier for embodiment 2 and include an identifier of the second SCell group belonging to the second SCell group set for embodiment 2, and thus the SCell identifier may be mapped to or included in the second SCell group (group corresponding to the group identifier) of the second SCell group set. In another method, the dormant SCell group configuration information may include one of the first SCell group set identifier for embodiment 1 and the second SCell group set identifier for the second embodiment and include an identifier of the first SCell group belonging to the first SCell group set for embodiment 1 or a second SCell group set identifier for embodiment 2, and thus the SCell identifier may be mapped to or included in the SCell group of one SCell group set among the first SCell group of the first SCell group set and the second SCell group of the second SCell group set. For example, one SCell identifier may be mapped to or may belong to only one SCell group among the first SCell group for embodiment 1 or the second SCell group for embodiment 2, or may belong to only one SCell group. In order to configure a plurality of first SCell groups when dormant SCell group configuration information is configured in cell configuration information 1323 and 1330 of the cell group configuration information 1311 of the RRC message, a first SCell group list may be configured. The first SCell group list may include first SCell group identifiers and, more specifically, may include lists to which SCell groups are added, from which SCell groups are released, or in which SCell groups are modified. Further, in order to configure a plurality of second SCell groups when dormant SCell group configuration information is configured in cell configuration information 1323 and 1330 of the cell group configuration information 1311 of the RRC message, a second SCell group list may be configured, and the second SCell group list may include second SCell group identifiers and, more specifically, may include lists to which SCell groups are added, from which SCell groups are released, or in which SCell groups are modified.

Second method: when an SCell identifier 1340 is configured in cell configuration information 1323 and 1330 of cell group configuration information 1311 of the RRC message, dormant SCell group configuration information may be also included therein and thus a first SCell group (or group identifier) or a second SCell group (or group identifier) to which the SCell identifier is mapped or belongs may be indicated. The dormant SCell group configuration information may include an identifier of the first SCell group belonging to the first SCell group set (groups) for embodiment 1 and thus the SCell identifier may be mapped to or included in the first SCell group (group corresponding to the group identifier) of the first SCell group set. Further, the dormant SCell group configuration information may include an identifier of the second SCell group belonging to the second SCell group set for embodiment 2 and thus the SCell identifier may be mapped to or included in the second SCell group (group corresponding to the group identifier) of the second SCell group set. In another method, the dormant SCell group configuration information may include the identifier of the first SCell group belonging to the first SCell group set for the embodiment 1 or a second SCell group set identifier for embodiment 2 and thus the SCell identifier may be mapped to or included in the SCell group of one of the first SCell group of the first SCell group set and the second SCell group of the second SCell group set. For example, one SCell identifier may be mapped to or may belong to only one SCell group among the first SCell group for embodiment 1 or the second SCell group for embodiment 2, or may belong to only one SCell group. Further, in order to configure a plurality of second SCell groups when dormant SCell group configuration information is configured in cell configuration information 1323 and 1330 of the cell group configuration information 1311 of the RRC message, a second SCell group list may be configured, and the second SCell group list may include second SCell group identifiers and, more specifically, may include lists to which SCell groups are added, from which SCell groups are released, or in which SCell groups are modified. Further, in order to configure a plurality of second SCell groups when dormant SCell group configuration information is configured in cell configuration information 1323 and 1330 of the cell group configuration information 1311 of the RRC message, a second SCell group list may be configured, and the second SCell group list may include second SCell group identifiers and, more specifically, may include lists to which SCell groups are added, from which SCell groups are released, or in which SCell groups are modified.

Third method: dormant SCell group configuration information may be configured along with cell configuration information 1323 and 1330 of cell group configuration information 1311 of the RRC message. The dormant SCell group configuration information may include a first SCell group set identifier for embodiment 1 and include an identifier of a first SCell group belonging to a first SCell group set for embodiment 1, and may configure a first SCell identifier list included in the first SCell group. SCell identifiers included in the first SCell identifier list may be mapped to or included in the first SCell group (a group corresponding to a group identifier) of the first SCell group set. Furthermore, the dormant SCell group configuration information may include a second SCell group set identifier for embodiment 2 and include an identifier of a second SCell group belonging to a second SCell group set for embodiment 2, and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include one of the first SCell group set identifier for embodiment 1 and the second SCell group set identifier for embodiment 2 and include a first SCell identifier list of the first SCell group belonging to the first SCell group set for the first embodiment or a second SCell identifier list of the second SCell group belonging to the second SCell group set for the second embodiment, and thus each SCell identifier may be mapped to or included in the SCell group of one of the first SCell group of the first SCell group set and the second SCell group of the second SCell group set. For example, one SCell identifier may be mapped to or may belong to only one SCell group among the first SCell group for embodiment 1 or the second SCell group for embodiment 2, or may belong to only one SCell group. The SCell identifier list may include lists to which SCell identifiers are added, in which SCell identifiers are modified, or from which SCell identifiers are released. Further, in order to configure a plurality of second SCell groups when dormant SCell group configuration information is configured in cell configuration information 1323 and 1330 of the cell group configuration information 1311 of the RRC message, the second SCell group list may be configured, and the second SCell group list may include second SCell group identifiers and, more specifically, may include lists to which SCell groups are added, from which SCell groups are released, or in which SCell groups are modified. Further, in order to configure a plurality of second SCell groups when dormant SCell group configuration information is configured in cell configuration information 1323 and 1330 of the cell group configuration information 1311 of the RRC message, the second SCell group list may be configured, and the second SCell group list may include second SCell group identifiers and, more specifically, may include lists to which SCell groups are added, from which SCell groups are released, or in which SCell groups are modified.

Fourth method: dormant SCell group configuration information may be configured along with cell configuration information 1323 and 1330 of cell group configuration information 1311 of the RRC message. The dormant SCell group configuration information may include an identifier of a first SCell group belonging to a first SCell group set for embodiment 1 and may configure a first SCell identifier list included in the first SCell group. SCell identifiers included in the first SCell identifier list may be mapped to or included in the first SCell group (a group corresponding to a group identifier) of the first SCell group set. Further, the dormant SCell group configuration information may include an identifier of a second SCell group belonging to a second SCell group for embodiment 2 and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include a first SCell identifier list of first SCell groups belonging to a first SCell group set for embodiment 1 or a second SCell identifier list of second SCell groups belonging to a second SCell group set for embodiment 2 and may configure that each SCell identifier is mapped to or included in the SCell group of one SCell group set among the first SCell group of the first SCell group set and the second SCell group of the second SCell group set. For example, one SCell identifier may be mapped to or may belong to only one SCell group among the first SCell group for embodiment 1 or the second SCell group for embodiment 2, or may belong to only one SCell group. The SCell identifier list may include lists to which SCell identifiers are added, in which SCell identifiers are modified, or from which SCell identifiers are released. Further, in order to configure a plurality of second SCell groups when dormant SCell group configuration information is configured in cell configuration information 1323 and 1330 of the cell group configuration information 1311 of the RRC message, the first SCell group list may be configured, and the first SCell group list may include first SCell group identifiers and, more specifically, may include lists to which SCell groups are added, from which SCell groups are released, or in which SCell groups are modified. Further, in order to configure a plurality of second SCell groups when dormant SCell group configuration information is configured in cell configuration information 1323 and 1330 of the cell group configuration information 1311 of the RRC message, the second SCell group list may be configured, and the second SCell group list may include second SCell group identifiers and, more specifically, may include lists to which SCell groups are added, from which SCell groups are released, or in which SCell groups are modified.

The configuration information proposed in the first method, the second method, the third method, or the fourth method may be included in MAC layer device configuration information 1321, PHY layer device configuration information 1325, bearer configuration information 1310, or the like, and the proposed methods may be applied thereto.

When the UE in the RRC-deactivated mode transitions to the RRC-connected mode and the SCell configuration information proposed in the disclosure is restored, applied, or reconfigured, BWPs may be switched, activated, or the dormant BWP may be activated or applied for each activated SCell according to embodiment 1, embodiment 2, or embodiment 3 proposed in the disclosure. The embodiments may be expanded and applied when the handover is performed. For example, through the RRC message (for example, RRCReconfiguration), configuration information of each SCell, state information of each SCell, BWP configuration information of each SCell, dormant BWP information, first active BWP information, or BWP information first activated from the dormant state may be configured. A state of the SCell configured in the UE may be determined by the UE according to the RRC message, and the operation in activation, reactivation, or deactivation of the SCell may be performed in consideration of the BWP configuration information.

An embodiment of the BWP of the MAC layer device according to embodiment 1, embodiment 2, or embodiment 3 of the disclosure and a detailed operation related to the BWP inactivity timer is described below. The BWP inactivity timer starts or restarts only when a default BWP is configured and a BWP of which BWP switching is indicated is not a dormant BWP or a default BWP or only when a default BWP is not configured and a BWP of which BWP switching is indicated is not a dormant BWP or an initial BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication, 2> If a downlink default BWP identifier (defaultDownlinkBWP-Id) is configured and the MAC layer device switches to a BWP which is not instructed by the downlink default BWP identifier or a downlink dormant BWP, 2> If a downlink default BWP identifier (defaultDownlinkBWP-Id) is not configured and the MAC layer device switches to a BWP which is not a downlink initial BWP or a downlink dormant BWP, 3> A BWP inactivity timer (bwp-InactivityTimer) for the downlink active BWP starts or restarts.

Another embodiment of the detailed operation related to the BWP of the MAC layer device and the BWP inactivity timer according to embodiment 1, embodiment 2, or embodiment 3 of the disclosure is described below, and the BWP inactivity timer starts or restarts only when the switched and activated BWP is not the dormant BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication, 2> If a downlink default BWP identifier (defaultDownlinkBWP-Id) is configured and the MAC layer device switches to a BWP which is not indicated by the downlink default identifier, 2> If a downlink default BWP identifier (defaultDownlinkBWP-Id) is not configured and the MAC layer device switches to a BWP which is not a downlink initial BWP, 3> If the switched and activated downlink BWP is not the dormant BWP or not the BWP indicated by the dormant BWP identifier, 4> A BWP inactivity timer (bwp-InactivityTimer) for the downlink active BWP starts or restarts.

Another embodiment of the detailed operation related to an uplink BWP when a downlink BWP when the downlink BWP of the MAC layer device is switched to a dormant BWP according to embodiment 1, embodiment 2, or embodiment 3 of the disclosure is described below, and an active uplink BWP is deactivated or hibernated when the downlink BWP is switched to the dormant BWP. This is because the PDCCH is not monitored and data transmission/reception is not performed in the dormant BWP and thus the uplink BWP is not used.

If the MAC layer device receives an indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches the current BWP of the serving cell to a BWP indicated by the PDCCH.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activity timer related to the active downlink BWP is running in the current serving cell, the BWP activity timer is suspended. This is to prevent activation of the default BWP through automatic switching of the dormant BWP to the default BWP (battery consumption due to PDCCH monitoring). If the default BWP is configured as the dormant BWP, the above problem may be prevented.

3> In another method, when the cell inactivity timer is running, the cell inactivity timer is suspended. The operation is applied to prevent cell deactivation of the dormant BWP due to expiration of the cell timer and automatic deactivation of the dormant BWP.

Another embodiment of the detailed operation related to the uplink BWP when the downlink BWP of the MAC device is a dormant BWP but the downlink BWP is switched to a normal BWP instead of the dormant BWP according to embodiment 1, embodiment 2, or embodiment 3 is described below, and the uplink BWP is switched and activated to a first active BWP when the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches the current BWP of the serving cell to a BWP indicated by the PDCCH.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is running in the current serving cell, the BWP activation timer is suspended. This is to prevent activation of the default BWP through automatic switching of the dormant BWP to the default BWP (battery consumption due to PDCCH monitoring). If the default BWP is configured as the dormant BWP, the above problem may be prevented.

3> In another method, when the cell inactivity timer is running, the cell inactivity timer is suspended. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, If a BWP indicated by the PDCCH is a BWP having a BWP identifier which is not the same as the dormant BWP identifier or if the switched and activated downlink BWP according to the indication of the PDCH is not the dormant BWP, 3> The uplink BWP of the current serving cell is activated to an uplink BWP indicated by a first active BWP identifier or a first active BWP.

Another embodiment of the detailed operation related to the uplink BWP when the downlink BWP of the MAC device is a dormant BWP but the downlink BWP is switched to a normal BWP instead of the dormant BWP according to embodiment 1, embodiment 2, or embodiment 3 is described below, and the uplink BWP is switched to an uplink BWP having the same BWP identifier as a BWP identifier indicated by the PDCCH and activated when the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches the current BWP of the serving cell to a BWP indicated by the PDCCH.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is running in the current serving cell, the BWP activation timer is suspended. This is to prevent activation of the default BWP through automatic switching of the dormant BWP to the default BWP (battery consumption due to PDCCH monitoring). If the default BWP is configured as the dormant BWP, the above problem may be prevented.

3> In another method, when the cell inactivity timer is running, the cell inactivity timer is suspended. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, 2> If a BWP indicated by the PDCCH is a BWP having a BWP identifier which is not the same as the dormant BWP identifier or if the switched and activated downlink BWP according to the indication of the PDCH is not the dormant BWP, 3> The uplink BWP of the current serving cell is activated to an uplink BWP having the same BWP identifier as a BWP identifier indicated by the PDCCH or an uplink BWP having the same BWP identifier as a BWP identifier of the current downlink BWP.

Another embodiment of the detailed operation related to the uplink BWP when the downlink BWP of the MAC device is a dormant BWP but the downlink BWP is switched to a normal BWP instead of the dormant BWP according to embodiment 1, embodiment 2, or embodiment 3 is described below, and the uplink BWP is switched and activated to an uplink BWP activated when a previous downlink BWP is switched to the dormant BWP or a last activated uplink BWP if the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches the current BWP of the serving cell to a BWP indicated by the PDCCH.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is running in the current serving cell, the BWP activation timer is suspended. This is to prevent automatic switching and activation of the dormant BWP to the default BWP (battery consumption due to PDCCH monitoring). If the default BWP is configured as the dormant BWP, the above problem may be prevented.

3> In another method, when the cell inactivity timer is running, the cell inactivity timer may be suspended. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, 2> If a BWP indicated by the PDCCH is a BWP having a BWP identifier which is not the same as the dormant BWP identifier or if the switched and activated downlink BWP according to the indication of the PDCH is not the dormant BWP, 3> The uplink BWP of the current serving cell is activated to an uplink BWP activated when a previous downlink BWP is switched to the dormant BWP or to a last activated uplink BWP.

Another embodiment of the detailed operation according to the cell state (activated state or deactivated state) of the MAC layer device in embodiment 1, embodiment 2, or embodiment 3 of the disclosure is described below.

If an indication indicating deactivation of a serving cell (PCell or SCell) is received through a MAC CE or an RRC message or if a cell inactivity timer has been configured and has expired, one or a plurality of following operations may be performed.

A downlink or uplink BWP is deactivated or hibernated.

A cell inactivity timer configured or running in the cell or BWP is suspended.

When the BWP inactivity timer configured to the BWP of the cell is running, the BWP inactivity timer is suspended. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, for example, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

Periodic uplink transmission resources (configured uplink grant type 1 configured in RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant type 1), may be performed only when the BWP is transitioned from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

HARQ buffers configured in the uplink or downlink BWP are all emptied.

The UE does not transmit an SRS for the uplink BWP of the cell.

Uplink data is not transmitted through a UL-SCH in the BWP of the cell.

A random access procedure is not performed for the BWP of the cell.

The UE does not monitor a PDCCH in the BWP of the cell.

The UE does not monitor a PDCCH in the BWP of the cell. However, in the case of cross-scheduling, if the dormant BWP is configured in the cell, the scheduled cell (for example, PCell) may receive an indication through monitoring of a PDCCH for the cell (for example, SCell).

PUCCH or SPUCCH transmission is not performed in the BWP of the cell.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP which not the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

If the current downlink BWP of the serving cell is not the dormant BWP or if the serving cell was previously in a deactivated state and is activated by the indication of the MAC CE, the uplink or downlink BWP is switched to a predetermined BWP (for example, an uplink or uplink first active BWP) and the BWP is activated.

If the current downlink BWP of the serving cell is not the dormant BWP or if the serving cell was previously in a deactivated state and is activated by the indication of the MAC CE, a Sounding Reference Signal (SRS) is transmitted to enable the base station to perform channel measurement for the uplink in the activated BWP. For example, the base station may periodically transmit the SRS.

If the current downlink BWP of the serving cell is not the dormant BWP or if the serving cell was previously in a deactivated state and is activated by the indication of the MAC CE, a PUCCH is transmitted if the PUCCH is configured in the activated BWP.

If the current downlink BWP of the serving cell is not the dormant BWP or if the serving cell was previously in a deactivated state and is activated by the indication of the MAC CE, a BWP or cell inactivity timer starts or restarts. In another method, the BWP or cell inactivity timer may start or restart only when a BWP or cell hibernation timer is not configured. If the BWP or cell hibernation timer can be configured through the RRC message, the BWP or the cell may be hibernated when the timer expires. For example, the BWP or cell inactivity timer may start or restart only in the hibernated BWP or cell.

If the current downlink BWP of the serving cell is not the dormant BWP or if the serving cell was previously in a deactivated state and is activated by the indication of the MAC CE, stored type 1 transmission resources may be initialized as original and used when there are type 1 configuration transmission resources of which the use is suspended. The type 1 configuration transmission resources are periodic (uplink or downlink) transmission resources pre-allocated through an RRC message, which can be used after being activated through the RRC message.

If the current downlink BWP of the serving cell is not the dormant BWP or if the serving cell was previously in a deactivated state and is activated by the indication of the MAC CE, a PHR for the BWP is triggered.

The UE may report a channel measurement result (CSI, CQI, PMI, RI, PTI, or CRI) for the downlink in the activated BWP according to a configuration of the base station.

If the current downlink BWP of the serving cell is not the dormant BWP or if the serving cell was previously in a deactivated state and is activated by the indication of the MAC CE, a PDCCH is monitored to read an indication of the base station in the activated BWP.

If the current downlink BWP of the serving cell is not the dormant BWP or if the serving cell was previously in a deactivated state and is activated by the indication of the MAC CE, a PDCCH is monitored to read cross-scheduling for the activated BWP.

If the current downlink BWP of the serving cell is not the dormant BWP or if the serving cell was previously in a deactivated state and is activated by the indication of the MAC CE, the BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If the current downlink BWP of the serving cell is not the dormant BWP or if the serving cell was previously in a deactivated state and is activated by the indication of the MAC CE, and if a link BWP hibernation timer is configured for the BWP, The BWP hibernation timer starts or restarts for the BWP.

Further, in the embodiment of the disclosure, when the base station triggers a random access procedure for the SCell, the base station does not indicate BWP switching of the downlink BWP to the dormant BWP for the SCell. This is because the uplink BWP is deactivated when switching to the downlink dormant BWP is performed and thus the random access procedure cannot be successfully performed.

The operation related to switching of the normal BWP (for example, a BWP which is not the dormant BWP) or the dormant BWP is performed when the cell (for example, SCell) operating the BWP is in an activated state in the embodiment of the disclosure. Accordingly, when MAC control information (MAC Control Element (MAC CE)) including an indicator indicating activation or deactivation of a cell is received, if the cell operates a downlink dormant BWP and MAC CE including the indicator indicating activation of the cell is received, a first active BWP may be activated if the cell is in a deactivated state, and the indicator may restart a cell inactivity timer without any influence on the BWP or trigger a Power Headroom Report (PHR) if the cell is in an activated state. If the cell receives the MAC CE including the indicator indicating deactivation of the cell while operating a downlink dormant BWP, the downlink dormant BWP of the cell may be deactivated. In another method, in the embodiment of the disclosure, if a cell inactivity timer is running when the downlink BWP is switched to the dormant BWP, the cell inactivity timer may be suspended. The operation is applied to prevent cell deactivation of the dormant BWP due to expiration of the cell timer and automatic deactivation of the dormant BWP.

Figure 14:
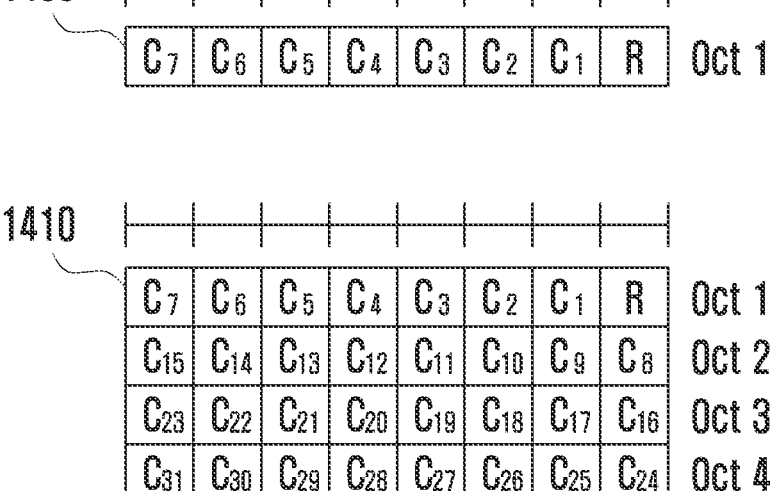
FIG. 14 illustrates an example of a structure of MAC control information indicating SCell activation or deactivation according to an embodiment of the disclosure.

FIG. 14 illustrates a structure of MAC control information indicating activation or deactivation of the SCell according to an embodiment of the disclosure.

Referring to FIG. 14, MAC control information indicating activation or deactivation of the SCell may be 1 byte or 2 bytes which are the fixed size as indicated by reference numeral 1405 or 1410. A MAC subheader of the MAC control information may include a logical channel identifier indicating the MAC control information, and the MAC control information may include a C_i field indicating activation or deactivation of each SCell and a reserved R field.

C_i field: indicate, if there is an SCell having an SCell identifier i for the MAC layer device, an activated or deactivated state of the SCell having the SCell identifier i. If there is no SCell having the SCell identifier i, the MAC layer device ignores the C_i field. The C_i field configured as 1 may indicate activation of the SCell corresponding to the SCell identifier i, and the C_i field configured as 0 may indicate deactivation of the SCell corresponding to the SCell identifier i.

R field: indicates a reserved field and may be configured as 0.

Hereinafter, the disclosure proposes embodiment 1 of an activation or deactivation procedure of the SCell for the UE operation for each SCell when the UE receives MAC control information proposed in FIG. 14.

Embodiment 1 of the activation or deactivation procedure of the SCell is described below.

When the MAC layer device is configured by one or more SCells, the network may activate or deactivate the configured SCells. When the SCell is activated, if the state of the SCell is not configured as the activated state in the higher layer device (for example, RRC layer device), the SCell may be deactivated.

The configured SCells may be activated or deactivated in the following cases.

The case in which MAC control information (MAC Control Element (MAC CE)) indicating activation or deactivation of the SCell proposed in FIG. 14 is received The cell inactivity timer (SCellDeactivationTimer) is configured for each configured SCell and has expired, the corresponding SCell may be deactivated (the cell inactivity timer cannot be configured in the SCell in which the PUCCH is configured. This is because, if the SCell in which the PUCCH is configured is deactivated by the timer, feedback such as HARQ ACK/NACK cannot be transmitted through the PUCCH and thus a problem occurs).

For each configured SCell, the MAC layer device may operate as follows.

1> When an SCell is configured, if an SCell state (SCell-State) is configured as an activated state or SCell activation or deactivation MAC control information indicating activation of the SCell is received, 2> If a first active downlink BWP identifier (firstActive-DownlinkBWP-Id) is not configured for the dormant BWP, 3> the SCell may be activated according to a predetermined (or appointed) timing. For example, the normal SCell operation may be applied or performed as follows.

4> A Sounding Reference Signal (SRS) may be transmitted in the SCell.

4> Channel State Information (CSI) may be reported for the SCell.

4> PDCCH monitoring may be performed in the SCell.

4> PDCCH monitoring may be performed in the SCell (for example, PDCCH monitoring for the SCell may be performed in the PCell or another SCell through cross-scheduling).

4> PUCCH transmission may be performed in the SCell.

3> If the SCell is deactivated before the SCell receives the SCell activation or deactivation MAC control information or the SCell state (SCellState) is configured as the activated state when the SCell is configured.

4> A downlink BWP and an uplink BWP of the SCell may be activated to a downlink BWP and an uplink BWP indicated by a first active downlink BWP identifier and a first active uplink BWP identifier.

3> The cell inactivity timer (SCellDeactivationTimer) configured in the SCell or related to the SCell may start or restart according to a predetermined or appointed timing.

3> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may be reset or reset again. The type 1 periodic uplink transmission resources may start or may be started to be used according to the predetermined or appointed timing.

3> A Power Head Room (PHR) report procedure may be triggered for the SCell or the BWP of the SCell.

2> If the first active downlink BWP identifier (firstActiveDownlinkBWP-Id) is not configured for the dormant BWP, 3> If a BWP inactivity timer (bwp-InactivityTimer) of the SCell or the serving cell is running, the BWP inactivity timer may be suspended.

3> If the SCell is deactivated before the SCell receives the SCell activation or deactivation MAC control information or the SCell state (SCellState) is configured as the activated state when the SCell is configured, 4> A downlink BWP and an uplink BWP of the SCell may be activated to a downlink BWP and an uplink BWP indicated by a first active downlink BWP identifier and a first active uplink BWP identifier.

3> The cell inactivity timer (SCellDeactivationTimer) configured in the SCell or related to the SCell may start or restart according to a predetermined or appointed timing.

1> If SCell activation or deactivation MAC control information indicating deactivation of the SCell is received, 1> Alternatively, if the cell inactivity timer for the activated SCell has expired, 2> The SCell may be deactivated according to the predetermined or appointed timing.

2> The cell inactivity timer related to the SCell may be suspended.

2> The BWP inactivity timer related to the SCell or the serving cell may be suspended.

2> Any activated BWP related to the SCell may be deactivated.

2> Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, for example, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

2> PUSCH transmission resources configured for the periodic channel measurement report (semi-persistent CSI reporting) related to the SCell may be released (cleared).

2> The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant type 1), may be performed only when the BWP is transitioned from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

2> All HARQ buffers related to the SCell may be flushed.

2> If there is continuous failure in Listen Before Talk (LBT) triggered for the SCell, it may be canceled.

1> If the PDCCH indicates uplink transmission resources (uplink grant) or downlink transmission resources (downlink assignment) in the activated SCell, 1> Alternatively, if the PDCCH indicates uplink transmission resources (uplink grant) or downlink transmission resources (downlink assignment) for the activated SCell in the serving cell scheduling the activated SCell, 1> Alternatively, if the MAC PDU is transmitted in periodic transmission resource and LBT failure is not indicated from the lower layer device, 1> Alternatively, if the MAC PDU is received in periodic downlink transmission resources, 2> The cell inactivity timer (SCellDeactivationTimer) for the SCell may restart.

1> If the cell is deactivated,

2> The SRS is not transmitted in the SCell.

2> The channel measurement report is not reported for the SCell.

2> Data is not transmitted in a uplink data transmission channel (Uplink Shared Channel (UL-SCH)) in the SCell.

2> A random access procedure is not performed in the SCell. Alternatively, a signal or data is not transmitted in a Random Access Channel (RACH).

2> PDCCH monitoring is not performed in the SCell.

2> PDCCH monitoring is not performed for the SCell (for example, PDCCH monitoring is not performed for the SCell in a PCell or another cell scheduling the SCell).

2> A signal or data is not transmitted through the PUCCH in the SCell.

An embodiment of embodiment 1 of the activation or deactivation procedure of the SCell according to the disclosure is described below.

1> if an SCell is configured with sCellState set to activated upon SCell configuration, or an SCell Activation/Deactivation MAC CE is received activating the SCell:

2> if firstActiveDownlinkBWP-Id is not set to dormant BWP:

3> activate the SCell according to the timing defined in TS 38.213 [6]; i.e., apply normal SCell operation including:

4> SRS transmissions on the SCell;

4> CSI reporting for the SCell;

4> PDCCH monitoring on the SCell;

4> PDCCH monitoring for the SCell;

4> PUCCH transmissions on the SCell, if configured.

3> if the SCell was deactivated prior to receiving this SCell Activation/Deactivation MAC CE, or an SCell is configured with sCellState set to activated upon SCell configuration:

4> activate the DL BWP and UL BWP indicated by firstActiveDownlinkBWP-IdandfirstActiveU-plinkBWP-Id respectively;

3> start or restart the sCellDeactivationTimer associated with the SCell according to the timing defined in TS 38.213 [6];

3> (re-)initialize any suspended configured uplink grants of configured grant Type 1 associated with this SCell according to the stored configuration, if any, and to start in the symbol according to rules in clause 5.8.2;

3> trigger PHR according to clause 5.4.6.

2> else if firstActiveDownlinkBWP-Id is set to dormant BWP:

3> stop the bwp-InactivityTimer of this Serving Cell, if running.

3> if the SCell was deactivated prior to receiving this SCellActivation/Deactivation MAC CE, or if an SCell is configured with sCellState set to activated upon SCell configuration:

4> activate the DL BWP and UL BWP indicated by firstActiveDownlinkBWP-Id and firstActiveU-plinkBWP-Id respectively.

3> start or restart the sCellDeactivationTimer associated with the SCell according to the timing defined in TS 38.213 [6].

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

As proposed in the disclosure, in BWP configuration information configured for each SCell, a first active BWP (firstActiveDownlinkBWP or firstActiveUplinkBWP) may be configured for each of the uplink or downlink or a BWP first activated from a dormant state (firstOutsideActiveTimeBWP-Id (for example, a downlink BWP configured for embodiment 1 (FIG. 10)) or firstWithinActiveTimeBWP-Id (for example, a downlink BWP configured for embodiment 2 or embodiment 3 (FIG. 11 or FIG. 12)) may be configured for the downlink. Accordingly, the UE may operate for the activated SCell in four cases below.

First case: a downlink first active BWP is configured as a second BWP (for example, a BWP which is not the dormant BWP) or a currently activated BWP of the activated SCell is a second BWP (for example, a BWP which is not the dormant BWP)

Second case: a downlink first active BWP is configured as a first BWP (for example, the dormant BWP) or a currently activated BWP of the activated SCell is a first BWP (for example, the dormant BWP)

Third case: a downlink first active BWP is configured as a second BWP (for example, a BWP which is not the dormant BWP) or a currently activated BWP of the activated SCell is a first BWP (for example, the dormant BWP)

Fourth case: a downlink first active BWP is configured as a first BWP (for example, the dormant BWP) or a currently activated BWP of the activated SCell is a second BWP (for example, a BWP which is not the dormant BWP)

The UE operation for each SCell when the UE receives the MAC control information proposed in FIG. 14 should be supported to allow the SCell activating the dormant BWP or the BWP which is not the dormant BWP to correctly operate for the four cases.

However, embodiment 1 of the SCell activation or deactivation procedure may generate an error or UE power consumption, or mismatch timer synchronization between the UE and the base station in the third case and the fourth case.

For example, in the third case, according to embodiment 1 of the SCell activation or deactivation procedure, the UE may configure the downlink first active BWP as the second BWP (for example, a BWP which is not the dormant BWP) when the currently activated downlink BWP of the activated SCell is the first BWP (for example, dormant BWP). Accordingly, PDCCH monitoring is unnecessarily performed and thus UE battery may be consumed, an SRS may be transmitted, a PUCCH may be transmitted, or an unnecessary PHR report procedure may be triggered.

Further, for example, in the fourth case, according to embodiment 1 of the SCell activation or deactivation procedure, the UE may configure the downlink first active BWP as the first BWP (for example, dormant BWP) when the currently activated downlink BWP of the activated SCell is the second BWP (for example, a BWP which is not dormant BWP). Accordingly, the BWP inactivity timer may be suspended and thus timer synchronization between the UE and the base station may be mismatched.

Accordingly, embodiment 2 of the SCell activation or deactivation procedure capable of allowing the UE to efficiently support all the four cases which may occur and solving the error, the UE power consumption problem, or the timer synchronization mismatching problem between the UE and the base station, which may be generated. Embodiment 2 proposes an efficient method considering the (activated or deactivated) state of each SCell, the type of the current or activated BWP of each SCell (it is determined whether the type is the dormant BWP or a BWP which is not the dormant BWP), or BWP configuration information configured through RRC (for example, it is determined whether a first active downlink BWP is configured as the dormant or a BWP which is not the dormant BWP). Further, in embodiment 2, when MAC control information indicating activation of the SCell for the activated SCell is received, a power headroom report procedure is triggered if the current or activated downlink BWP of the activated SCell is not the dormant BWP (or it the normal BWP or the second BWP), and the power headroom report procedure (PHR) is not triggered if the current or activated downlink BWP of the activated SCell is the dormant BWP. For example, in embodiment 3, when MAC control information indicating activation of the SCell for the deactivated SCell is received or when MAC control information indicating activation of the SCell for the activated SCell is received and the current or activated downlink BWP of the activated SCell is not the dormant BWP, the power headroom report procedure (PHR) may be triggered.

Embodiment 2 of the activation or deactivation procedure of the SCell is described below.

When the MAC layer device is configured by one or more SCells, the network may activate or deactivate the configured SCells. When the SCell is activated, if the state of the SCell is not configured as the activated state in the higher layer device (for example, RRC layer device), the SCell may be deactivated.

The configured SCells may be activated or deactivated as follows.

The case in which MAC control information (MAC Control Element (MAC CE)) indicating activation or deactivation of the SCell proposed in FIG. 14 is received The cell inactivity timer (SCellDeactivationTimer) is configured for each configured SCell and has expired, the corresponding SCell may be deactivated (the cell inactivity timer cannot be configured in the SCell in which the PUCCH is configured. This is because, if the SCell in which the PUCCH is configured is deactivated by the timer, feedback such as HARQ ACK/NACK cannot be transmitted through the PUCCH and thus a problem occurs).

For each configured SCell, the MAC layer device may operate as follows.

1> When an SCell is configured, if an SCell state (SCellState) is configured as an activated state or SCell activation or deactivation MAC control information indicating activation of the SCell is received, 2> If the SCell is deactivated before the SCell receives the SCell activation or deactivation MAC control information or the SCell state (SCellState) is configured as the activated state when the SCell is configured.

3> If a first active downlink BWP identifier (firstActive-DownlinkBWP-Id) is not configured for the dormant BWP, 4> the SCell may be activated according to a predetermined (or appointed) timing. For example, the normal SCell operation may be applied or performed as described below.

5> A Sounding Reference Signal (SRS) may be transmitted in the SCell.

5> Channel State Information (CSI) may be reported for the SCell.

5> PDCCH monitoring may be performed in the SCell.

5> PDCCH monitoring may be performed in the SCell (for example, PDCCH monitoring for the SCell may be performed in the PCell or another SCell through cross-scheduling).

5> PUCCH transmission may be performed in the SCell.

3> If the first active downlink BWP identifier (firstActiveDownlinkBWP-Id) is not configured for the dormant BWP, 4> If a BWP inactivity timer (bwp-InactivityTimer) of the SCell or the serving cell is running, the BWP inactivity timer may be suspended.

3> A downlink BWP and an uplink BWP of the SCell may be activated to a downlink BWP and an uplink BWP indicated by a first active downlink BWP identifier and a first active uplink BWP identifier.

2> The cell inactivity timer (SCellDeactivationTimer) configured in the SCell or related to the SCell may start or restart according to a predetermined or appointed timing.

2> If the activated downlink BWP (or currently activated downlink BWP) or the activated downlink BWP of the activated SCell (or currently activated downlink BWP) is not the dormant BWP, 3> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may be reset or reset again. The type 1 periodic uplink transmission resources may start or may be started to be used according to the predetermined or appointed timing.

3> A Power Head Room (PHR) report procedure may be triggered for the SCell or the BWP of the SCell.

1> If SCell activation or deactivation MAC control information indicating deactivation of the SCell is received, 1> Alternatively, if the cell inactivity timer for the activated SCell has expired, 2> The SCell may be deactivated according to the predetermined or appointed timing.

2> The cell inactivity timer related to the SCell may be suspended.

2> The BWP inactivity timer related to the SCell or the serving cell may be suspended.

2> Any activated BWP related to the SCell may be deactivated.

2> Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed and is not used anymore. The proposed method, for example, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

2> PUSCH transmission resources configured for the periodic channel measurement report (semi-persistent CSI reporting) related to the SCell may be released (cleared).

2> The periodic uplink transmission resources (configured uplink grant Type 1 configured through RRC) configured in the BWP of the cell may be suspended. The term "suspend" means that transmission resource configuration information configured through the RRC message is stored in the UE but is not used any more. The proposed method, that is, the operation of suspending the periodic uplink transmission resources (configured uplink grant type 1), may be performed only when the BWP is transitioned from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

2> All HARQ buffers related to the SCell may be flushed.

2> If there is continuous failure in Listen Before Talk (LBT) triggered for the SCell, it may be canceled.

1> If the PDCCH indicates uplink transmission resources (uplink grant) or downlink transmission resources (downlink assignment) in the activated SCell, 1> Alternatively, if the PDCCH indicates uplink transmission resources (uplink grant) or downlink transmission resources (downlink assignment) for the activated SCell in the serving cell scheduling the activated SCell, 1> Alternatively, if the MAC PDU is transmitted in periodic transmission resource and LBT failure is not indicated from the lower layer device, 1> Alternatively, if the MAC PDU is received in periodic downlink transmission resources, 2> The cell inactivity timer (SCellDeactivationTimer) for the SCell may restart.

1> If the cell is deactivated,

2> The SRS is not transmitted in the SCell.

2> The channel measurement report is not reported for the SCell.

2> Data is not transmitted in a uplink data transmission channel (Uplink Shared Channel (UL-SCH)) in the SCell.

2> A random access procedure is not performed in the SCell. Alternatively, a signal or data is not transmitted in a Random Access Channel (RACH).

2> PDCCH monitoring is not performed in the SCell.

2> PDCCH monitoring is not performed for the SCell (for example, PDCCH monitoring is not performed for the SCell in a PCell or another cell scheduling the SCell).

2> A signal or data is not transmitted through the PUCCH in the SCell.

An embodiment of embodiment 2 of the activation or deactivation procedure of the SCell according to the disclosure is described below.

The MAC entity shall for each configured SCell:

1> if an SCell is configured with sCellState set to activated upon SCell configuration, or an SCell Activation/Deactivation MAC CE is received activating the SCell:

2> if the SCell was deactivated prior to receiving this SCell Activation/Deactivation MAC CE, or an SCell is configured with sCellState set to activated upon SCell configuration:

3> if firstActiveDownlinkBWP-Id is not set to dormant BWP:

4> activate the SCell according to the timing defined in TS 38.213 [6]; i.e., apply normal SCell operation including:

5> SRS transmissions on the SCell;

5> CSI reporting for the SCell;

5> PDCCH monitoring on the SCell;

5> PDCCH monitoring for the SCell;

5> PUCCH transmissions on the SCell, if configured.

3> else if firstActiveDownlinkBWP-Id is set to dormant BWP:

4> stop the bwp-InactivityTimer of this Serving Cell, if running.

3> activate the DL BWP and UL BWP indicated by firstActiveDownlinkBWP-IdandfirstActiveU-plinkBWP-Id respectively.

2> start or restart the sCellDeactivationTimer associated with the SCell according to the timing defined in TS 38.213 [6];

2> if the active DL BWP is not the dormant BWP:

3> (re-)initialize any suspended configured uplink grants of configured grant Type 1 associated with this SCell according to the stored configuration, if any, and to start in the symbol according to rules in clause 5.8.2.2> trigger PHR according to clause 5.4.6.

3> trigger PHR according to clause 5.4.6;

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

Accordingly, the UE may perform the UE operation for the four cases according to embodiment 2 of the SCell activation or deactivation procedure proposed in the disclosure.

First case: a downlink first active BWP is configured as a second BWP (for example, a BWP which is not the dormant BWP) or a currently activated BWP of the activated SCell is a second BWP (for example, a BWP which is not the dormant BWP), Fourth case: a downlink first active BWP is configured as a first BWP (for example, the dormant BWP) or a currently activated BWP of the activated SCell is a second BWP (for example, a BWP which is not the dormant BWP), Or the case in which the currently activated downlink BWP of the activated SCell is the second BWP (for example, a BWP which is not the dormant BWP), 1> If the SCell state (SCellState) is configured as the activated state when the SCell is configured, SCell activation or deactivation MAC control information indicating activation of the SCell is received, the SCell is not deactivated (or is not activated) before the SCell activation or deactivation MAC control information is received, or the SCell state (SCellState) is not configured as the activated state (or is configured as the activated state) when the SCell is configured 2> The cell inactivity timer (SCellDeactivationTimer) configured in the SCell or related to the SCell may start or restart according to a predetermined or appointed timing.

2> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may be reset or reset again. The type 1 periodic uplink transmission resources may start or may be started to be used according to the predetermined or appointed timing.

2> A Power Head Room (PHR) report procedure may be triggered for the SCell or the BWP of the SCell.

Second case: a downlink first active BWP is configured as a first BWP (for example, the dormant BWP) or a currently activated BWP of the activated SCell is a first BWP (for example, the dormant BWP), Third case: a downlink first active BWP is configured as a second BWP (for example, a BWP which is not the dormant BWP) or a currently activated BWP of the activated SCell is a first BWP (for example, the dormant BWP), Or the case in which the currently activated downlink BWP of the activated SCell is the first BWP (for example, the dormant BWP), 1> If the SCell state (SCellState) is configured as the activated state when the SCell is configured, SCell activation or deactivation MAC control information indicating activation of the SCell is received, the SCell is not deactivated (or is not activated) before the SCell activation or deactivation MAC control information is received, or the SCell state (SCellState) is not configured as the activated state (or is configured as the activated state) when the SCell is configured 2> The cell inactivity timer (SCellDeactivationTimer) configured in the SCell or related to the SCell may start or restart according to a predetermined or appointed timing.

2> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may not be reset or not reset again.

2> A Power Head Room (PHR) report procedure may not be triggered for the SCell or the BWP of the SCell.

Accordingly, the disclosure proposes embodiment 3 of the SCell activation or deactivation procedure capable of allowing the UE to efficiently support all the four cases which may occur and solving the error, the UE power consumption problem, or the timer synchronization mismatching problem between the UE and the base station, which may be generated. Embodiment 3 proposes an efficient method considering the (activated or deactivated) state of each SCell, the type of the current or activated BWP of each SCell (it is determined whether the type is the dormant BWP or a BWP which is not the dormant BWP), or BWP configuration information configured through RRC (for example, it is determined whether a first active downlink BWP is configured as the dormant or a BWP which is not the dormant BWP). Further, in embodiment 3, when MAC control information indicating SCell activation for the activated SCell is received, the power headroom report procedure (PHR) is not triggered. For example, in embodiment 3, when MAC control information indicating SCell activation for the deactivated SCell is received, the power headroom report procedure (PHR) may be triggered.

Embodiment 3 of the activation or deactivation procedure of the SCell is described below.

When the MAC layer device is configured by one or more SCells, the network may activate or deactivate the configured SCells. When the SCell is activated, if the state of the SCell is not configured as the activated state in the higher layer device (for example, RRC layer device), the SCell may be deactivated.

The configured SCells may be activated or deactivated as follows.

The case in which MAC control information (MAC Control Element (MAC CE)) indicating activation or deactivation of the SCell proposed in FIG. 14 is received The cell inactivity timer (SCellDeactivationTimer) is configured for each configured SCell and has expired, the corresponding SCell may be deactivated (the cell inactivity timer cannot be configured in the SCell in which the PUCCH is configured. This is because, if the SCell in which the PUCCH is configured is deactivated by the timer, feedback such as HARQ ACK/NACK cannot be transmitted through the PUCCH and thus a problem occurs).

For each configured SCell, the MAC layer device may operate as follows.

1> When an SCell is configured, if an SCell state (SCellState) is configured as an activated state or SCell activation or deactivation MAC control information indicating activation of the SCell is received, 2> If the SCell is deactivated before the SCell receives the SCell activation or deactivation MAC control information or the SCell state (SCellState) is configured as the activated state when the SCell is configured, 3> If a first active downlink BWP identifier (firstActiveDownlinkBWP-Id) is not configured for the dormant BWP, 4> The SCell may be activated according to a predetermined (or appointed) timing. For example, the normal SCell operation may be applied or performed as follows.

5> A Sounding Reference Signal (SRS) may be transmitted in the SCell.

5> Channel State Information (CSI) may be reported for the SCell.

5> PDCCH monitoring may be performed in the SCell.

5> PDCCH monitoring for the SCell may be performed (for example, PDCCH monitoring for the SCell may be performed in the PCell or another SCell through cross-scheduling).

5> PUCCH transmission may be performed in the SCell.

3> If the first active downlink BWP identifier (firstActiveDownlinkBWP-Id) is configured for the dormant BWP, 4> If a BWP inactivity timer (bwp-InactivityTimer) of the SCell or the serving cell is running, the BWP inactivity timer may be suspended.

3> The downlink BWP and the uplink BWP of the SCell may be activated to a downlink BWP and an uplink BWP indicated by a first active downlink BWP identifier and a first active uplink BWP identifier.

3> A Power Head Room (PHR) report procedure may be triggered for the SCell or the BWP of the SCell.

2> The cell inactivity timer (SCellDeactivationTimer) configured in the SCell or related to the SCell may start or restart according to a predetermined or appointed timing.

2> If the activated downlink BWP (or currently activated downlink BWP) or the activated downlink BWP of the activated SCell (or currently activated downlink BWP) is not the dormant BWP, 3> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may be reset or reset again. The type 1 periodic uplink transmission resources may start or may be started to be used according to the predetermined or appointed timing.

1> If SCell activation or deactivation MAC control information indicating deactivation of the SCell is received, 1> Alternatively, if the cell inactivity timer for the activated SCell has expired, 2> The SCell may be deactivated according to the predetermined or appointed timing.

2> The cell inactivity timer related to the SCell may be suspended.

2> The BWP inactivity timer related to the SCell or the serving cell may be suspended.

2> Any activated BWP related to the SCell may be deactivated.

2> Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed and is not used anymore. The proposed method, for example, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

2> PUSCH transmission resources configured for the periodic channel measurement report (semi-persistent CSI reporting) related to the SCell may be released (cleared).

2> The periodic uplink transmission resources (configured uplink grant Type 1 configured through RRC) configured in the BWP of the cell may be suspended. The term "suspend" means that transmission resource configuration information configured through the RRC message is stored in the UE but is not used any more. The proposed method, that is, the operation of suspending the periodic uplink transmission resources (configured uplink grant type 1), may be performed only when the BWP is transitioned from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

2> All HARQ buffers related to the SCell may be flushed.

2> If there is continuous failure in Listen Before Talk (LBT) triggered for the SCell, it may be canceled.

1> If the PDCCH indicates uplink transmission resources (uplink grant) or downlink transmission resources (downlink assignment) in the activated SCell, 1> Alternatively, if the PDCCH indicates uplink transmission resources (uplink grant) or downlink transmission resources (downlink assignment) for the activated SCell in the serving cell scheduling the activated SCell, 1> Alternatively, if the MAC PDU is transmitted in periodic transmission resource and LBT failure is not indicated from the lower layer device, 1> Alternatively, if the MAC PDU is received in periodic downlink transmission resources, 2> The cell inactivity timer (SCellDeactivationTimer) for the SCell may restart.

1> If the cell is deactivated,

2> The SRS is not transmitted in the SCell.

2> The channel measurement report is not reported for the SCell.

2> Data is not transmitted in a uplink data transmission channel (Uplink Shared Channel (UL-SCH)) in the SCell.

2> A random access procedure is not performed in the SCell. Alternatively, a signal or data is not transmitted in a Random Access Channel (RACH).

2> PDCCH monitoring is not performed in the SCell.

2> PDCCH monitoring is not performed for the SCell (for example, PDCCH monitoring is not performed for the SCell in a PCell or another cell scheduling the SCell.

2> A signal or data is not transmitted through the PUCCH in the SCell.

An embodiment of embodiment 2 of the SCell activation or deactivation procedure according to the disclosure is described below.

The MAC entity shall for each configured SCell:

1> if an SCell is configured with sCellState set to activated upon SCell configuration, or an SCell Activation/Deactivation MAC CE is received activating the SCell:

2> if the SCell was deactivated prior to receiving this SCell Activation/Deactivation MAC CE, or an SCell is configured with sCellState set to activated upon SCell configuration:

3> if firstActiveDownlinkBWP-Id is not set to dormant BWP:

4> activate the SCell according to the timing defined in TS 38.213 [6]; i.e., apply normal SCell operation including:

5> SRS transmissions on the SCell;

5> CSI reporting for the SCell;

5> PDCCH monitoring on the SCell;

5> PDCCH monitoring for the SCell;

5> PUCCH transmissions on the SCell, if configured.

3> else if firstActiveDownlinkBWP-Id is set to dormant BWP:

4> stop the bwp-InactivityTimer of this Serving Cell, if running.

3> activate the DL BWP and UL BWP indicated by firstActiveDownlinkBWP-Id and firstActiveUplinkBWP-Id respectively.

3> trigger PHR according to clause 5.4.6;

2> start or restart the sCellDeactivationTimer associated with the SCell according to the timing defined in TS 38.213 [6];

2> if the active DL BWP is not the dormant BWP:

3> (re-)initialize any suspended configured uplink grants of configured grant Type 1 associated with this SCell according to the stored configuration, if any, and to start in the symbol according to rules in clause 5.8.2.2> trigger PHR according to clause 5.4.6.

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

Accordingly, the UE may perform the UE operation for the four cases according to embodiment 3 of the SCell activation or deactivation procedure proposed in the disclosure.

First case: a downlink first active BWP is configured as a second BWP (for example, a BWP which is not the dormant BWP) or a currently activated BWP of the activated SCell is a second BWP (for example, a BWP which is not the dormant BWP), Fourth case: a downlink first active BWP is configured as a first BWP (for example, the dormant BWP) or a currently activated BWP of the activated SCell is a second BWP (for example, a BWP which is not the dormant BWP), Or the case in which the currently activated downlink BWP of the activated SCell is the second BWP (for example, a BWP which is not the dormant BWP), 1> If the SCell state (SCellState) is configured as the activated state when the SCell is configured, SCell activation or deactivation MAC control information indicating activation of the SCell is received, the SCell is not deactivated (or is not activated) before the SCell activation or deactivation MAC control information is received, or the SCell state (SCellState) is not configured as the activated state (or is configured as the activated state) when the SCell is configured, 2> The cell inactivity timer (SCellDeactivationTimer) configured in the SCell or related to the SCell may start or restart according to a predetermined or appointed timing.

2> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may be reset or reset again. The type 1 periodic uplink transmission resources may start or may be started to be used according to the predetermined or appointed timing.

2> A Power Head Room (PHR) report procedure may be triggered for the SCell or the BWP of the SCell.

Second case: a downlink first active BWP is configured as a first BWP (for example, the dormant BWP) or a currently activated BWP of the activated SCell is a first BWP (for example, the dormant BWP), Third case: a downlink first active BWP is configured as a second BWP (for example, a BWP which is not the dormant BWP) or a currently activated BWP of the activated SCell is a first BWP (for example, the dormant BWP), Or the case in which the currently activated downlink BWP of the activated SCell is the first BWP (for example, the dormant BWP), 1> If the SCell state (SCellState) is configured as the activated state when the SCell is configured, SCell activation or deactivation MAC control information indicating activation of the SCell is received, the SCell is not deactivated (or is not activated) before the SCell activation or deactivation MAC control information is received, or the SCell state (SCellState) is not configured as the activated state (or is configured as the activated state) when the SCell is configured 2> The cell inactivity timer (SCellDeactivationTimer) configured in the SCell or related to the SCell may start or restart according to a predetermined or appointed timing.

2> When type 1 periodic uplink transmission resources (configured uplink grant type 1 configured through RRC) configured in the cell (SCell) or the BWP of the cell is suspended according to stored configuration information or when there are suspended type 1 periodic uplink transmission resources, the type 1 periodic uplink transmission resources may not be reset or not reset again.

2> A Power Head Room (PHR) report procedure may be triggered for the SCell or the BWP of the SCell.

The disclosure proposes a method of performing and triggering a power headroom procedure according to embodiment 1, embodiment 2, or embodiment 3 of the proposed SCell activation or deactivation procedure.

In the disclosure, the power headroom report procedure is used to provide the following information to the base station (a serving base station, for example, a serving eNB) serving the UE. The power headroom may indicate difference between a maximum transmission power (or a calculated or nominal maximum transmission power (nominal UE maximum transmit power)) which the UE can transmit in each activated serving cell (PCell, SCell, PSCell, or SpCell) and a power measured for uplink data transmission (UL-SCH) or Sounding Reference Signal (SRS) transmission or difference between a maximum transmission power which the UE can transmit and a power measured for PUCCH transmission and uplink data transmission in an SpCell (PCell or PSCell) of another MAC layer device (for example, LTE MAC or E-UTRA MAC). The power headroom may configure a power headroom value in MAC control information according to a power headroom report procedure and transmit the MAC control information through uplink transmission resources to report the same to the base station.

A first type power headroom is the difference between a maximum transmission power (or a calculated or nominal maximum transmission power (nominal UE maximum transmit power)) which the UE can transmit for the serving cell (PCell, SCell, PSCell, or SpCell) and a power measured for uplink data transmission (UL-SCH), and may be reported.

A second type power headroom is the difference between a maximum transmission power (or a calculated or nominal maximum transmission power (nominal UE maximum transmit power)) which the UE can transmit and a power measured for PUCCH transmission or uplink data transmission (UL-SCH) in the SpCell (PCell or PSCell) of another MAC layer device (for example, LTE MAC or E-UTRA MAC when dual connectivity is configured), and may be reported.

A third type power headroom is the difference between a maximum transmission power (or a calculated or nominal maximum transmission power (nominal UE maximum transmit power)) which the UE can transmit for each activated serving cell (PCell, SCell, PSCell, or SpCell) and a power measured for Sounding Reference Signal (SRS) transmission, and may be reported.

A procedure of reporting a power headroom considering embodiment 1, embodiment 2, or embodiment 3 of the SCell activation or deactivation procedure proposed in the disclosure is described below.

The UE may receive a configuration of configuration information for the power headroom report by the RRC message (for example, RRCReconfiguration) and the RRC layer device may control the power headroom report procedure by the following parameters.

When a timer value (phr-PeriodicTimer) for periodically reporting a power headroom, for example, a periodic power headroom report timer expires, the headroom report procedure may be triggered.

A timer value (phr-ProhibitTimer) for limiting the power headroom report; for example, the headroom report procedure is not triggered when the power headroom report limit timer is running.

A threshold value (phr-Tx-PowerFactorChange) for triggering a power headroom report;

An indicator (phr-Type2OtherCell) indicating a second type power headroom report considering another cell or MAC layer device;

An indicator (phr-ModeOtherCG) indicating a power headroom report considering another cell group;

An indicator (multiplePHR) indicating a plurality of power headroom reports

The parameters may be configured through the RRC message (for example, RRCReconfiguration) as illustrated in FIG. 6 of the disclosure.

In the procedure of reporting the power headroom considering the dormant BWP proposed in the disclosure, the power headroom report procedure may be triggered when one event is generated or one condition is satisfied among the following conditions.

The power headroom report procedure is triggered when the power headroom limit timer (phr-ProhibitTimer) expires or had expired, a BWP (or downlink BWP) of an activated serving cell of a MAC layer device is activated, or a path loss is changed by a configured threshold value (phr-Tx-PowerFactorChange) dB configured by the RRC message for at least one activated serving cell in which the activated BWP (or downlink BWP) is not the dormant BWP or an activated BWP (or downlink BWP) of the activated serving cell or the current BWP (or activated current downlink BWP) is not the dormant BWP. The path loss may be used as a path loss reference value when the MAC layer device has (or receives) uplink transmission resources for new transmission after the power headroom last transmitted by the MAC layer device.

The power headroom report procedure may be triggered when a periodic power headroom report timer expires.

The power headroom report procedure may be triggered when a power headroom report function is configured or reconfigured by a higher layer device (for example, the RRC layer device). The configuration or the reconfiguration may not be used to deactivate the power headroom report function.

The power headroom report procedure may be triggered when a deactivated cell in which an uplink of a MAC layer device is configured is activated and a first active downlink BWP (or first active downlink BWP identifier (firstActiveDownlinkBWP-Id)) configured in the cell is not configured as the dormant BWP, or the current or activated downlink BWP of the cell is not the dormant BWP.

The power headroom report procedure may be triggered when a cell in which an uplink of a MAC layer device is configured is activated and a first active downlink BWP (or first active downlink BWP identifier (firstActiveDownlinkBWP-Id)) configured in the cell is not configured as the dormant BWP, or the current or activated downlink BWP of the cell is not the dormant BWP.

Alternatively, the power headroom report procedure may be triggered when a deactivated cell in which an uplink of a MAC layer device is configured is activated and the current or activated downlink BWP is not the dormant BWP.

Alternatively, the power headroom report procedure may be triggered when a cell in which an uplink of a MAC layer device is configured is activated and the current or activated downlink BWP is not the dormant BWP.

The power headroom report procedure may be triggered when a PSCell is added, newly added, or modified (or when dual connectivity is configured, or a PSCell is newly added or modified).

In another method, the power headroom report procedure may be triggered when the power headroom report procedure may be triggered when the PSCell is added, newly added, or modified (or when dual connectivity is configured and a PSCell of an SCG is newly added or modified) and the first active downlink BWP (or first active downlink BWP identifier (firstActiveDownlinkBWP-Id) configured in the cell is not configured as the dormant BWP.

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be triggered when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

The power headroom report procedure may be triggered when an uplink BWP (UL BWP) is activated (or activation to first active uplink BWP is performed) or a MAC layer device switches or activate a downlink BWP (or an activated BWP or a current BWP (or downlink BWP)) of an activated SCell in which an uplink is configured from the dormant BWP to a normal BWP (or a BWP which is not the dormant BWP (non-dormant BWP)) or to a BWP (firstActiveNonDormantDownlinkBWP-Id or a BWP indicated by an identifier of the BWP which is not the dormant BWP) which is not the dormant BWP first activated from the dormant state configured by the RRC message.

The power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a BWP first activated from the dormant state configured by the RRC message. As described above, activating the BWP may be indicated by the PDCCH DCI.

One embodiment of the power headroom report procedure is described below.

5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e., E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:

phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity of which the active BWP (or the active DL BWP or the current DL BWP) is not a dormant BWP, which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

activation of an SCell of any MAC entity with configured uplink of which the active DL BWP is not set to dormant BWP;

activation of an deactivated SCell of any MAC entity with configured uplink of which firstActiveDownlinkBWP-Id is not set to dormant BWP;

activation of an SCell of any MAC entity with configured uplink and if -Id is not set to dormant BWP;

addition of the PSCell (i.e., PSCell is newly added or changed);

addition of the PSCell (i.e., PSCell is newly added or changed) and if its firstActiveDownlinkBWP-Id is not set to dormant BWP;

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

Figure 15:
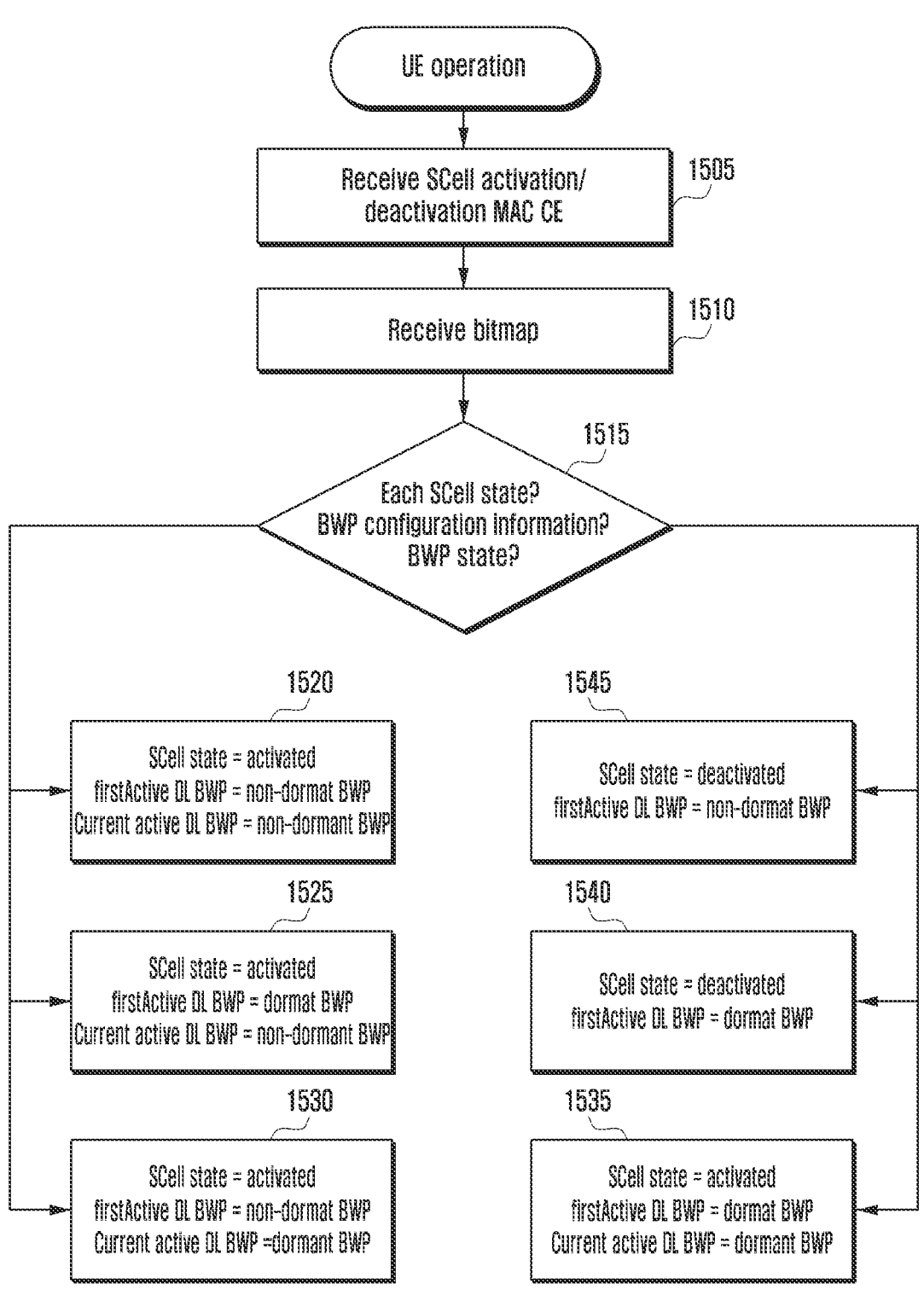
FIG. 15 illustrates a method by which, when the UE receives SCell activation or deactivation MAC control information in the disclosure, the UE performs a UE operation for each SCell in consideration of each SCell state or BWP configuration information configured in each SCell according to embodiment 1, embodiment 2, or embodiment 3 of an SCell activation or deactivation procedure according to an embodiment of the disclosure.

Activation or Switching of the active BWP (or downlink (DL) BWP) of an SCell of any MAC entity with configured uplink from the dormant BWP to non-dormant BWP (firstActiveNonDormantDownlinkBWP-Id);

activation of the DL BWP indicated by firstOutsideActiveTimeBWP-Id or by firstWithinActiveTimeBWP-Id (as specified in TS 38.331 [5] and TS 38.213 [6]) of an SCell of any MAC entity with configured uplink FIG. 15 illustrates a method by which, when the UE receives SCell activation or deactivation MAC control information, the UE performs the UE operation for each SCell in consideration of each SCell state or BWP configuration information configured in each SCell according to embodiment 1, embodiment 2, or embodiment 3 of the SCell activation or deactivation procedure according to an embodiment of the disclosure.

Referring to FIG. 15, when the UE receives MAC control information indicating SCell activation or deactivation in operations 1505 and 1510, the UE may perform the UE operation according to embodiment 1, embodiment 2, or embodiment 3 of the SCell activation or deactivation procedure proposed in the disclosure in consideration of each SCell state (activated state or deactivated state), the type of the current or activated BWP of each SCell (it is determined whether the type is the dormant BWP or a BWP which is not the dormant BWP), or BWP configuration information configured through RRC (for example, it is determined whether the first active downlink BWP is configured as the dormant BWP or a BWP which is not the dormant BWP) in operation 1515.

For example, the UE may perform operations in accordance with the proposed various embodiments for six cases 1520, 1525, 1530, 1535, 1540, and 1545 below according to embodiment 1, embodiment 2, or embodiment 3 of the SCell activation or deactivation procedure.

First case: a downlink first active BWP is configured as a second BWP (for example, a BWP which is not the dormant BWP) or a currently activated BWP of the activated SCell is a second BWP (for example, a BWP which is not the dormant BWP)

Second case: a downlink first active BWP is configured as a first BWP (for example, the dormant BWP) or a currently activated BWP of the activated SCell is a first BWP (for example, the dormant BWP)

Third case: a downlink first active BWP is configured as a second BWP (for example, a BWP which is not the dormant BWP) or a currently activated BWP of the activated SCell is a first BWP (for example, the dormant BWP)

Fourth case: a downlink first active BWP is configured as a first BWP (for example, the dormant BWP) or a currently activated BWP of the activated SCell is a second BWP (for example, a BWP which is not the dormant BWP)

Fifth case: a downlink first active BWP is configured as a first BWP (for example, the dormant BWP) or the SCell is deactivated, Sixth case: a downlink first active BWP is configured as a second BWP (for example, a BWP which is not the dormant BWP) or the SCell is deactivated In another method, for example, the UE may perform the proposed operation in four cases below according to embodiment 1, embodiment 2, or embodiment 3 of the SCell activation or deactivation procedure.

First case: a currently activated downlink BWP of the activated SCell is a second BWP (for example, a BWP which is not the dormant BWP)

Second case: a currently activated downlink BWP of the activated SCell is a first BWP (for example, the dormant BWP)

Figure 16:
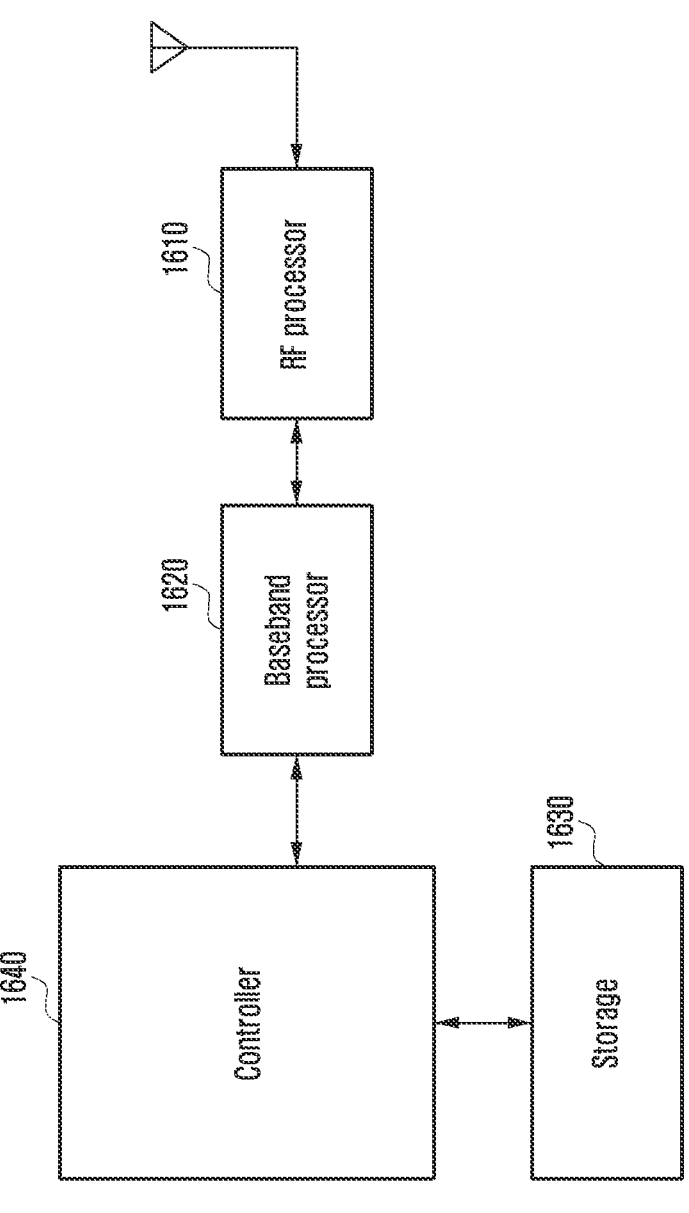
FIG. 16 illustrates a structure of the UE according to an embodiment of the disclosure.

Third case: a downlink first active BWP is configured as a first BWP (for example, the dormant BWP) or the SCell is deactivated Fourth case: a downlink first active BWP is configured as a second BWP (for example, a BWP which is not the dormant BWP) or the SCell is deactivated, FIG. 16 illustrates a structure of the UE according to an embodiment of the disclosure.

Referring to FIG. 16, the UE includes a Radio Frequency (RF) processor 1610, a baseband processor 1620, a storage 1630, and a controller 1640.

The RF processor 1610 performs a function for transmitting and receiving a signal through a wireless channel, such as band conversion and amplification of a signal. That is, the RF processor 1610 up-converts a baseband signal provided from the baseband processor 1620 into an RF band signal, transmits the RF band signal through an antenna, and then down-converts the RF band signal received through the antenna into a baseband signal. For example, the RF processor 1610 may include a transmission filter, a reception filter, an amplifier, a mixer, an oscillator, a Digital-to-Analog Converter (DAC), an Analog-to-Digital Converter (ADC), and the like. Although FIG. 16 illustrates only one antenna, the UE may include a plurality of antennas. In addition, the RF processor 1610 may include a plurality of RF chains. Moreover, the RF processor 1610 may perform beamforming. For the beamforming, the RF processor 1610 may control a phase and a size of each signal transmitted/ received through a plurality of antennas or antenna elements. The RF processor may perform MIMO and receive a plurality of layers when performing the MIMO operation. The RF processor 1610 may appropriately configure a plurality of antennas or antenna elements according to the control of the controller to perform reception beam sweeping or control a direction of a reception beam and a beam width so that the reception beam corresponds to a transmission beam.

The baseband processor 1620 performs a function for a conversion between a baseband signal and a bitstream according to a physical layer standard of the system. For example, in data transmission, the baseband processor 1620 generates complex symbols by encoding and modulating a transmission bitstream. Further, in data reception, the baseband processor 1620 reconstructs a reception bitstream by demodulating and decoding a baseband signal provided from the RF processor 1610. For example, in an Orthogonal Frequency-Division Multiplexing (OFDM) scheme, when data is transmitted, the baseband processor 1620 generates complex symbols by encoding and modulating a transmission bitstream, maps the complex symbols to subcarriers, and then configures OFDM symbols through an Inverse Fast Fourier transform (IFFT) operation and a Cyclic Prefix (CP) insertion. Further, in data reception, the baseband processor 1620 divides the baseband signal provided from the RF processor 1610 in units of OFDM symbols, reconstructs the signals mapped to the subcarriers through a Fast Fourier Transform (FFT) operation, and then reconstructs a reception bitstream through demodulation and decoding.

The baseband processor 1620 and the RF processor 1610 may transmit and receive signals as described above. Accordingly, each of the baseband processor 1620 and the RF processor 1610 may be referred to as a transmitter, a receiver, a transceiver, or a communicator. Further, at least one of the baseband processor 1620 and the RF processor 1610 may include a plurality of communication modules for supporting a plurality of different radio access technologies. In addition, at least one of the baseband processor 1620 and the RF processor 1610 may include different communication modules for processing signals in different frequency bands. For example, the different radio-access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage 1630 stores data such as a basic program for the operation of the UE, an application, configuration information, and the like. The storage 1630 provides the stored data according to a request from the controller 1640.

The controller 1640 controls the overall operation of the UE. For example, the controller 1640 transmits and receives signals through the baseband processor 1620 and the RF processor 1610. The controller 1640 records data in the storage 1630 and reads the data. To this end, the controller 1640 may include at least one processor. For example, the controller 1640 may include a Communications Processor (CP) that performs control for communication, and an Application Processor (AP) that controls higher layers such as an application layer.

Figure 17:
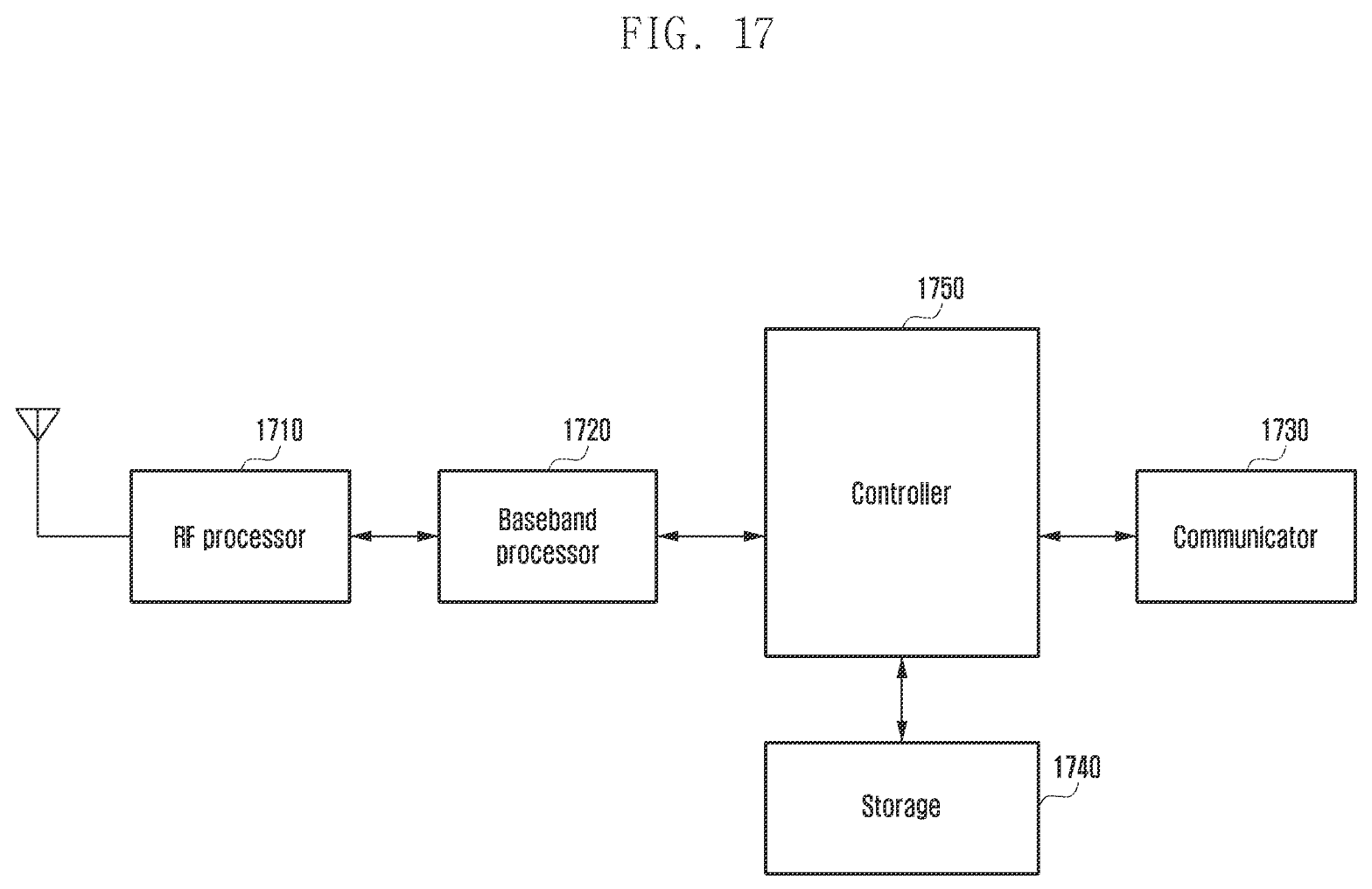

FIG. 17 illustrates a configuration of the base station in the wireless communication system according to an embodiment of the disclosure.

Referring to FIG. 17, the base station includes an RF processor 1710, a baseband processor 1720, a communicator 1730, a storage 1740, and a controller 1750.

The RF processor 1710 performs a function for transmitting and receiving a signal through a wireless channel, such as band conversion and amplification of a signal. That is, the RF processor 1710 up-converts a baseband signal provided from the baseband processor 1720 into an RF band signal and then transmits the converted signal through an antenna, and down-converts an RF band signal received through the antenna into a baseband signal. For example, the RF processor 1710 may include a transmission filter, a reception filter, an amplifier, a mixer, an oscillator, a DAC, an ADC, and the like. Although FIG. 17 illustrates only one antenna, the first access node may include a plurality of antennas. The RF processor 1710 may include a plurality of RF chains. Further, the RF processor 1710 may perform beamforming. For the beamforming, the RF processor 1710 may control the phase and the size of each of the signals transmitted and received through a plurality of antennas or antenna elements. The RF processor may perform a downlink MIMO operation by transmitting one or more layers.

The baseband processor 1720 performs a function of performing conversion between a baseband signal and a bitstream according to a physical layer standard of the first radio access technology. For example, when data is transmitted, the baseband processor 1720 generates complex symbols by encoding and modulating a transmission bitstream. Further, in data reception, the baseband processor 1720 reconstructs a reception bitstream by demodulating and decoding a baseband signal provided from the RF processor 1710. For example, in an OFDM scheme, when data is transmitted, the baseband processor 1720 may generate complex symbols by encoding and modulating the transmission bitstream, map the complex symbols to subcarriers, and then configure OFDM symbols through an IFFT operation and CP insertion. In addition, when data is received, the baseband processor 1720 divides a baseband signal provided from the RF processor 1710 in units of OFDM symbols, recovers signals mapped with subcarriers through an FFT operation, and then recovers a reception bitstream through demodulation and decoding. The baseband processor 1720 and the RF processor 1710 transmit and receive signals as described above. Accordingly, each of the baseband processor 1720 and the RF processor 1710 may be referred to as a transmitter, a receiver, a transceiver, a communicator, or a wireless communicator.

The communicator 1730 includes an interface (e.g., backhaul communicator) for communicating with other nodes within the network.

The storage 1740 stores data such as a basic program, an application, and setting information for the operation of the MeNB. Particularly, the storage 1740 may store information on bearers allocated to the accessed UE and the measurement result reported from the accessed UE. Further, the storage 1740 may store information on a reference for determining whether to provide multiple connections to the UE or stop the multiple connections. In addition, the storage 1740 provides data stored therein according to a request from the controller 1750.

The controller 1750 controls the overall operation of the MeNB. For example, the controller 1750 transmits and receives a signal through the baseband processor 1720 and the RF processor 1710 or through the communicator 1730. In addition, the controller 1750 may record data in the storage 1740 and read the data. To this end, the controller 1750 may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving a medium access control (MAC) control element (CE) associated with a secondary cell (SCell) activation;
   identifying whether the SCell was deactivated prior to receiving the MAC CE;
   in case that the SCell was deactivated prior to receiving the MAC CE:
      identifying whether a first active downlink bandwidth part (BWP) identifier (ID) for the SCell is set to a dormant BWP;
      in case that the first active downlink BWP ID for the SCell is not set to the dormant BWP, activating the SCell; and
      in case that the first active downlink BWP ID for the SCell is set to the dormant BWP, stopping a BWP inactive timer.

2. The method of claim 1, further comprising:
   in case that an active downlink BWP is not the dormant BWP, initializing at least one suspended configured uplink grant of a configured grant Type 1 associated with the SCell.

3. The method of claim 2, further comprising:
   in case that the active downlink BWP is not the dormant BWP, triggering a power headroom report (PHR).

4. The method of claim 1, wherein the activating of the SCell comprises:
   applying at least one normal SCell operation.

5. The method of claim 4, wherein the at least one normal SCell operation comprises:
   sounding reference signal (SRS) transmissions on the SCell,
   a channel state information (CSI) reporting for the SCell,
   a physical downlink control channel (PDCCH) monitoring on the SCell,
   the PDCCH monitoring for the SCell, and
   physical uplink control channel (PUCCH) transmissions on the SCell if configured.

6. The method of claim 1, wherein the first active downlink BWP ID for the SCell is set to the dormant BWP, or not set to the dormant BWP based on a radio resource control (RRC) message.

7. A terminal in a wireless communication system, the terminal comprising:
   a transceiver; and
   at least one processor communicatively coupled to the transceiver,
   wherein the at least one processor is configured to:
      control the transceiver to receive, via the transceiver, a medium access control (MAC) control element (CE) associated with a secondary cell (SCell) activation,
      identify whether the SCell was deactivated prior to receiving the MAC CE,
      in case that the SCell was deactivated prior to receiving the MAC CE:

identify whether a first active downlink bandwidth part (BWP) identifier (ID) for the SCell is set to a dormant BWP, in case that the first active downlink BWP ID for the SCell is not set to the dormant BWP, activate the SCell, and in case that the SCell was deactivated prior to receiving the MAC CE and the first active downlink BWP ID for the SCell is set to the dormant BWP, stop a BWP inactive timer.

8. The terminal of claim 7, wherein the at least one processor is further configured to:

in case that an active downlink BWP is not the dormant BWP, initialize at least one suspended configured uplink grant of a configured grant Type 1 associated with the SCell.

9. The terminal of claim 8, wherein the at least one processor is further configured to:

in case that the active downlink BWP is not the dormant BWP, trigger a power headroom report (PHR).

10. The terminal of claim 7, wherein the at least one processor is further configured to:

apply at least one normal SCell operation.

11. The terminal of claim 10, wherein the at least one processor is further configured to perform:

sounding reference signal (SRS) transmissions on the SCell, a channel state information (CSI) reporting for the SCell, a physical downlink control channel (PDCCH) monitoring on the SCell, the PDCCH monitoring for the SCell, and physical uplink control channel (PUCCH) transmissions on the SCell if configured.

12. The terminal of claim 7, wherein the first active downlink BWP ID for the SCell is set to the dormant BWP, or not set to the dormant BWP based on a radio resource control (RRC) message.

\* \* \* \* \*